(12) United States Patent
Honda

(10) Patent No.: US 7,054,467 B1
(45) Date of Patent: May 30, 2006

(54) INFORMATION PROCESSING APPARATUS, INFORMATION CAPTURING APPARATUS, INFORMATION INTEGRATION APPARATUS, CONTROLLER, OBJECT DETECTOR, AND INFORMATION PROCESSING METHOD

(75) Inventor: Kanako F Honda, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 948 days.

(21) Appl. No.: 09/692,101

(22) Filed: Oct. 20, 2000

(30) Foreign Application Priority Data

Oct. 21, 1999 (JP) ................................. 11-299853

(51) Int. Cl.
*G06K 9/00* (2006.01)

(52) U.S. Cl. ...................................... 382/104; 382/317
(58) Field of Classification Search ................. 382/104, 382/317, 107, 106, 305, 276; 342/907, 910, 342/46; 348/113, 143; 701/200, 118; 340/907, 340/910, 933, 937; 377/9; 73/178

See application file for complete search history.

(56) References Cited

U.S. PATENT DOCUMENTS

| | | | | |
|---|---|---|---|---|
| 5,195,144 A | * | 3/1993 | Le Parquier et al. | 382/104 |
| 5,351,044 A | * | 9/1994 | Mathur et al. | 340/901 |
| 5,751,832 A | * | 5/1998 | Panter et al. | 382/104 |
| 6,665,010 B1 | * | 12/2003 | Morris et al. | 348/297 |
| 6,728,393 B1 | * | 4/2004 | Stam et al. | 382/104 |
| 2001/0019621 A1 | * | 9/2001 | Hanna et al. | 382/107 |
| 2002/0097324 A1 | * | 7/2002 | Onuki | 348/208 |
| 2003/0103141 A1 | * | 6/2003 | Bechtel et al. | 348/148 |

FOREIGN PATENT DOCUMENTS

JP  A 10-332810  12/1998

* cited by examiner

*Primary Examiner*—Barry Choobin
(74) *Attorney, Agent, or Firm*—Oliff & Berridge, PLC

(57) ABSTRACT

In an information processing apparatus 1 to be installed in a vehicle, there are set a plurality of pixels by means of dividing a detection space around a vehicle into sub-divisions. One or more sensors 11 capture detection information DS pertaining to the state of inside of the detection space. A parameter conversion section 12 produces first parameters pertaining to an object located in the pixel on the basis of the detection information DS for each sensor 11, and assigns the first parameters to each pixel. The parameter integration section 15 integrates the first parameters assigned to the pixel on a per-pixel basis, and assigns to the pixel a second parameter which is the result of integration of the first parameters. A processing execution section 25 performs an adaptive task pertaining to vehicle control, through use of integration information MD2 consisting of the second parameters assigned to all pixels or through use of control information DC based on the integration control information MD2. As a result, processing for integrating information is made common without regard to the combination of the sensors 11.

35 Claims, 18 Drawing Sheets

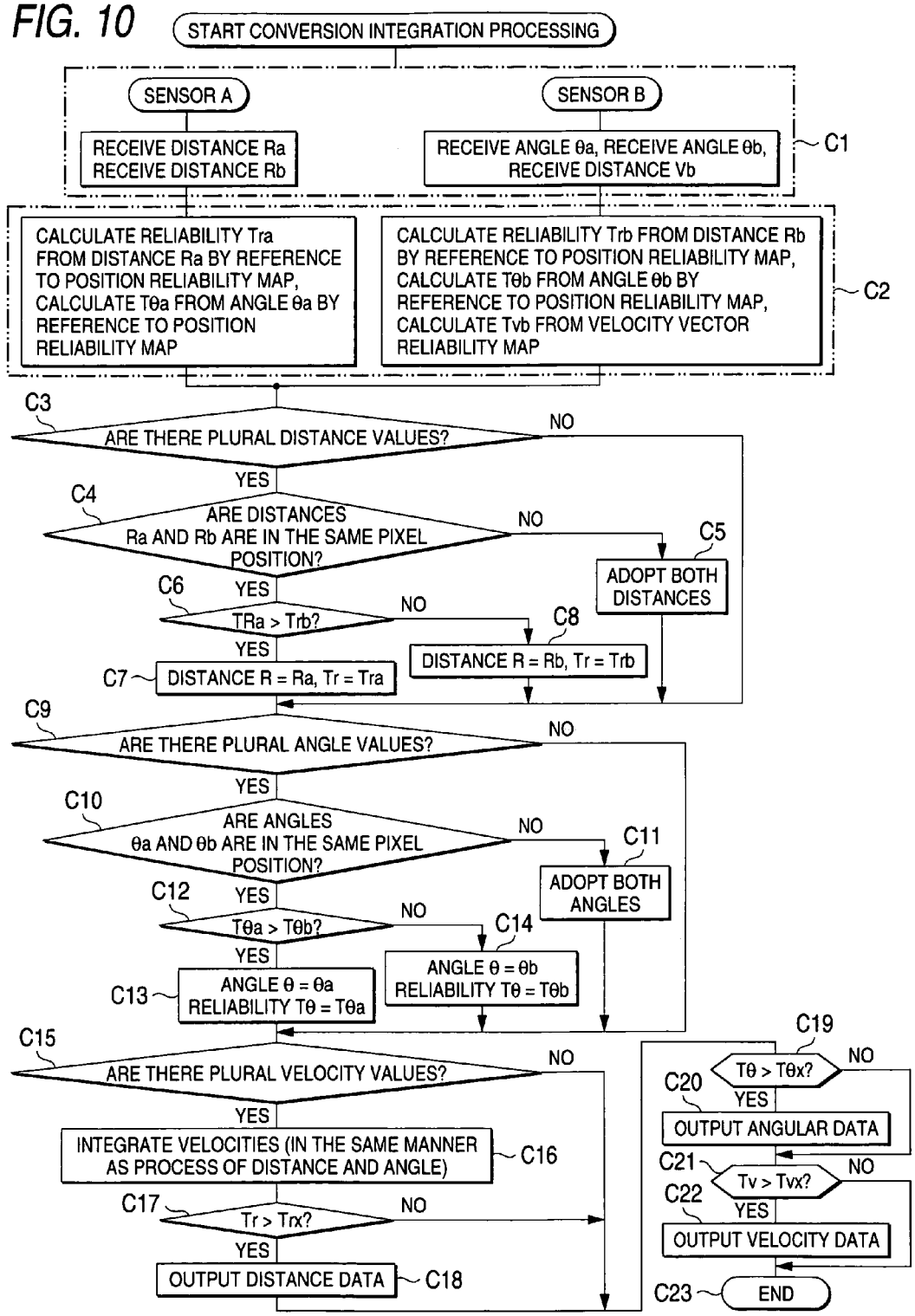

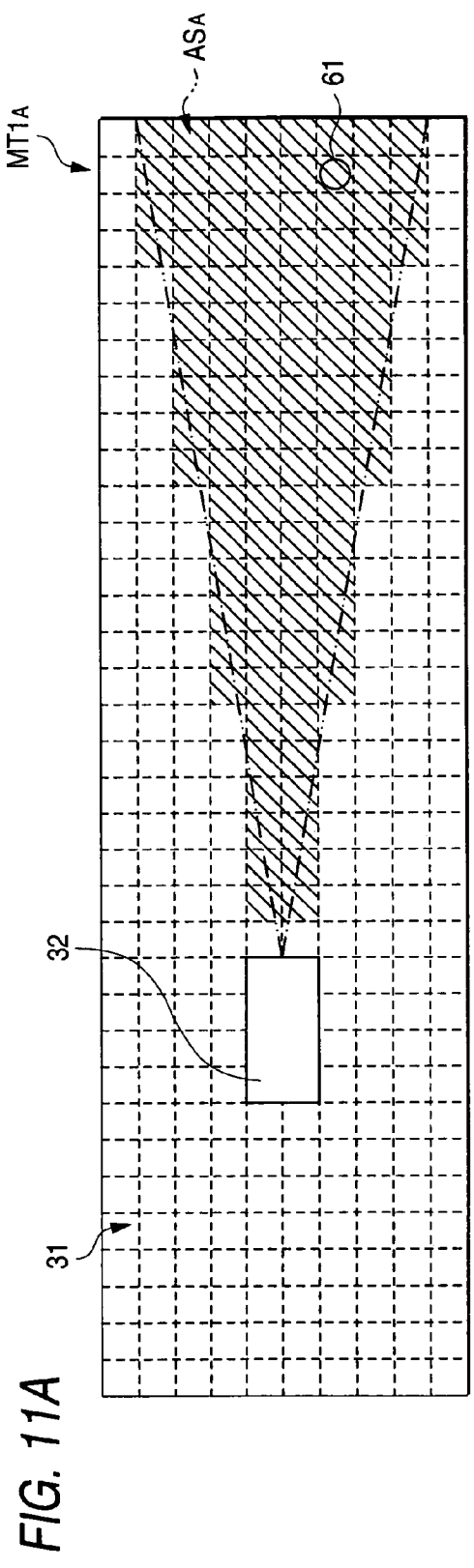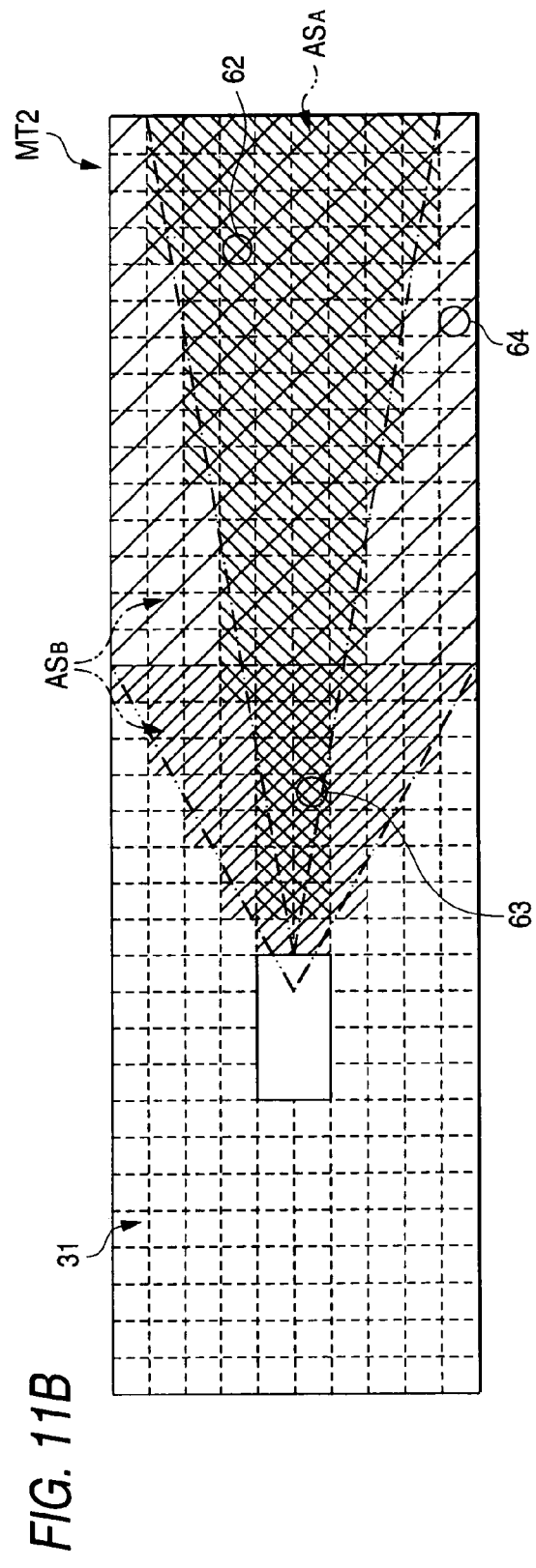
FIG. 11A
FIG. 11B

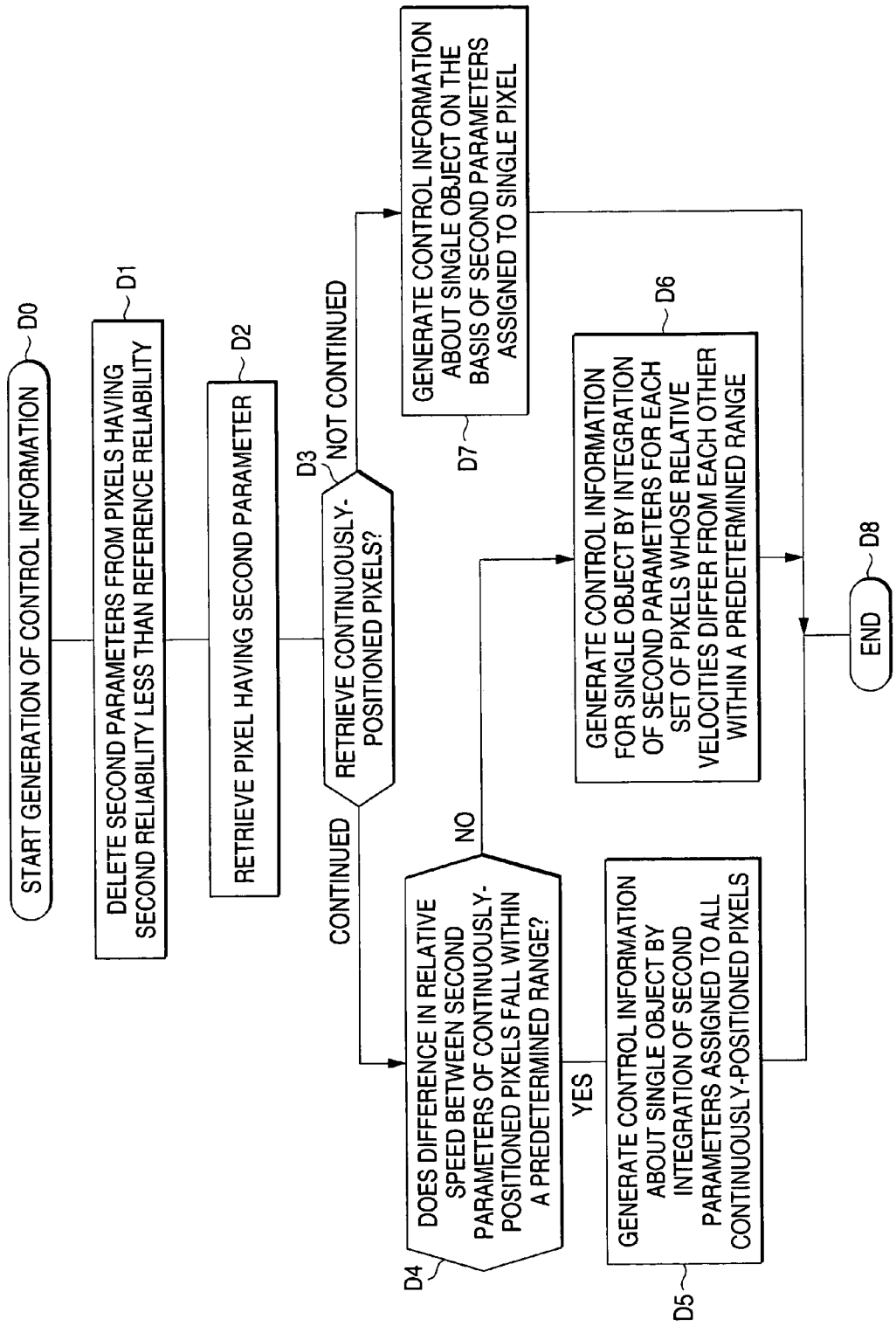

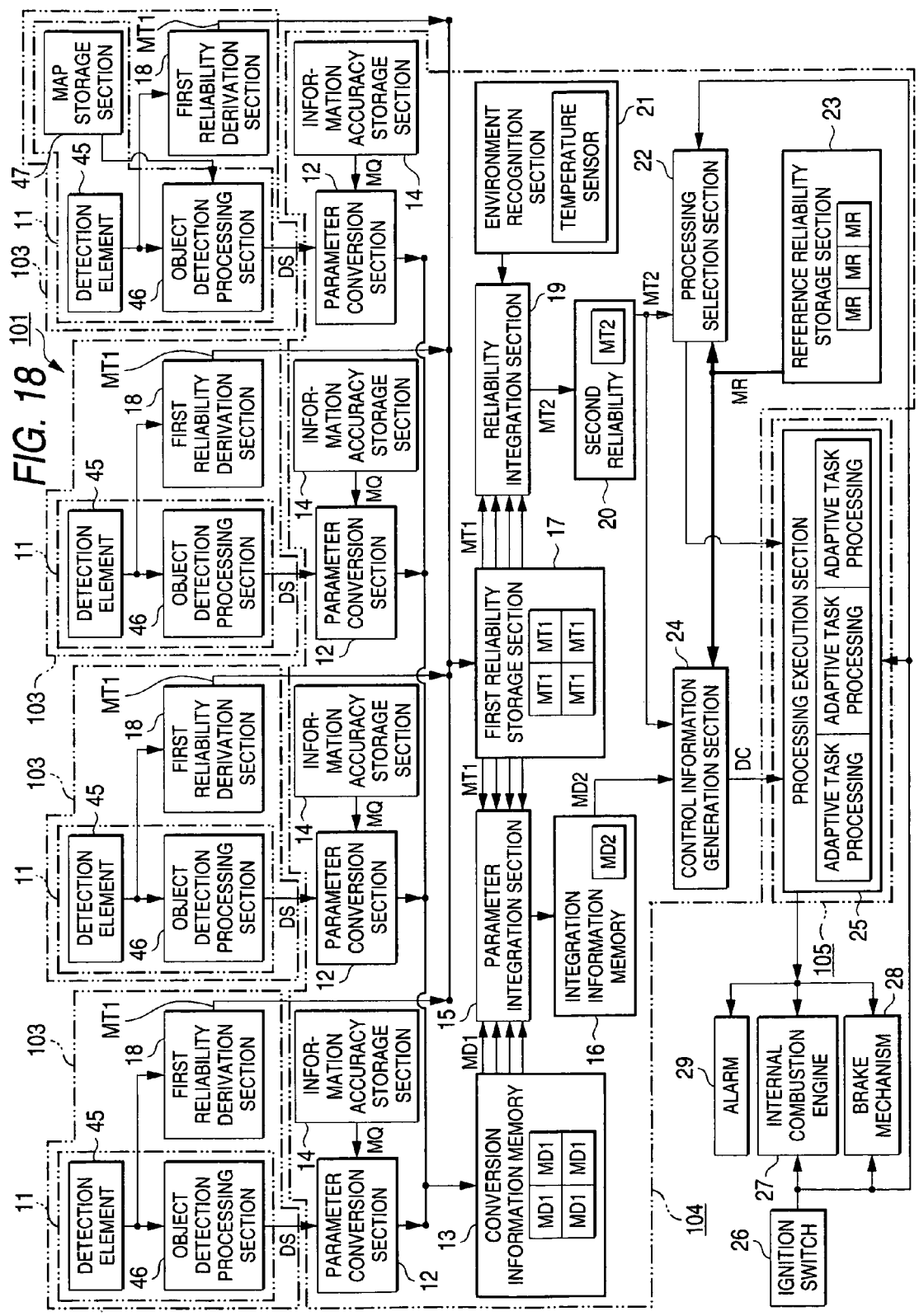

INFORMATION PROCESSING APPARATUS, INFORMATION CAPTURING APPARATUS, INFORMATION INTEGRATION APPARATUS, CONTROLLER, OBJECT DETECTOR, AND INFORMATION PROCESSING METHOD

BACKGROUND OF THE INVENTION

1. Field of the Invention

The present invention relates to an information processing apparatus, an information capturing apparatus, an information integration apparatus, and an object detector, all preferably being installed in a vehicle, as well as to an information processing method.

2. Description of the Related Art

A vehicle typified by a car is equipped with sensors of many types. The respective sensors capture information pertaining to circumstances surrounding a vehicle, in different manners. Sensors are roughly classified into a monitor for monitoring the circumstances of a vehicle and information capturing apparatus for capturing information pertaining to travel of vehicle. Monitors are typified by radar, sonar, or an object recognition apparatus using an image processing technique. Information capturing apparatus are typified by a navigation system and an inter-vehicle communication system. Pieces of information pertaining to the circumstances surrounding a vehicle captured by the sensors of several types installed in a single vehicle are integrated by an information integration apparatus. A controller performs an adaptive task pertaining to vehicle control, through use of the result of integration of information pieces.

Japanese Patent Application Laid-Open No. 332810/1998 describes a radar including a plurality of antenna/transceiver sections. Each of the antenna/transceiver sections of the radar receives an electromagnetic wave reflected from an object of measurement through use of an aerial. Each of the antenna/transceiver sections determines an intensity level of an object on the basis of the power of a received electromagnetic wave with reference to an elevation angle of the aerial. The intensity levels of the object determined by all the antenna/transceiver sections are integrated. Intensity levels of the object within a rectangular area including border lines among overlapping maximum observation ranges of respective antenna/transceiver sections are two-dimensionally averaged and smoothed. Weights are assigned to a plurality of meshes within each rectangular area during a smoothing operation. Thus, the thus-integrated intensity level of the object is displayed.

Formats of the information pieces captured by the sensors of various types installed in the vehicle differ from one another, and in many cases parameters of respective information pieces differ from one another. For example, a parameter of the information pertaining to the surroundings of a vehicle captured by the monitor may be a relative distance between the vehicle and an object, a relative speed of the object, or the presence/absence of an object at a predetermined location. Information pieces which are objects of integration and are delivered to the information integration apparatus from sensors are not uniform with regard to content. For example, information about objects which are present around the vehicle and information about the geometry of a road on which the vehicle is now driving are delivered to the information integration apparatus. In order to produce information available for a vehicle controller, the information integration apparatus of the conventional art integrates the information pieces of different contents, such that information pieces of high reliability level among the thus-captured information pieces are combined together. Japanese Patent Application Laid-Open NO. 332810/1998 states only the method of integrating information pieces of identical formats and fails to state a method of integrating information pieces of different formats.

In the information integration apparatus of the conventional art, combination of sensors changes in accordance with adaptive tasks of the vehicle controller. Even in the case of a single adaptive task, a plurality of combinations of sensors are available. The information integration method must be defined in accordance with a combination of sensors which output information pieces to be integrated. In connection with an information integration method designed for a certain combination of sensors, branch steps are set according to the information output from each of the sensors combined. A processing routine is limited for the certain combination. If the combination of sensors is changed, application of the information integration method to a modified combination of sensors is difficult. For this reason, the information integration method must be changed in agreement with a modification to the combination of sensors whose outputs are objects of integration. Particularly, in a case where parameters of information pieces which are objects of integration are variable or where the structures of information pieces differ, processing operations of information integration apparatus must be greatly changed even when one of the sensors of various types is replaced.

For these reasons, the manufacturer of information integration apparatus must prepare information integration apparatus of different structures in number equal to the combinations of sensors and the combinations of adaptive tasks of the controller. Each time a new combination between the combination of sensors and an adaptive task of the controller is conceived, the design of the information integration apparatus must be changed fundamentally. As a result, the load imposed at the time of designing of the information integration apparatus is increased, and costs for manufacturing the information integration apparatus is increased. Each time the combination of sensors and the combination of adaptive tasks of a controller are changed, the information integration apparatus must be changed, and hence load imposed on manufacture of a vehicle is also increased.

The information integration method must be defined in accordance with the traveling state of a vehicle, weather conditions, the geometry of a road, and the state of provision of information. Hence, the information integration method must be changed in agreement with the traveling state of a vehicle and weather conditions. Since a processing routine of the information integration method is difficult to change, changing of the information integration method in accordance with the traveling state is difficult.

SUMMARY OF THE INVENTION

The present invention has been made to provide an information processing apparatus and method which readily enable integration of information pieces output from sensors even when the combination of sensors is changed, as well as information capturing apparatus, an information integration apparatus, object detector(s), and a controller, which are provided for the information processing apparatus.

Accordingly, the present invention provides information processing apparatus comprising:

at least one sensor means for detecting the circumstances of inside of a predetermined detection space and capturing detection information pertaining to the detected circumstances;

parameter conversion means which determines, on the basis of the detection information output from the sensor means, first parameters pertaining to objects located in a plurality of pixels, the pixels corresponding to sub-divisions formed by dividing the detection space, and which assigns the first parameters to respective pixels; and parameter integration means which integrates the first parameters assigned to the pixels, on a per-pixel basis, and assigns a second parameter to the pixels, the second parameter being the result of integration of the first parameters.

The information processing apparatus includes the parameter conversion means. Hence, the format of the information given to the parameter integration means is made interchangeable, without regard to the format of information output from the sensor means. As a result, detection information can be integrated through use of parameter integration means of single construction, without regard to the combination of sensor means. Hence, the versatility of the parameter integration means is improved, thereby curtailing costs for manufacturing the information processing apparatus.

Preferably, in a case where the detection information includes parameters representing the position of an object, the parameter conversion means performs the following operations for each sensor means, (1) selection of a pixel including the position of the object indicated by the detection information output from the sensor means, and (2) assignment of first parameters produced from the detection information to only the selected pixel.

In the information processing apparatus according to the present invention, first parameters are assigned to respective pixels on the basis of the result of comparison between the positions of pixels and the position of an object, which position is one of parameters of the detection information. The parameter conversion means can easily convert detection information into conversion information formed from the first parameters assigned to all the pixels.

Preferably, in a case where the detection information includes parameters representing the position of an object, there is further included information accuracy storage means for storing, for each sensor means, the accuracy of detection information pertaining to an object located in respective pixel within the detection space, and the parameter conversion means performs the following operations for each sensor means, (1) selection of a pixel including the position of the object indicated by the detection information output from the sensor means, and (2) assignment of first parameters produced from the detection information to pixels located in an area, which area is set in the detection space on the basis of the accuracy of detection information pertaining to the sensor means provided in the selected pixel and on the basis of the position of the selected pixel.

In accordance with the accuracy of detection information and the result of comparison between the positions of pixels and the position of an object, which position is one of parameters of the detection information, the information processing apparatus according to the present invention assigns first parameters to each of the pixels. As a result, the accuracy of conversion of detection information performed by the parameter conversion means is improved.

Preferably, at least one of first parameters assigned to the single pixel indicates presence of an object located in the pixel.

In the information processing apparatus according to the present invention, first parameters indicating the presence or absence of an object are assigned to each pixel. Hence, on the basis of integration information formed from a second parameter resulting from integration of the first parameters, there can be produced information including, as a parameter, the position of the object.

Preferably, at least one of first parameters assigned to the single pixel indicates the moving state of an object located in the pixel.

In the information processing apparatus according to the present invention, first parameters indicating the moving state of an object are assigned to each pixel. Hence, on the basis of integration information formed from a second parameter resulting from integration of the first parameters, there can be produced information including a parameter indicating the moving state of the object.

Preferably, the information processing apparatus further comprises reliability storage means for storing, for each sensor means, predetermined first reliability which is the reliability of first parameters assigned to respective pixel on the basis of the detection information.

In the information processing apparatus according to the present invention, first reliability of sensor means is assigned to each pixel. As a result, the information processing apparatus can perform processing pertaining to the first parameters, in consideration of first reliability.

Preferably, the information processing apparatus further comprises first reliability derivation means for deriving, for each sensor means, first reliability which is the reliability of first parameters assigned to respective pixel on the basis of the detection information, wherein the first degree based on the sensor means increases with an increase in the capability of the sensor means for detecting the circumstances of inside of the detection space.

In the information processing apparatus according to the present invention, first reliability of sensor means is assigned to each pixel, and the first reliability changes in accordance with the detection capability of the sensor means. As a result, the information processing apparatus can perform processing pertaining to the first parameters, in consideration of first reliability in accordance with the detection capability of the sensor means.

Preferably, in a case where the sensor means is installed in a vehicle, a timing at which the first reliability is derived is equal to a timing at which an ignition switch of the vehicle is brought into conduction.

In the information processing apparatus according to the present invention, the first reliability derivation means derives first reliability at a point in time when an ignition switch of a vehicle is brought into conduction. As a result, the information processing apparatus can perform processing pertaining to first parameters at any time after the ignition switch has been brought into conduction, in consideration of the first reliability.

Preferably, a timing at which the first reliability is derived is equal to a timing at which the detection capability of at least one sensor means is changed.

In the information processing apparatus according to the present invention, the first reliability derivation means derives first reliability at a point in time when a change has arisen in at least one of the sensor means. As a result, the information processing apparatus can perform processing pertaining to first parameters in accordance with the detection capability of the sensor means and in consideration of the first reliability.

Preferably, at least one of the first parameters assigned to the single pixel is a vector indicating the moving state of an object situated in the pixel, and the first reliability includes the reliability of the vector indicating the moving state of the object.

In the information processing apparatus according to the present invention, in a case where vectors indicating the moving state of the object are assigned to a pixel as a first parameter, the first reliability collectively indicates the degrees of reliability of the vectors. As a result, the information processing apparatus can perform processing pertaining to vectors in consideration of the reliability of the vectors.

Preferably, at least one of the first parameters assigned to the single pixel is a vector indicating the moving state of an object situated in the pixel, and the first reliability includes the reliability of a plurality of components of the vector indicating the moving state of the object.

In the information processing apparatus according to the present invention, in a case where vectors indicating the moving state of the object are assigned to a pixel as a first parameter, the first reliability indicates the degrees of reliability of components of the vectors. As a result, the information processing apparatus can perform processing pertaining to vectors in consideration of the reliability of the vectors for each component.

Preferably, the parameter integration means assigns, on a per-pixel basis, a weight to the first parameters assigned to the pixel, in accordance with the first reliability of the pixel, thereby integrating the first parameters.

In the information processing apparatus according to the present invention, first reliability is referred to at the time of calculation of a second parameter assigned to each pixel. As a result, the accuracy of a second parameter assigned to a pixel is improved.

Preferably, the information processing apparatus further comprises reliability integration means for integrating, on a per-pixel basis, the degrees of first reliability of the pixel and assigning the result of integration of the first reliability to the pixel as second reliability indicating the reliability of the second parameter.

In the information processing apparatus according to the present invention, second reliability to be assigned to each pixel is calculated. As a result, the information processing apparatus can perform processing pertaining to the second parameter.

Preferably, the second reliability of the single pixel represents the sum total of degrees of first reliability of all sensor means provided in the pixel.

In the information processing apparatus according to the present invention, the second reliability is produced from only first reliability. As a result, reliability integration means can generate second reliability by means of simple processing.

Preferably, the information processing apparatus further comprises environment recognition means for recognizing the environment of the sensor means, wherein the second reliability of the single pixel represents the sum total of degrees of the first reliability which are assigned to all sensors provided in the pixel and are weighted by a constant corresponding to the influence of the environment recognized by the sensor means.

In the information processing apparatus according to the present invention, second reliability is generated on the basis of the circumstances of a vehicle which are recognized as first reliability. As a result, the reliability integration means can produce second reliability in accordance with the latest environment of the vehicle.

Preferably, the information processing apparatus further comprises processing execution means capable of performing any of possible adaptive tasks through use of integration information formed from the second parameters assigned to all pixels provided in the detection space; and processing selection means for selecting an adaptive task allowed to be performed, from among all adaptive tasks using integration information, on the basis of the latest second reliability of all pixels, wherein the processing execution means performs the selected adaptive task.

The information processing apparatus according to the present invention performs only an adaptive task selected on the basis of second reliability. As a result, the processing execution means can make switching between adaptive tasks in accordance with the combination of current detection capabilities of all sensor means.

Preferably, the information processing apparatus further comprises reference reliability storage means for storing, for each adaptive task, reference reliability which is a lower threshold of second reliability assigned to all pixels in a case where performance of an adaptive task is allowed to be performed, wherein the processing selection means compares, on a per-pixel basis, the latest second reliability of a pixel with reference reliability corresponding to the adaptive task assigned to the pixel, for each adaptive task, and in a case where the latest second reliability is greater than the reference reliability, it is determined that performance of the adaptive task is allowed.

The information processing apparatus according to the present invention performs an adaptive task selected on the basis of the result of comparison between reference reliability and the latest second reliability. As a result, there is performed the adaptive task only in a case where the minimum second reliability required for performing an adaptive task is obtained, and hence the accuracy of processing of the adaptive task which has been performed is improved.

Preferably, in a case where the sensor means is installed in a vehicle, the processing selection means performs selection of the adaptive task at a point in time when the ignition switch of the vehicle is brought into conduction.

In the information processing apparatus according to the present invention, the processing selection means selects an adaptive task at a point in time when the ignition switch of the vehicle is brought into conduction. As a result, the processing execution means can perform an adaptive task at any point in time after the ignition switch has been brought into conduction, in accordance with the result of a selection operation.

Preferably, the information processing apparatus further comprises first reliability derivation means for deriving the latest first reliability corresponding to the sensor means for each sensor means each time the detection capability of the sensor means changes, wherein the reliability integration means integrates the degrees of first reliability each time the first reliability corresponding to at least one sensor means is given; and the processing selection means selects the adaptive task each time the first reliability corresponding to at least one sensor means is output.

In the information processing apparatus according to the present invention, the processing selection means selects an adaptive task at a point in time when a change arises in the detection capability of at least one of sensor means. As a result, the processing execution means can perform an adaptive task allowed in accordance with the current detection capability of the sensor means, each time the detection capability of sensor means changes.

Preferably, the information processing apparatus further comprises control information generation means for generating, from the integration information, control information pertaining to an object located within the detection space; and processing execution means for executing an adaptive task using control information, wherein the control information is formed from parameters acceptable to the processing execution means.

The information processing apparatus according to the present invention includes the control information generation means and hence can set a second parameter for integration information, without regard to a parameter acceptable to the processing execution means. As a result, even in a case where the processing execution means is replaced, there is obviated a necessity for the parameter integration means changing procedures for integrating the detection information, thus improving the versatility of the parameter integration means further.

Preferably, in a case where the second reliability which is the reliability of a second parameter is set on a per-pixel basis, where the control information includes a parameter indicating the position of an object, and where a second parameter assigned to the pixel having second reliability greater than a predetermined threshold value indicates the presence of an object in the pixel, the control information generation means determines the position of the object in the detection space on the basis of the position of the pixel.

The information processing apparatus according to the present invention produces control information on the basis of a second parameter and second reliability. Hence, the accuracy of processing of the processing execution means is improved.

Preferably, in a case where the second reliability is greater than a threshold value, where two or more pixels whose second parameters indicating presence of an object are continuously provided, and where second parameters assigned to the continuously-provided pixels are analogous to each other, the control information generation means integrates the second parameters assigned to the continuously-provided pixels and produces, from the result of integration of the second parameters, control information pertaining to a single object located within an area formed of the continuously-provided pixels.

In the information processing apparatus according to the present invention, a single object is recognized as being present within an area formed from a plurality of pixels—which are assigned mutually-similar second parameters and are positioned continuously—of all pixels recognized as indicating presence of objects. As a result, control information generation means can integrate, into a single information piece, control information pieces pertaining to an object straddling a plurality pixels.

Preferably, in a case where the control information includes a parameter indicating the position of the edge of an object, the control information generation means determines the position of a pixel located at an outermost position in the area formed from the continuously-provided pixels, as the position of the edge of the object located in the area.

In the present invention, the control information generation means of the information processing apparatus can easily determine the position of the edge of an object straddling a plurality of pixels.

Preferably, in a case where the control information includes a parameter indicating the moving velocity of an object, the control information generation means calculates, as the moving velocity of the object within the area, a mean value of the moving velocities indicated by the second parameters assigned to the pixels located in the area formed from the continuously-provided pixels.

In the information processing apparatus according to the present invention, a mean value of the traveling speed indicated by the second parameters assigned to the continuous pixels is determined as the traveling speed of an object located within the area consisting of continuous pixels. As a result, the traveling speed of the object straddling a plurality of pixels is easily determined.

Preferably, in a case where the control information includes a parameter indicating the moving velocity of an object, the control information generation means calculates, as a parameter indicating the moving velocity of the object in the area, a velocity at which the vehicle and the object approach each other most closely, from among the moving velocities indicated by the second parameters assigned to all the continuously-provided pixels in the area.

In the information processing apparatus according to the present invention, of traveling velocities based on the second parameters assigned to the pixels continuously located within the area, the velocity at which the sensor means and the object move so as to approach each other most closely is deemed to be the moving velocity of the object within the area. If the moving velocity of an object is determined in this way and detection of a collision between an object and a vehicle is performed, more reliable detection of a collision can be fulfilled.

Preferably, in a case where the sensor means is installed in a vehicle, the area of the detection space ahead of the vehicle is wider than the area of the detection space behind the vehicle, with reference to the travel direction thereof.

In the information processing apparatus according to the present invention, a vehicle is situated at the rear of the center of a detection space divided into pixels, with reference to the travel direction of the vehicle. As a result, in a case where a vehicle is controlled on the basis of integration information, the vehicle is controlled more safely.

The present invention also provides information capturing apparatus comprising:

parameter conversion means for producing first parameters pertaining to an object situated in respective pixels, the pixels corresponding to sub-divisions formed by means of dividing the detection space, on the basis of detection information output from sensor means which captures detection information pertaining to the circumstances of a predetermined detection space, as well as for assigning the thus-produced first parameters to the pixels.

The information capturing apparatus converts the information output from sensor means into information represented by parameters assigned to a plurality of pixels. In a case where the format of information output from a plurality of information capturing apparatus is standardized so as to comply with the format formed from a predetermined number of parameters assigned to the pixels, integration of information pieces output from the plurality of information capturing apparatus is facilitated.

The present invention also provides information processing apparatus which is given at least conversion information formed from first parameters pertaining to an object situated in respective pixels, the pixels corresponding to sub-divisions formed by means of dividing the detection space, comprising:

information storage means for storing, for each given information piece, first parameters by means of assigning the first parameters to each of pixels located in the detection space; and parameter integration means for integrating, on a per-pixel basis, the first parameters assigned to each pixel and assigning a second parameter to the pixel, the second parameter being the result of integration of the first parameters.

In the present invention, the format of information imparted to the information integration apparatus is made interchangeable with format formed from parameters of a predetermined number of types assigned to a plurality of pixels. As a result, the configuration of the parameter integration means for integrating information can be shared without regard to the combination of sensor means. Therefore, the versatility of information integration apparatus is improved, thereby curtailing costs for manufacturing the information integration apparatus.

The present invention also provides information integration apparatus which is given information formed from first parameters pertaining to an object situated in respective pixels, the pixels corresponding to sub-divisions formed by means of dividing the detection space, comprising:

first reliability storage means for storing predetermined first reliability of the first parameters assigned to all pixels; and weighting means for assigning a weight to the first parameters assigned to each pixel in accordance with the first reliability and for assigning the weighted first parameters to the pixel.

In the present invention, the format of information imparted to the information integration apparatus is made interchangeable with format formed from parameters of a predetermined number of types assigned to a plurality of pixels. As a result, the configuration of the weighting means for assigning a weight to information can be made common in the form of single procedures. Therefore, the versatility of information integration apparatus is improved, thereby curtailing costs for manufacturing the information integration apparatus.

The present invention also provides a controller which is given information formed from parameters pertaining to an object situated in respective pixels, the pixels corresponding to sub-divisions formed by means of dividing the detection space, comprising:

control information generation means for generating control information pertaining to the object situated in the detection space, from the given information; and processing execution means for performing processing using the control information, wherein the control information is formed from parameters acceptable to the processing execution means.

In the present invention, the format of information imparted to the information integration apparatus is made interchangeable with format formed from parameters of a predetermined number of types assigned to a plurality of pixels. Further, there is provided control information generation means for converting information of interchangeable format into information of format unique to the processing execution means, thereby obviating a necessity for changing the processing of the processing execution means to the format of input information. As a result, the configuration of the processing execution means can be shared, thereby curtailing costs for manufacturing the information integration apparatus.

The present invention also provides an object detection apparatus comprising:

sensor means capable of detecting the presence of an object in at least a portion of a predetermined detection space; and reliability setting means for setting the reliability of sensor means provided in one of a plurality of sub-divisions formed by means of dividing the detection space.

The object detection apparatus according to the present invention sets the reliability of sensor means in each of sub-divisions of a detection space, as well as detecting an object in at least one of the sub-divisions of the detection space. Since the format of reliability information pertaining to the result of detection of an object in the detection space performed by the sensor means is made interchangeable with the format formed from reliability of each of the sub-divisions. Integration of reliability information pieces performed by the plurality of object detection apparatus is facilitated.

The present invention also provides an object detection apparatus including sensor means capable of detecting the presence of an object in at least a portion of a predetermined detection space, and reliability integration means for integrating the degrees of reliability of respective sub-divisions formed by means of dividing the detection space, wherein the reliability integration means can integrate the degrees of reliability of the sensors in each of the sub-divisions.

In the present invention, the format of reliability information pertaining to sensor means imparted to the information integration apparatus is made interchangeable with format formed from reliability of a plurality of sub-divisions. As a result, the configuration of the reliability integration means for integrating degrees of reliability can be made interchangeable without regard to the combination of sensor means. Therefore, the versatility of the information integration apparatus is improved, and hence costs for manufacturing an information integration apparatus can be diminished.

The present invention also provides an information processing apparatus including sensor means capable of detecting the presence of an object in at least a portion of a predetermined detection space, and determination means for determining whether or not there can be performed an adaptive task, the adaptive task being performed on the basis of detection information output from the sensor means, wherein the determination means determines whether or not the adaptive task can be performed, on the basis of the reliability of the sensor means provided in sub-divisions formed by means of dividing the detection space.

In the information processing apparatus according to the present invention, a determination is made as to whether or not performance of an adaptive task can be performed, on the basis of the degree of reliability of the sensor means provided in each of the sub-divisions of the detection space. As a result, the switching between adaptive tasks can be made in accordance with the current detection capability of the sensor means which sends detection information to the information processing apparatus.

The present invention also provides an information processing apparatus including at least one sensor means capable of detecting the presence of an object in at least a portion of a predetermined detection space, and determination means for determining whether or not there can be performed an adaptive task, the adaptive task being performed on the basis of detection information output from the sensor means, wherein the determination means determines whether or not the adaptive task can be performed, on the basis of the result of integration of the degrees of reliability of the sensor means performed in each of the sub-divisions.

In the information processing apparatus according to the present invention, a determination is made as to whether or not performance of an adaptive task can be performed, on the basis of the result of integration of degrees of reliability of sensor means provided in respective sub-divisions of the detection space. As a result, the switching between adaptive tasks can be made in accordance with the current detection capability of the sensor means which send detection information to the information processing apparatus.

The present invention provides an information processing method for processing at least one detection information piece pertaining to the circumstances of inside of a predetermined detection space, the method comprising the operations of:

determining, on the basis of the detection information, first parameters pertaining to objects located in a plurality of pixels, the pixels corresponding to sub-divisions formed by dividing the detection space, and assigning the first parameters to respective pixels; and integrating the first parameters assigned to the pixels, on a per-pixel basis, and assigning a second parameter to the pixels, the second parameter being the result of integration of the first parameters.

In a case where the information processing method according to the present invention is utilized, the format of each of detection information pieces is made interchangeable with the format of a pixel. Subsequently, parameters are integrated into a single parameter on a per-pixel basis. Hence, detection information pieces using a parameter integration operation of single configuration can be integrated, without regard to the combination of formats of detection information.

BRIEF DESCRIPTION OF THE DRAWINGS

FIG. 10 is a flowchart for describing processing to be performed by the parameter integration section 15 provided in the information processing apparatus 1 shown in FIG. 1.

FIGS. 11A and 11B are charts for describing processing to be performed by a reliability integration section 19 provided in the information processing apparatus 1 shown in FIG. 1.

FIG. 15 is a flowchart for describing processing to be performed by a control information generation section 24 provided in the information processing apparatus 1 shown in FIG. 1.

FIG. 18 is a block diagram showing the configuration of an information processing apparatus according to a second embodiment of the present invention.

DETAILED DESCRIPTION OF THE PRESENT INVENTION

Figure 1:
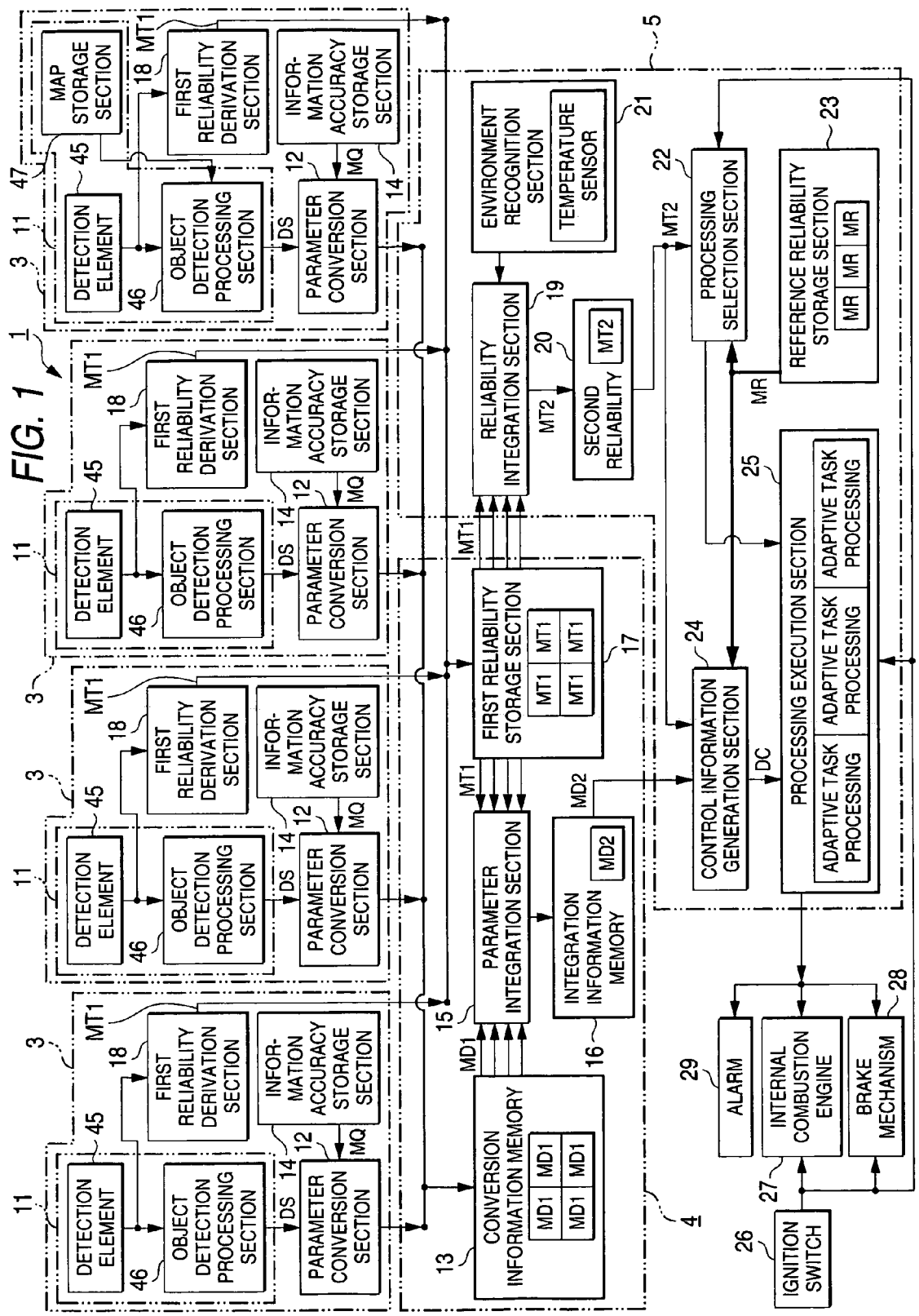
FIG. 1 is a block diagram showing the configuration of an information processing apparatus according to a first embodiment of the present invention.

FIG. 1 is a block diagram showing the configuration of an information processing apparatus 1 according to a first embodiment of the present invention. The information processing apparatus 1 comprises a sensor 11, a parameter conversion section 12, and a parameter integration section 15. Preferably, the information processing apparatus 1 further comprises converted information memory 13, an information accuracy storage section 14, integrated information memory 16, a first reliability storage section 17, a first reliability derivation section 18, a reliability integration section 19, second reliability memory 20, an environment recognition section 21, a processing selection section 22, a reference reliability storage section 23, a control information generation section 24, and a processing execution section 25. In the first embodiment, there are four sensors 11, and each of the sensors 11 comprises the parameter conversion section 12, the information accuracy storage section 14, and the first reliability derivation section 18.

The information processing apparatus 1 is divided into at least one information capturing apparatus 3, an information integration apparatus 4, and a control apparatus 5. Preferably, the information capturing apparatus 3 further includes the information accuracy storage section 14 and the first reliability derivation section 18. The information integration apparatus 4 includes at least a parameter integration section 15. Preferably, the information integration apparatus 4 includes the converted information memory 13, the integrated information memory 16, and the first reliability storage section 17. The controller 5 includes at least the control information generation section 24 and the processing execution section 25. Preferably, the controller 5 further includes the reliability integration section 19, the second reliability memory 20, the environment recognition section 21, the processing selection section 22, and the reference reliability storage section 23.

The sensor 11 detects circumstances of a predetermined space to be detected (hereinafter referred to as "detection space") and captures detection information DS about the thus-detected circumstances. Formats of detection information DS output from the sensors 11 of the information processing apparatus may differ from one another. Detailed contents of the detection information pieces DS output from the respective sensors 11 may differ from one another, so long as the detection information indicates the circumstances within the detection space. In a case where the vehicle is equipped with the information processing apparatus 1, the detection space corresponds to the space surrounding the vehicle.

The parameter conversion section 12 provided in each sensor 11 determines first parameters of one or more types on the basis of the detection information DS output from the sensor 11, and assigns the thus-determined first parameters to a pixel. Here, the pixel corresponds to one of divisions into which the detection space is divided. The first parameters assigned to a single pixel pertain to objects which are present within the pixel. Types of first parameters which can be assigned to a pixel are determined beforehand, and pixels are of uniform type. Throughout the specification, parameters act as constituent elements of information which constitutes a data set. Conversion information MD1 is formed from all first parameters which are assigned to a pixel, on the basis of the detection information DS output from the respective sensors 11. The conversion information MD1 corresponds to mapped information, and the conversion information MD1 is stored in the conversion information memory 13 for each sensor 11.

The information accuracy storage section 14 stores, for each sensor 11, the accuracy with which the sensor 11 detects an object within each pixel. Accuracy information MQ is formed from the accuracy of detection of objects which have been detected in all the pixels by the sensors 11. The accuracy information MQ corresponds to mapped information. The accuracy information MQ is used for converting parameters of the detection information DS.

The parameter integration section 15 integrates, for each pixel, all the first parameters assigned to a single pixel. A second parameter which is the result of integration of the first parameters is assigned to the pixel. Integration information MD2 consisting of second parameters assigned to all pixels corresponds to the result of integration of the detection information pieces DS output from all the sensors 11. The integration information MD2 is mapped information and stored in the integration information memory 16.

The first reliability storage section 17 stores, for each sensor 11, the degrees of first reliability assigned to all pixels. In connection with each sensor 11, the degree of first reliability assigned to a single pixel corresponds to the degree of reliability of the first parameters which are assigned to the pixel on the basis of the detection information DS output from the sensor 11. In each sensor 11, the first reliability derivation section 18 derives the degree of first reliability to be assigned to each pixel. In each sensor 11, first reliability information MT1 is formed from the degrees of first reliability assigned to all pixels. The first reliability information MT1 is mapped information and is used for processing first parameters in the sensor 11.

The reliability integration section 19 integrates, on a per-pixel basis, the degrees of first reliability assigned to a pixel. The result of integration of the degrees of first reliability is assigned to the pixel as the degree of second reliability. The degree of second reliability assigned to a single pixel corresponds to the degree of reliability of second parameters assigned to the pixel. Second reliability information MT2 is formed from the degrees of second reliability assigned to all pixels and corresponds to mapped information. The second reliability information MT2 is stored in second reliability memory 20. The environment recognition section 21 recognizes the circumstances of each of the sensors 11. The thus-recognized circumstances are used for computing the degree of second reliability.

From among all adaptive tasks which the processing execution section 25 can perform, the processing selection section 22 selects adaptive tasks which are allowed to be performed, on the basis of the latest degrees of second reliability of all the pixels. For each adaptive task which the processing execution section 25 can perform, the reference reliability storage section 23 stores a predetermined degree of reference reliability assigned to each pixel. The degree of reference reliability assigned to a single adaptive task is the lower limit of the second reliability assigned to each pixel in a case where execution of the adaptive task is allowed. Reference reliability information MR is formed from the degrees of reference reliability assigned to all pixels in connection with a single adaptive task. The reference reliability information MR is mapped information and used for selecting the adaptive task.

The control information generation section 24 produces control information DC pertaining to objects which are present within the detection space, on the basis of the integration information MD2. The processing execution section 25 performs a predetermined adaptive task, through use of either the integration information MD2 or the control information DC. In a case where adaptive tasks which are allowed to be performed have been selected, the processing execution section 25 performs at least one of the thus-selected adaptive tasks. The number of adaptive tasks which the processing execution section 25 can perform may be one or two or more. In the first embodiment, the processing execution section 25 can perform any of three possible adaptive tasks.

In the information processing apparatus 1, the parameter conversion section 12 converts the detection information DS output from each of the sensors 11 into conversion information pieces MD1 consisting of the first parameters assigned to all pixels. The contents of the conversion information MD1 pertaining to a single sensor 11 are equivalent to contents of the detection information DS output from the sensor 11. The conversion information pieces MD1 which are delivered from all the sensors 11 to the parameter integration section 15 are of uniform format. So long as the formats of information pieces delivered to the parameter integration section 15 are standardized, information pieces can be integrated through use of a parameter integration section 15 of single configuration, regardless of the combination of sensors 11. In a case where one of the sensors 11 is exchanged, the only requirement is that the configuration of the parameter conversion section 12 be changed so as to match the detection information DS output from a new sensor 11, thus obviating a modification to the integration of the detection information pieces DS performed by the parameter integration section 15.

The combination of sensors 11 is specified in accordance with information contents required by the processing execution section 25 for performing an adaptive task. A plurality of combinations of the sensors 11 are available in connection with a single adaptive task. The combinations of the sensors 11 which are actually stored in the information processing apparatus 1 are determined in consideration of all adaptive tasks which the processing execution section 25 can perform, as well as the productivity of the information processing apparatus 1. The parameter integration section 15 can be used without regard to the combinations of the sensors 11; the only requirement is that the information processing apparatus 1 always have the parameter integration section 15 of the same configuration without regard to the combinations of the sensors 11. As mentioned above, use of the parameter conversion section 12 enables manufacture of a variety of types of information processing apparatus through use of the parameter integration section 15 of single configuration, thereby curtailing costs for manufacturing the information processing apparatus 1.

In the information processing apparatus 1, the integration information MD2 or the control information DC is imparted to the processing execution section 25. Both the integration information MD2 and the control information DC are always maintained so as to assume a predetermined format, regardless of combination of sensors 11. Thus, information of single format is always imparted to the processing execution section 25 regardless of combination of sensors 11. The processing execution section 25 can perform a task without regard to combination of sensors 11. In a case where one of the sensors 11 of the information processing apparatus 1 is replaced, there is no need to change the processing operation of the processing execution section 25. As mentioned above, since the processing execution section 25 is available regardless of combination of sensors 11, the only requirement is that the information processing apparatus 1 always have the processing execution section of the same configuration, regardless of combination of sensors 11. As mentioned above, the information processing apparatus 1 is equipped with the parameter conversion sections 12 and the parameter integration section 15, and a variety of types of information processing apparatus can be manufactured through use of the processing execution section 25 of single configuration. Thus, costs for manufacturing the information processing apparatus 1 can be diminished further.

As mentioned above, so long as the information processing apparatus 1 is equipped with the parameter conversion sections 12, combination of sensors 11 can be changed without involvement of modification to the configuration of the parameter integration section 15 or to the processing execution section 25. As a result, in a case where the combination of sensors 11 is changed, the number of points of modification to the design of the information processing apparatus 1 according to the first embodiment becomes considerably smaller than the number of points of modification to the design of the information processing apparatus of the conventional art. Therefore, costs required for changing the design of the information processing apparatus 1 can be diminished. Format of the information delivered to the parameter integration section 15 is equal to that of the parameter formed from parameters assigned to pixels. The only requirement for integrating given information is that the parameter integration 15 integrate parameters on a per-pixel basis. Thus, processing for integrating information pieces is simplified as compared with processing required for integrating information according to the conventional art.

Throughout the accompanying drawings of the present specification, a detection space is schematically represented as if a three-dimensional space were projected onto a plane substantially parallel to the ground surface. Rectangular sub-divisions defined by a grid of broken lines correspond to pixels of the detection space. In the schematic representation of the detection space, arbitrary information consisting of parameters assigned to all pixels is schematically represented by means of writing parameters assigned to the pixels into sub-divisions corresponding to the pixels. Arbitrary reliability information consisting of degrees of reliability assigned to all pixels is schematically represented, by means of hatching the sub-divisions corresponding to the pixels in the detection space in accordance with the degree of reliability assigned to the respective pixel. The greater the density of hatching provided in a pixel, the higher the degree of reliability assigned to the pixel. Since an information parameter and the degree of reliability are assigned to each pixel, the degree of reliability and the information parameter can be handled equivalently. Throughout the specification, the direction substantially parallel to the travel direction of a vehicle equipped with the information processing apparatus 1 (hereinafter simply called a "vehicle") is referred to as a "longitudinal direction." The direction substantially perpendicular to the travel direction is called a "lateral direction." The downstream direction relative to the travel direction is called a "forward direction." The upstream direction relative to the travel direction is a "rearward direction." In addition, an area on either side of the axis parallel to the travel direction is called a "side."

Figure 2:
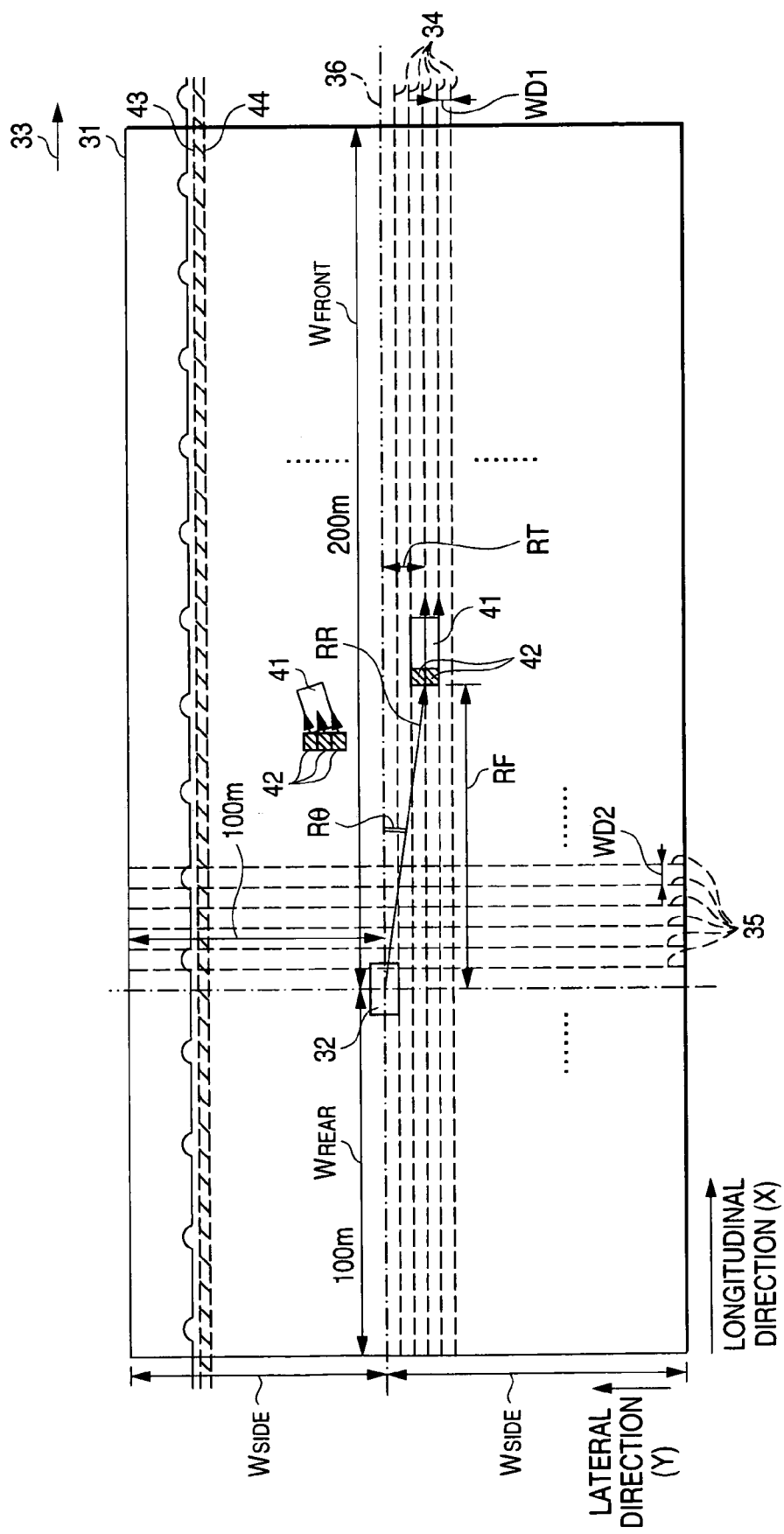
FIG. 2 is a schematic representation showing a detection area 31 specified in the information processing apparatus shown in FIG. 1.

FIG. 2 is a schematic representation showing the structure of a space to be detected 31 (hereinafter referred to simply as a "detection space 31"). In a case where a vehicle is equipped with the information processing apparatus 1, the detection space 31 is set so as to encompass the vehicle 32. The detection space 31 is set so as to contain at least a range required by the controller 5 for performing adaptive tasks; that is, a range in which objects must be detected for performing adaptive tasks. The detection space 31 is divided into a plurality of pixels. In the first embodiment, the vehicle 32 travels substantially parallel to the ground surface, and hence detection of objects in the vertical direction substantially perpendicular to the ground surface is omitted. The cross-sectional plane of the detection space 31 substantially parallel to the ground surface is divided into a plurality of sub-divisions. A columnar space which extends in the vertical direction and assumes a sub-division as a cross section is set as a pixel. If an object is present in any point within the columnar pixel, the object is deemed to be present in the pixel.

A preferable structure of the detection space 31 will now be described. In the detection space 31, the area forward of the vehicle 32 is wider than the area rearward of the vehicle 32. The center of the detection space 31 is located at a position ahead of the vehicle 32 within the detection space 31. By means of such structure of the detection space 31, the information processing apparatus 1 can detect an object ahead of the vehicle 32 more reliably. Particularly, in a case where there is a high possibility of the vehicle 32 approaching an object located ahead; for example, a case where the vehicle 32 is traveling, adaptive tasks of the vehicle 32 are performed through use of the detection information DS integrated from information pieces detected in the detection space 31 in which the area forward of the vehicle 32 is wider than the area backward of the same, as a result of which the vehicle 32 can react to an object located ahead more reliably. Thus, the controller 5 enables much safer driving of the vehicle 32. The width $W_{FRONT}$ from the front end of the detection space 31 to the vehicle 32 is preferably twice the width $W_{REAR}$ from the rear end of the detection space 31 to the vehicle 32.

More preferably, the area ahead of the vehicle 32 in the detection space 31 assumes a size corresponding to the travel speed of the vehicle 32. For example, the faster the travel speed of the vehicle 32, the wider the area ahead of the vehicle 32 within the detection space 31. Thereby, the information processing apparatus 1 can detect an object located ahead of the vehicle 32 more reliably. The vehicle 32 is located on a center line 36 extending in the longitudinal direction of the detection space 31. The width $W_{SIDE}$ from either side of the center line 36 to the side edge of the detection space 31 is preferably equal to the width $W_{REAR}$ from the vehicle 32 to the rear end of the detection space 31.

FIG. 2 shows one of the optimum examples of the detection space 31. As shown in FIG. 2, the detection space 31 is preferably divided into a grid pattern by means of a plurality of boundary surfaces 34 substantially parallel to a travel direction 33 of the vehicle 32 and a plurality of boundary surfaces 35 substantially perpendicular to the travel direction 33. The boundary surfaces 33 and 34 are planar surfaces and are substantially perpendicular to the ground surface. In the case shown in FIG. 2, the cross section of a single pixel parallel to the ground surface is square, and the cross sections of all pixels are arranged in a matrix pattern parallel to the ground surface. In FIG. 2, dotted lines representing the two types of boundary surfaces 33 and 34 are partially shown. In the example shown in FIG. 2, an interval WD1 between two adjacent boundary surfaces 34 substantially parallel to the travel direction 33 assumes a constant value of 0.5 m. An interval WD2 between two adjacent boundary surfaces 35 substantially perpendicular to the travel direction 33 assumes a constant value of 0.5 m. The width $W_{SIDE}$ from either side end of the detection space to the vehicle 32 assumes a value of 100 m. The width $W_{FRONT}$ from the forward end of the detection space to the vehicle 32 assumes a value of 200 m. Further, the width $W_{REAR}$ from the rear end of the detection space to the vehicle 32 assumes a value of 100 m.

Figure 3:
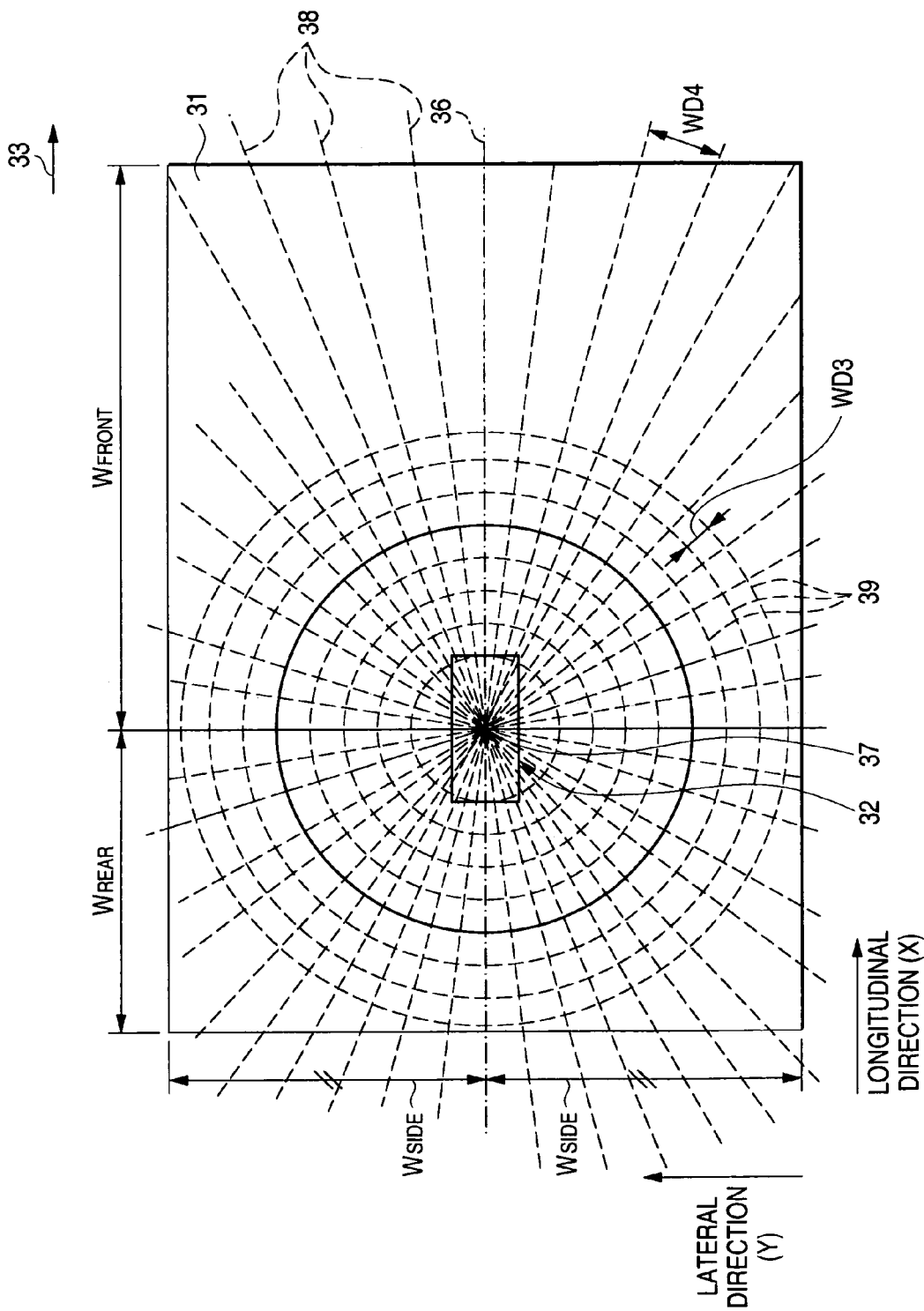
FIG. 3 is a schematic representation showing the detection area 31 specified in the information processing apparatus shown in FIG. 1.

FIG. 3 is a schematic representation showing another optimum example of detection space 31. As shown in FIG. 3, the detection space 31 is preferably divided into subdivisions by means of a plurality of boundary surfaces 38 radiating in all directions from a reference point 37, which point is a point within the vehicle 32, and a plurality of boundary surfaces 39 arranged concentrically around the reference point 37. The boundary surfaces 38 and 39 are substantially perpendicular to the ground surface. In the case shown in FIG. 3, the cross section of a single pixel parallel to the ground surface assumes the geometry of a sector. The cross sections of all pixels are arranged in parallel with the ground surface and in a concentric and radiating pattern. FIG. 3 shows portions of dotted lines representing the concentric boundary surfaces 39 and the radiating boundary surfaces 38. In the example shown in FIG. 3, interval WD3 between two adjacent concentric boundary surfaces 39 assumes a constant value of 0.5 m. Further, angle WD4 between adjacent two radiating boundary surfaces 38 assumes a constant value of 0.50.

Pixels located within the detection space 31 may differ in shape from each other. Preferably, the pixels are equal in shape to each other. The geometry of the pixel is not limited to a columnar shape, and the pixel may assume any shape. The cross section of a pixel substantially parallel to the ground surface is not limited to the shape of a rectangle or sector and may assume another geometry. Further, pixels are not limited to two-dimensional arrangement of columnar pixels and may be arranged three-dimensionally.

The smaller the pixels located within the detection space 31, the greater the improvement in processing accuracy of the information processing apparatus 1. For instance, the accuracy of conversion of detection information DS, the accuracy of integration of detection information DS, the accuracy of generation of control information DC, and the accuracy of selection of an adaptive task can be improved. The larger the pixels, the smaller their number, and hence the amount of processing performed by the information processing apparatus 1 decreases. The actual size of a pixel is set so as to achieve optimum balance between the processing accuracy of the information processing apparatus 1 and the amount of processing performed by the information processing apparatus 1. In the case of a columnar pixel as described in connection with the first embodiment, the smaller the cross-section of a pixel oriented substantially parallel to the ground surface, the greater the improvement in processing accuracy of the information processing apparatus 1.

The following description pertains to a case where pixels are arranged in a matrix pattern, as shown in FIG. 2, and where cross sections of all pixels parallel to the ground surface are congruent with each other. A pixel is assigned an ID number. In the following description, a two-dimensional coordinate system is set within the detection space 31, and positions of pixels and objects are represented by coordinates of the two-dimensional coordinate system. The point of origin of the two-dimensional coordinate system is coincident with the vehicle 32. The coordinate plane of the two-dimensional coordinate system is substantially parallel with the ground surface. The two-dimensional coordinate system may be either a rectangular coordinate system or a polar coordinate system.

The first reliability information MT1 concerning an arbitrary sensor 11 will now be described. In a case where the information processing apparatus 1 has the first reliability information MT1, the information processing apparatus 1 can perform processing pertaining to a first parameter in consideration of the first reliability information MT1. Accordingly, the accuracy of processing of a first parameter can be improved. At the time of performance of processing pertaining to first parameters assigned to arbitrary pixels, there is used a first reliability which is assigned to the pixels and pertains to a sensor 11 that has output the detection information DS used for calculating the first parameter.

Figure 4:
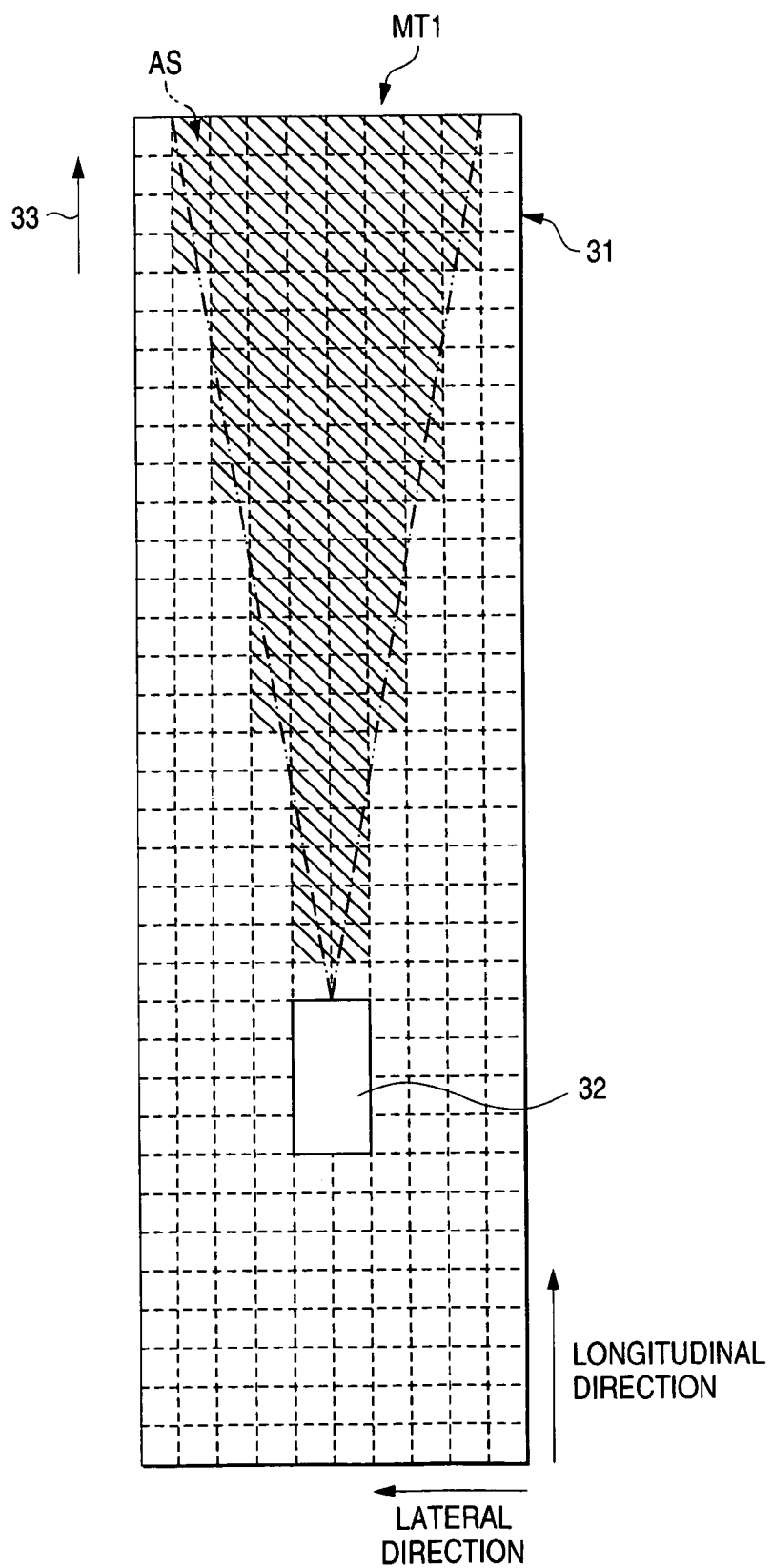
FIG. 4 is a chart showing first reliability information MT1 used in the information processing apparatus 1 shown in FIG. 1.

FIG. 4 is a schematic representation of the first reliability information MT1 used in a case where the sensor 11 is embodied as a radar. First reliability assigned to pixels located in an overlapping area between pixels and a detectable area AS of the sensor 11, the area being larger than a predetermined lower limit area, is higher than first reliability assigned to pixels located in an overlapping area which is smaller than the predetermined lower limit area. For instance, first reliability assigned to pixels located within an overlapping area of less than lower limit area assumes a minimum value of, for example, 0. The detectable area AS of the sensor 11 is an area—within the detection space 31 in which the sensor 11 can detect objects—and is determined by the configuration of the sensor 11. In a case where the sensor 11 is a radar, the detectable area AS is a range through which electromagnetic waves are emanated from radar scans.

The first reliability information MT1 concerning the sensor 11 is stored in the first reliability storage section 17. The first reliability information MT1 stored in the first reliability storage section 17 may be derived from the first reliability derivation 18 during operation of the information processing apparatus 1 or may be fixed information which has been stored in the first reliability storage section 17 beforehand. The first reliability derivation section 18 may derive the first reliability information MT1 which has been prepared beforehand. Alternatively, the first reliability derivation section 18 may determine first reliability according to the current detection capability of a corresponding sensor 11 on a per-pixel basis and derive the first reliability information MT1 consisting of the thus-determined first reliability. The fixed first reliability information MT1 is determined by means of evaluating the characteristics of the sensor 11 beforehand in a case where objects are located in respective pixels within the detection space 31. The first reliability derivation section 18 doubles as a reliability setting section for setting the reliability of the sensor 11 of each subdivision within the detection space 31; that is, the first reliability.

The preferable configuration of the first reliability information MT1 will now be described. In a case where the first reliability derivation section 18 derives first reliability, the thus-derived first reliability is set to a value corresponding to the detection capability of the sensor 11 during derivation of reliability. The lower the detection capability of the sensor 11, the lower the first reliability of the sensor 11. The pattern of variation in first reliability relative to detection capability may be continuous or stepwise. In the event of a failure arising in the sensor 11, the first reliability assigned to all the pixels of the sensor 11 is set to a lower limit value of 0. If the first reliability changes with the detection capability of the sensor 11, the information processing apparatus 1 can perform processing pertaining to the first parameter according to variations in detection capability, in consideration of changes in first reliability. Accuracy of processing of the first parameter can be improved to a much greater extent.

In a case where the first reliability is fixed without regard to a change in the detection capability of the sensor 11, the first reliability, which is a fixed value, is preferably corrected in accordance with the circumstances of a vehicle, and the thus-corrected first reliability is used for processing. The information processing apparatus 1 can perform processing pertaining to a first parameter in consideration of a change in the first reliability. Accuracy of processing pertaining to the first parameter can be improved to a much greater extent.

In a case where a plurality of first parameters are assigned to a single pixel, first reliability is set for each first parameter. If, of first parameters assigned to a single pixel, a single first parameter is a vector representing the traveling state of an object, the first reliability of the traveling-state vector is embodied as a single value collectively representing the reliability of the overall traveling-state vector. As a result, the information processing apparatus 1 can perform processing pertaining the traveling state of an object, in consideration of the reliability of the entire vector. In the above-described case, a plurality of values representing the reliability of individual vector components may be used as the first reliability of the traveling-state vector. As a result, the information processing apparatus 1 can perform processing pertaining to the traveling state of an object, in consideration of the reliability of individual vector components, thus improving the accuracy of processing.

In the first embodiment, the first reliability assigned to a single pixel is categorized into four types; first reliability of a longitudinal position; first reliability of a lateral position; first reliability of a longitudinal velocity; and first reliability of a lateral velocity. Here, the lateral position is a lateral component of a position coordinate represented by a orthogonal coordinate system, and the longitudinal velocity is a longitudinal velocity component. Here, the lateral velocity is a lateral velocity component.

Processing performed by the parameter conversion section 12 provided in an arbitrary sensor 11 will now be described. In the following description pertaining to the parameter conversion section 12, the sensor 11 prepares detection information DS for each object detected. The detection information DS pertaining to a single object contains the position and velocity of the detected object as parameters.

In each sensor 11, the parameter conversion section 12 assigns parameters of one or more types to a single pixel. One of first parameters of many types assignable to a single pixel corresponds to the degree of presence representing whether or not an object is present in a pixel. The degree of presence may be a value representing the presence or absence of an object, a proportion of presence, or a value expressed as a percentage; i.e., a value relative to a maximum value of 100. Another one of the first parameters assignable to a single pixel is a parameter representing the traveling state of an object located in a pixel. In a case where the conversion information MD1 contains the degree of presence of each pixel, the position of the object can be determined on the basis of the integration information MD2 as a parameter of the control information DC. In a case where the conversion information MD1 includes a parameter representing the traveling state of each pixel, there can be obtained a parameter representing the traveling state of an object on the basis of the integration information MD2 serving as a parameter of the control information DC.

In the first embodiment, the first parameters assignable to a single pixel located in a single sensor 11 include presence vectors [TRF, TRT], traveling-state vectors [VF, VT], and traveling-state reliability vectors [TVF, TVT]. The presence vectors [TRF, TRT] consist of a longitudinal presence TRF, which is a longitudinal component pertaining to the degree of presence of an object within a pixel, and a lateral presence TRT, which is a lateral component pertaining to the degree of presence of an object within the pixel. The traveling-state vectors [VF, VT] consist of a longitudinal velocity FV, which is a longitudinal component pertaining to the traveling speed of an object within a pixel, and a lateral velocity VT, which is a lateral component pertaining to the traveling state of an object within the pixel. The traveling-state reliability vectors [TVF, TVT] consist of reliability TVF of the longitudinal velocity VF and reliability TVT of the lateral velocity VT. In connection with the conversion information MD1, the position of the pixel relative to the vehicle 32 is deemed to be the position of an object within the pixel relative to the vehicle 32. Position vectors [RF, RT] of a pixel may be calculated beforehand and assigned to a pixel. Alternatively, the position vectors of a pixel may be calculated from a number assigned to a pixel and the arrangement of pixels in the detection space, as required.

FIG. 2 shows, in diagrammatic form and in an overlapping manner, an object located within the detection space 31, and first parameters based on the detection information pieces DS output from a plurality of sensors 11. A hatched pixel is assigned a presence vector indicating the presence of an object. Further, a pixel imparted with arrows is assigned traveling-state vectors corresponding to the traveling state of an object within the pixels. In a case where the rear end of a vehicle 41 which is traveling in the longitudinal direction is located in a certain pixel 42, presence vectors indicating presence of an object and traveling-state vectors indicating the driving state of a vehicle are assigned to the pixel 42. In a case where the rear end of an object straddles two or more pixels 42, the two parameters; that is, the presence vectors and the traveling-state vectors, are assigned to respective pixels 42. Further, in a case where the geometry of a road on which the vehicle 32 is currently driving is detected by means of the sensor 11 embodied as a navigation system, the positions of road sides relative to the vehicle 32 are ascertained. A guardrail 43 is deemed to be disposed along either side of the road. Hence, the pixels 44 corresponding to the position of the road side relative to the vehicle 32 are assigned presence vectors indicating the presence of an object.

The parameter conversion section 12 in principle assigns first parameters of a single sensor 11 to a pixel by means of the following procedures. First, the position of an individual pixel is compared with the position of an object which is a parameter of the detection information DS output from the sensor 11. A pixel whose position matches the position of the object is selected. Next, first parameters are set on the basis of the detection information DS, and the thus-set first parameters are assigned to only the selected pixel. In a case where first parameters are set in accordance with the result of comparison between the position of the object and the position of the pixel, the format of a parameter of the detection information DS can be readily converted to the format of a parameter of the conversion information MD1.

By way of example, the longitudinal and lateral components of the velocity of an object, which velocity is one of the parameters of the detection information DS, are respectively substituted into the longitudinal velocity VF and lateral velocity VT of a first parameter assigned to the pixel selected on the basis of the detection information DS. The first reliability of the longitudinal position assigned to the thus-selected pixel is substituted into the longitudinal presence TRF. Similarly, the first reliability of the lateral position assigned to the selected pixel is substituted into the lateral presence TRF; the first reliability of the longitudinal velocity assigned to the pixel is substituted into the longitudinal velocity reliability TVF; and the first reliability of lateral velocity assigned to the pixel is substituted into the lateral speed reliability TVT. First parameters of specified values may be assigned to pixels which remain unselected. Alternatively, it may be the case that the first parameters are not assigned to the pixels, leaving the pixels without first parameters.

Preferably, in an arbitrary sensor 11, accuracy information MQ stored in the information accuracy storage section 14 of the sensor 11 is preferably used for converting detection information DS output from the sensor 11. In each sensor 11, the accuracy information MQ is preferably provided for each of the parameters constituting the detection information DS. In a case where the detection information DS output from the sensor 11 includes the position of a detected object [RR, Rθ] and the velocity of the detected object, the information accuracy storage section 14 stores the accuracy information MQ of a distance RR, the accuracy information MQ of an angle Rθ, and the accuracy information MQ of velocity.

Figure 5:
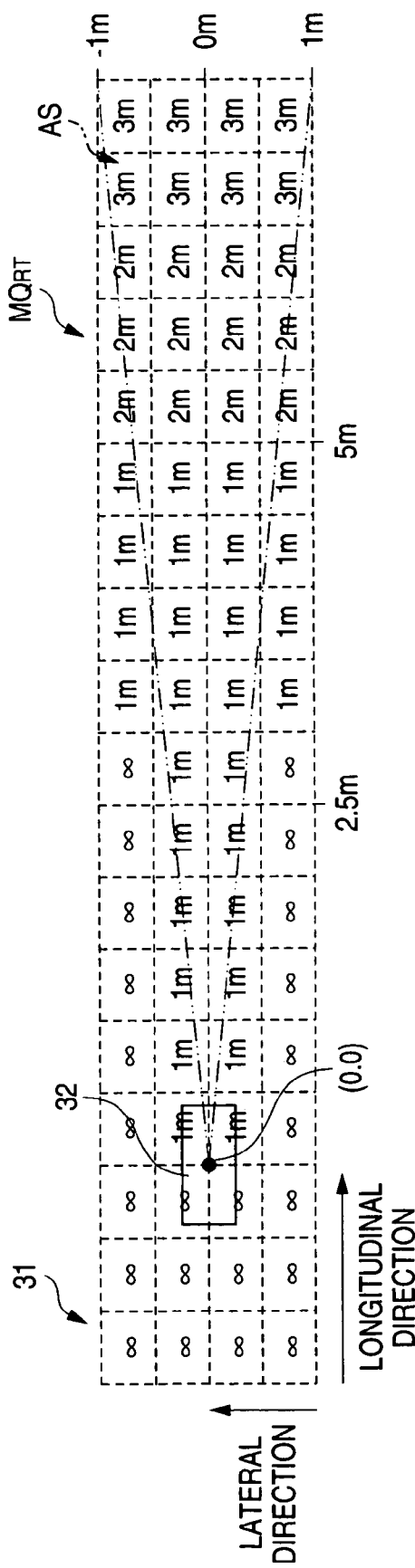
FIG. 5 is a chart showing accuracy information MQ used in the information processing apparatus 1 shown in FIG. 1.

FIG. 5 is a schematic representation showing accuracy information $MQ_{RT}$ concerning the lateral position RT of a position vector. In the example shown in FIG. 5, the cross section of a pixel parallel to the ground surface is a square measuring 0.5×0.5 m. The width $W_{FRONT}$ from the vehicle 32 to the front end of the detection space 31 assumes a value of 7.5 m, and the width $W_{SIDE}$ from the vehicle 32 to either side of the detection space 31 assumes a value of 1 m. The width $W_{REAR}$ from the vehicle 32 to the rear end of the detection space 31 assumes a value of 1.5 m. In connection with the accuracy information $MQ_{RT}$ concerning the lateral position RT, accuracy of finite value is assigned to those pixels which at least partially fall within the detectable area AS of the information capturing apparatus 3 within the detection space 31. Further, accuracy of finite value is assigned to pixels located in the vicinity of the detectable area AS. In contrast, infinite accuracy "∞" is assigned to pixels distantly separated from the detectable area AS. The smaller the accuracy assigned to a pixel, the higher the accuracy of recognition of the pixel in which an object is detected and for which the detection information DS is output.

Figure 6:
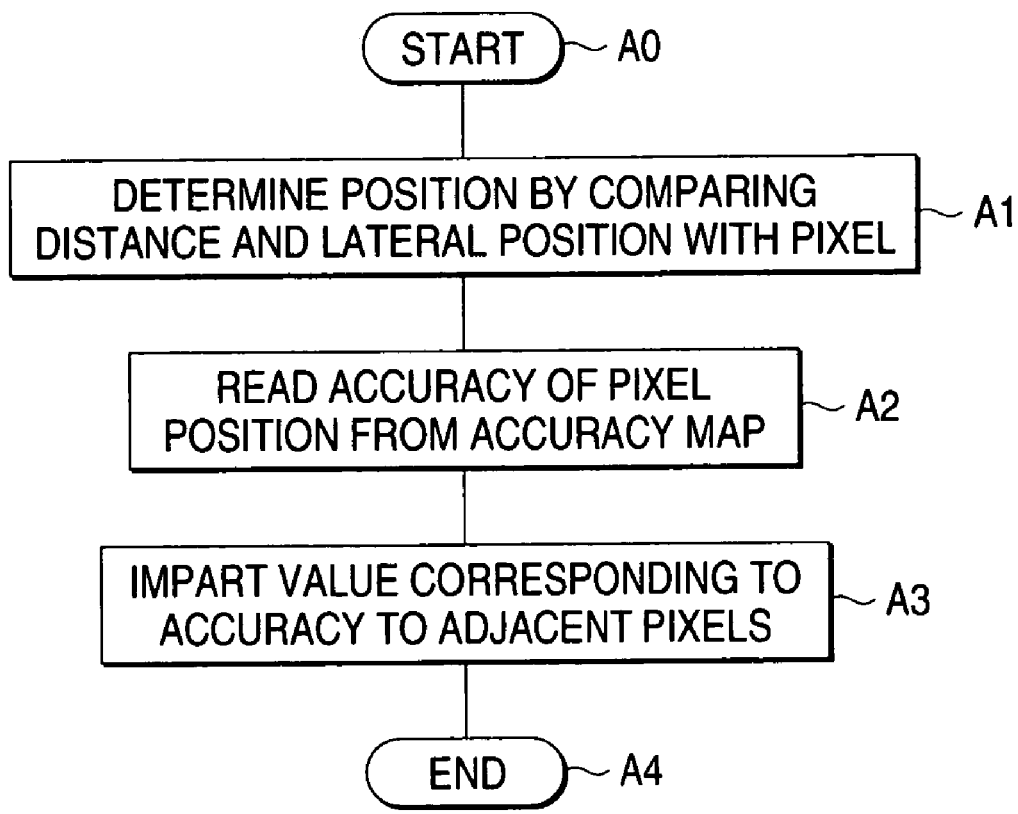
FIG. 6 is a flowchart for describing processing to be performed by a parameter conversion section 12 provided in the information processing apparatus 1 shown in FIG. 1.

FIG. 6 is a flowchart for describing a case where the accuracy information MQ is used for the parameter conversion section 12. After the detection information DS has been output from the sensor 11, processing proceeds from step A0 to A1. In step A1, the position of an individual pixel is compared with the position (RR, Rθ), which is a parameter of the detection information DS. There is selected a pixel whose position matches the position of the object. In step A2, the accuracy of a longitudinal position of the pixel selected in step A1 and the accuracy of a lateral position of the pixel are derived from the accuracy information MQ concerning longitudinal and lateral positions of the sensor 11 that has output the detection information DS.

In the detection space 31, all pixels which include the pixels selected in step A1 and are located within a processing range corresponding to the accuracy of longitudinal and lateral positions read in step A2 are objects to be assigned first parameters. Here, the processing range comprises a range which has a width corresponding to the accuracy of a lateral position and extends from either side of the pixel selected in step A1. Further, the processing range comprises a range which has a width corresponding to the accuracy of a longitudinal position and extends forward and rearward of the pixel selected in step A1.

In step A3, the first parameters based on the detection information DS are set, and the first parameters are assigned to all pixels located within the processing range within the detection space 31. In step A4, conversion of parameters is completed. As mentioned above, in a case where the first parameters are set in accordance with the accuracy of the detection information DS as well as the result of comparison between the position of the pixel and the position of the object, the accuracy of conversion of the detection information DS performed by the parameter conversion section 12 is improved as compared with a case where the accuracy information MQ is not used.

Figure 7A:
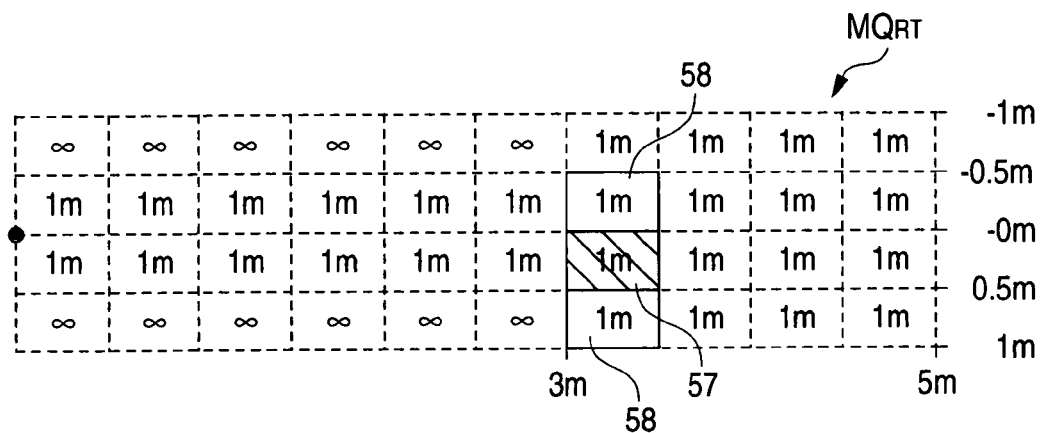
FIGS. 7A to 7C are charts for describing processing to be performed by the parameter conversion section 12 provided in the information processing apparatus 1 shown in FIG. 1.
Figure 7B:
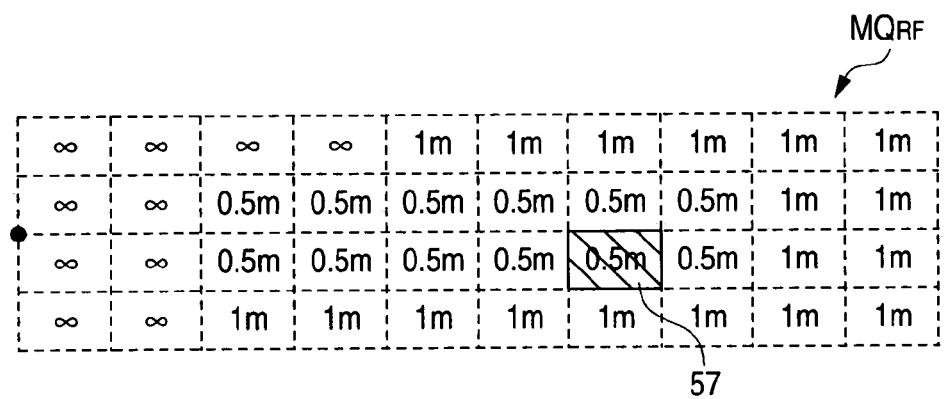
Figure 7C:
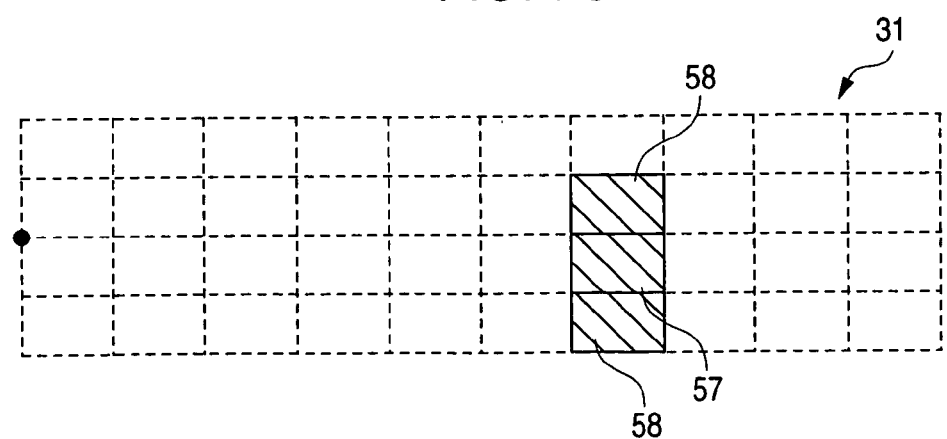

The accuracy information $MQ_{RT}$ concerning a lateral position shown in FIG. 7A is a portion of the accuracy information $MQ_{RT}$ concerning a lateral position shown in FIG. 5. FIG. 7B shows accuracy information $Q_{RF}$ concerning a longitudinal position corresponding to a portion of the accuracy information $MQ_{RT}$ shown in FIG. 7A. In connection with the detection information DS, there will be described a case where the object assumes a longitudinal position of 3.2 m and a lateral position of +0.3 m and a velocity of 10 km/h. On the basis of the detection information DS, a hatched pixel 57 shown in FIGS. 7A and 7B is selected. The thus-selected pixel 57 has an accuracy of lateral position of 1 m and assumes a size of 0.5×0.5 m. On the basis of the accuracy of lateral position, there are further selected two pixels 58 which are disposed laterally adjacent to the pixel 57 selected in step A1. The accuracy of position in the longitudinal direction assumes a value of 0.5 m and the pixel assumes a size of 0.5×0.5 m. Hence, on the basis of the accuracy of longitudinal position, there is selected only the selected pixel 57. As shown in FIG. 7C, the three pixels 57 and 58 arranged side by side are assigned first parameters.

Processing of the parameter integration section 15 will be described hereinbelow. In a case where a plurality of types of first parameters are available in a single sensor 11, a plurality of second parameters are also available, as in the case with the first parameters. In this case, all the first parameters assigned to pixels are integrated according to the type of parameter. The result of integration of first parameters of the same type is taken as a second parameter of the same type. In the present embodiment, the second parameter includes presence vectors [TRFM, TRTM] consisting of longitudinal presence TRFM and lateral presence TRTM; traveling-state vectors [VFM, VTM] consisting of longitudinal velocity VFM and lateral velocity VTM; and traveling-state reliability vectors [TVFM, TVTM] consisting of longitudinal velocity reliability TVFM and lateral velocity reliability TVTM. Pixels that are not assigned first parameters may be assigned second parameters of specified values. Alternatively, the pixels may be left as they are without being assigned second parameters.

In the integration of first parameters, calculation of second parameters from the first parameters and assignment of the second parameters to a pixel are performed on a per-pixel basis. Preferably, calculation of second parameters is performed with regard to only those pixels assigned first parameters. Hence, calculation of second parameters is not performed with regard to those pixels not assigned first parameters or pixels assigned first parameters of specified values. As a result, the amount of processing pertaining to integration of first parameters can be diminished, thereby reducing a load imposed on the parameter integration section 15.

Next will be described a preferable construction of the parameter integration section 15 for calculating second parameters with regard to an arbitrary single pixel located in the detection space 31. In a case where a pixel is assigned only a single first parameter, the first parameter is assigned to the pixel as a second parameter. In a case where a pixel is assigned a plurality of first parameters, all the first parameters are integrated. The result of integration of the first parameters is assigned to the pixel as a second parameter. The result of integration of all the first parameters assigned to a single pixel is, for example, an average of all the first parameters. The result of integration of all the first parameters assigned to a single pixel may be a weighted mean of all the first parameters. Alternatively, the result of integration of all the first parameters may be the value of any one of all the first parameters, which is compliant with predetermined selection requirements. As a result, an accurate second parameter can be acquired.

Preferably, the degree of first reliability is taken into consideration at the time of calculation of a second parameter. By way of example, of all the first parameters assigned to a pixel, only the first parameters whose first reliability exceeds a predetermined lower threshold are integrated. The lower threshold assumes a minimum value of, for example, 0.

Figure 8:
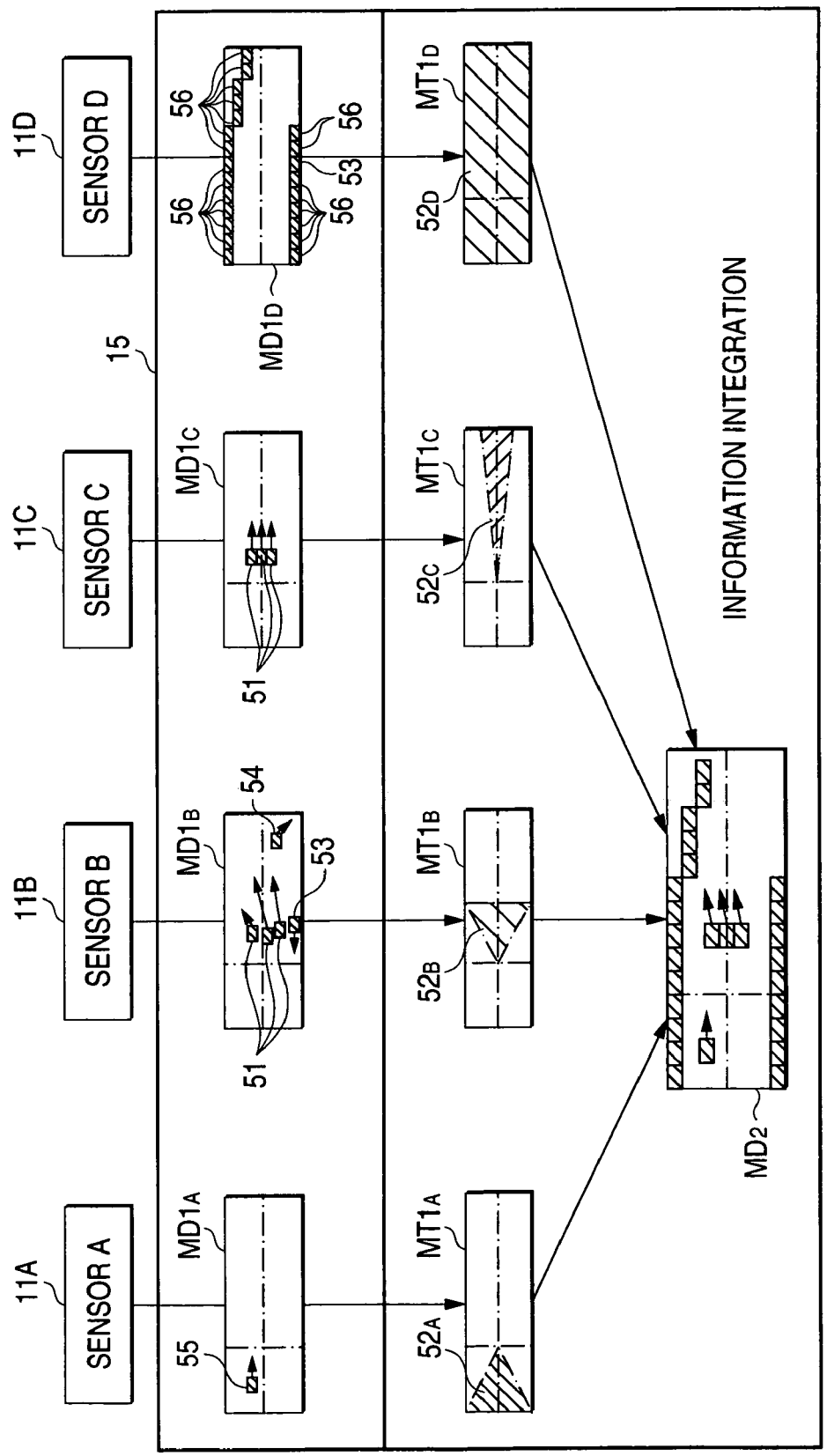
FIG. 8 is a flowchart for describing processing to be performed by a parameter integration section 15 provided in the information processing apparatus 1 shown in FIG. 1.

FIG. 8 is a schematic representation for describing integration of parameters in a case where the degree of first reliability is taken into consideration at the time of calculation of a second parameter. In the example shown in FIG. 8, conversion information $MD1_A$, $MD1_B$, $MD1_C$, and $MD1_D$ are formed from information captured by four sensors $11_A$, $11_B$, $11_C$, and $11_D$, respectively. Further, first reliability information $MT1_A$ is assigned to the sensor $11_A$; first reliability information $MT1_B$ is assigned to the sensor $11_B$; first reliability information $MT1_C$ is assigned to the sensor $11_C$; and first reliability information $MT1_D$ is assigned to the sensor $11_D$. Integration information MD2 is produced through use of the conversion information pieces $MD1_A$, $MD1_B$, $MD1_C$, and $MD1_D$ and the first reliability information pieces $MT1_A$, $MT1_B$, $MT1_C$, and $MT1_D$. An allowable range 52A specified by the first reliability information $MT1_A$, an allowable range 52B specified by the first reliability information $MT1_B$, an allowable range 52C specified by the first reliability information $MT1_C$, and an allowable range 52D specified by the first reliability information $MT1_p$ are formed from the pixels assigned the first reliability which exceeds the lower threshold required at the time of calculation of a second parameter.

A pixel 51 is located within the allowable range $^{52}$B specified by the first reliability information $MT1_B$ assigned the second sensor $11_B$. Further, the pixel 51 is assigned a first parameter produced by the second sensor $11_B$. The pixel 51 is included in the allowable range $52_C$ specified by the first reliability information $MT1_C$ pertaining to the third sensor $11_C$. Further, the pixel 51 is assigned a first parameter produced by the third sensor $11_C$. For this reason, the degree of presence of an object indicated by the second parameter assigned to the pixel 51 is improved as compared with the degree of presence indicated by the first parameters which are assigned to the pixel 51 and are produced by the second and third sensors $11_B$ and $11_C$.

A pixel 53 is included in the allowable range $52_D$ specified by the first reliability information $MT1_D$ pertaining to the fourth sensor $11_D$. The pixel 53 is assigned a first parameter produced by the fourth sensor $11_D$ and is located in a boundary area of the allowable range $52_B$ of the second sensor $11_B$. Further, the pixel 53 is assigned a first parameter produced by the second sensor $11_B$. For this reason, at the time of generation of a second parameter to be assigned to the pixel 53, there are used only the presence vector of all the first parameters produced by the fourth sensor $11_D$ and the presence vector of the first parameter based on the second sensor $11_B$. The degree of presence indicated by the second parameter assigned to the pixel 53 is improved as compared with the degree of presence indicated by the first parameter produced by the fourth sensor $11_D$. The traveling-state vector of the second parameter assigned to the pixel 53 indicates a velocity of 0. The first parameter produced by the second sensor $11_B$ is assigned to a pixel 54 which is located outside the allowable range $52_B$ specified by the first reliability information $MT1_B$ pertaining to the second sensor $11_B$. The first parameter assigned to the pixel 54 is not used for calculation of the second parameter, and hence the second parameter is not assigned to the pixel 54.

A pixel 55 is included in the allowable range $52_A$ specified by the first reliability information $MT1_A$ pertaining to the first sensor $11_A$. The pixel 55 is assigned the first parameter produced by the first sensor $11_A$. Since the pixel 55 is not assigned first parameters produced by the other sensors $11_B$ to $11_D$, the second parameter assigned to the pixel 55 is set on the basis of only the first parameters produced by the first sensor $11_A$. Similarly, of pixels which are included in the allowable range $52_D$ specified by the first reliability information $MT1_D$ pertaining to the fourth sensor $11_D$ and assigned the first parameters produced by the first sensor $11_A$, remaining pixels 56—except the pixel 53 assigned the first parameter produced by the second sensor $11_B$—are not assigned the first parameters produced by the other sensors $11_A$ to $11_C$. The second parameter assigned to the pixel 56 is set on the basis of only the first parameter produced by the fourth sensor $11_D$.

According to another example in which a second parameter is calculated while the degree of first reliability is taken into account, the first parameters assigned to a pixel are weighted by first reliability, and the thus-weighted first parameters are integrated into a second parameter. In connection with calculation of a second parameter, the higher the degree of first reliability, the greater the influence imposed on the second parameter by the first parameters. For this reason, the accuracy of a second parameter is improved to a much greater extent. According to still another example of calculation of a second parameter while first reliability is taken into consideration, the degrees of first reliability of the first parameters assigned to a pixel are compared with each other. The first parameter having the highest degree of reliability is taken as a second parameter. During calculation of a second parameter, the first parameter having a high degree of reliability is deemed to be a second parameter. Hence, the accuracy of the second parameter is improved to a much greater extent.

Figure 9:
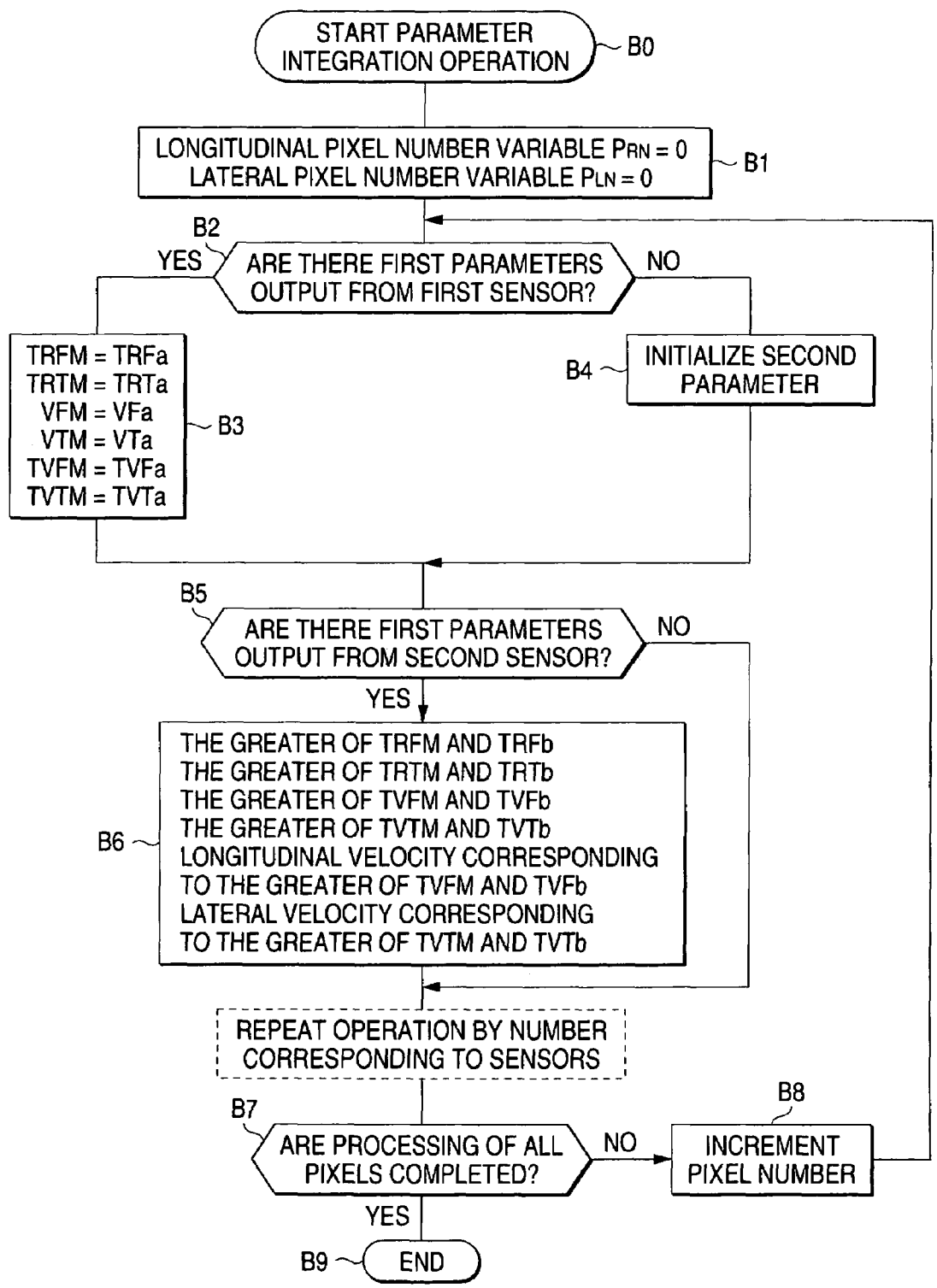
FIG. 9 is a flowchart for describing processing to be performed by the parameter integration section 15 provided in the information processing apparatus 1 shown in FIG. 1.

FIG. 9 is a flowchart for describing integration of first parameters performed by the parameter integration section 15 while taking into consideration first reliability. In the example shown in FIG. 9, the parameter integration section 15 is arranged so as to enable integration of the detection information DS output from the sensor 11A and the detection information DS output from the sensor 11B. A first integration operation is commenced at a point in time when the processing execution section 25 requires the integration information MD2 or the control information DC, or after the latest conversion information MD1 pertaining to at least one sensor 11 has been produced. After commencement of the first parameter integration operation, processing proceeds from step B0 to step B1. In step B1, an initial value of 0 is substituted into a longitudinal pixel number variable PRN and into a lateral pixel number variable PLN. Of all the pixels located in the detection space 31, any pixel assigned a number equal to the value of a latest PLN is selected as a pixel to be subjected to calculation of a second parameter (pertaining to steps B2 to B7) (hereinafter referred to simply as a "target pixel").

In step B2, a determination is made as to whether or not the first parameter produced by the first sensor 11A of all the sensors 11 provided in the information processing apparatus 1 is assigned to the target pixel. In a case where the first parameter is assigned to the target pixel, processing proceeds to step B3. In contrast, in a case where the first parameter is not assigned to the target pixel, processing proceeds to step B4. In step B3, the first parameter—which is assigned to the latest target pixel and produced by the first sensor 11A—is substituted into the second parameter assigned to the target pixel. In the first embodiment, as expressed by Eqs. 1 through 6, a plurality types of first parameters are substituted into the second parameters of the same type. TRFa designates the degree of longitudinal presence of the first parameter produced by the first sensor 11A; TRTa designates the degree of lateral presence of the first parameter; VFa designates the longitudinal velocity of the first parameter; VTa designates the lateral velocity of the first parameter; TVFa designates the degree of longitudinal velocity reliability of the first parameter; and TVTa designates the degree of lateral velocity reliability of the first parameter. In step B4, a predetermined initial value is substituted into the second parameter for initializing the second parameter assigned to the target pixel. The lower limit of reliability, "0," is substituted into elements of the second parameter; that is, the degree of longitudinal reliability, the degree of lateral presence, the degree of longitudinal velocity reliability, and the degree of lateral velocity reliability.

$$TRFM = TRFa \tag{1}$$

$$TRTM = TRTa \tag{2}$$

$$VFM = VFa \tag{3}$$

$$VTM = VTa \tag{4}$$

$$VTFM = TVFa \tag{5}$$

$$TVTM\ TVTa \tag{6}$$

In step B5, a determination is made as to whether or not the first parameter produced by the second sensor 11B of all the sensors 11 of the information processing apparatus 1 is assigned to the target pixel. Only in a case where the first parameter is assigned to the target pixel, processing proceeds to step B6. In contrast, if the first parameter is not assigned to the target pixel, processing proceeds to step B7. In step B6, the current second parameter assigned to the target pixel is updated.

As represented by Eq. 7, there is determined a magnitude of degree of longitudinal presence between the longitudinal presence TRFM of the current second parameter assigned to the target pixel and the longitudinal presence TRFM of the first parameter produced by the second sensor 11B and assigned to the target pixel. In a case where the longitudinal presence TRFM of the second parameter is greater than the longitudinal presence TRFMb of the first parameter produced by the second sensor 11B, the longitudinal presence TRFM of the current second parameter is held in its present form. In contrast, if the longitudinal presence TRFM of the second parameter is less than the longitudinal presence TRFMb of the first parameter produced by the second sensor 11B, the longitudinal presence TRFMb of the first parameter is substituted into the longitudinal presence TRFM of the second parameter and is updated. Similarly, as expressed by Eqs. 8 through 10, the lateral presence TRTM of the current second parameter is compared with the lateral presence TRTb of the first parameter produced by the second sensor 11B; the longitudinal velocity reliability TVFM of the current second parameter is compared with the longitudinal velocity reliability TVFb of the first parameter; and the lateral velocity reliability TVTM of the current second parameter is compared with the lateral velocity reliability TVTb of the first parameter. The greater value of each pair is substituted into the lateral presence TRTM of the second parameter, into the longitudinal velocity reliability TVFb of the second parameter, and into the lateral velocity reliability TVTb, thereby updating the lateral presence TRTM, the longitudinal velocity reliability TVFb, and the lateral velocity reliability TVTb.

$$TRFM = \text{the greater of TRFM and TRFb} \tag{7}$$

$$TRTM = \text{the greater of TRTM and TRTb} \tag{8}$$

$$TVFM = \text{the greater of TVFM and TVFb} \tag{9}$$

$$TVTM = \text{the greater of TVTM and TVTb} \tag{10}$$

As represented by Eq. 11, in a case where the longitudinal velocity reliability TVFM of the second parameter is determined to be greater on the basis of the result of comparison expressed by Eq. 9, the longitudinal velocity VFM of the second parameter is maintained in its present form. In contrast, if the longitudinal velocity reliability TVFM of the second parameter is determined to be smaller, the longitudinal velocity VFb of the first parameter produced by the second sensor 11B and assigned to the target pixel is substituted into the longitudinal velocity VFM. Similarly, as expressed by Eq. 12, on the basis of the result of comparison expressed by Eq. 10, the longitudinal velocity of a parameter having a greater traveling velocity directional reliability is substituted into the longitudinal velocity VFM of the second parameter, thus updating the longitudinal velocity VFM.

VFM=the greater of longitudinal velocity corresponding to TVFM and TVFb        (11)

VTM=the greater of lateral velocity corresponding to TVTM and TVTb        (12)

In step B7, a determination is made as to whether or not calculation of a second parameter has been completed with regard to all pixels located within the detection space. In a case where there still remain pixels which have not yet been selected as target pixels, in step B8 either a longitudinal or lateral pixel number variable is incremented so as to specify the number of a non-selected pixel. After the variable has been incremented, processing returns to step B2. In a case where processing pertaining to steps B2 through B6 has already been completed, a parameter integration operation is completed in step B9. At the time of completion of a parameter integration operation, the value substituted into the second parameter is determined as a second parameter.

In a case where the parameter integration section 15 is able to integrate detection information pieces DS output from three or more sensors 11, processing for updating a second parameter produced by the third sensor and those assigned to subsequent sensors 11 is interposed between steps B6 and B7 of the flowchart shown in FIG. 9. During the course of updating of a second parameter produced by an arbitrary sensor 11 of the third or subsequent sensors 11, a determination is made as to whether or not the first parameter produced by the sensor 11 is assigned to the target pixel. Only in a case where the first parameter is assigned to the target pixel, the current second parameter assigned to the target pixel is updated according to the first parameter produced by the sensor 11. Detailed procedures for updating the second parameter are identical with the updating procedures described in connection with Eqs. 9 through 14, except that the first parameter produced by the sensor 11 which is an object of processing is used in lieu of the first parameter produced by the second sensor 11.

In connection with the first parameter integration operation, calculation of a second parameter is preferably performed with regard to only the pixel assigned the first parameter produced by the sensor 11. As a result, the amount of processing pertaining to integration of first parameters can be diminished, thereby reducing a load imposed on the parameter integration section 15. More preferably, the parameter integration section 15 integrates parameters of the detection information DS on a per-pixel basis and associates the thus-integrated parameters with a pixel. Through use of the parameters of detection information DS which are associated with a pixel and have been integrated, second parameters of the pixel are determined. As mentioned above, in a case where conversion of parameters of detection information DS has not been performed for each sensor 11 and where a second parameter is determined directly from parameters of the detection information DS, shortening of the time required for integrating the detection information DS becomes possible. In this case, the parameter integration section 15 doubles as a parameter conversion section 12, and hence omission of the parameter conversion section 12 and the conversion information memory 13 become possible, thereby simplifying the configuration of the information processing apparatus 1.

The first reliability of the first parameter assigned to a pixel including the position of an object—which is one of parameters of detection information DS—is equal in type with parameters of the detection information DS. During integration of parameters of detection information DS, the first reliability of the first parameter is used as the reliability of parameters of the detection information DS. In a case where only a single object is located within a single pixel, parameters of detection information DS including the position of the object as a parameter are assigned in their present form to the pixel including the object. In a case where objects of two or more detection information pieces DS including parameters of the same type are included in a single pixel, only the single parameter having the greatest degree of reliability of the parameters from among the two or more information pieces DS is imparted to the pixel including the object which serves as a computation value. As mentioned above, the reliability of the parameter of the detection information DS, which parameter is assigned to the pixel as a computation value, is employed as the reliability of a computation value. By means of the foregoing operation, parameters of detection information DS are integrated into a single parameter on a per-pixel basis according to the type of parameter. A second parameter of each pixel is calculated on the basis of the computation value assigned to the pixel. In a case where an adaptive task using the integration information MD2 has already been specified, the lower threshold of reliability of a computation value has already been specified according to an adaptive task using the integration information MD2. A second parameter is determined for each pixel through use of only a computation value whose reliability is greater than the lower threshold.

FIG. 10 is a flowchart for describing a detection information integration operation including conversion of detection information DS and integration of first parameters. In the example shown in FIG. 10, the detection information integration operation is arranged so as to be able to integrate detection information pieces DS output from sensors 11. Object position vectors of the detection information pieces DS output from the sensors 11 are expressed in polar coordinates. Further, a presence vector, a traveling state, and traveling-state reliability are used as second parameters. The presence vectors consist of the degree of presence of a distance (hereinafter referred to as "distance presence") which represents the degree of reliability of a distance RR of the pixel position vectors [RR, Rθ] expressed in polar coordinates, and the degree of presence of an angle (hereinafter referred to as "angle presence") which represents the degree of reliability of an angle Rθ of the pixel position vectors [RR, Rθ]. Processing proceeds from step C0 to step C1.

In step C1, sensors 11 capture detection information DS. In the example illustrated in FIG. 10, detection information $DS_A$ captured by a first sensor 11A includes object position vectors [Ra, θa]. The detection information $DS_B$ captured by a second sensor 11B includes object position vectors [Rb, θb] and an object velocity Vb. In step C2, a pixel whose position vectors are equal to the object position vectors of the detection information DS captured by a sensor 11 is selected for each sensor 11. Subsequently, the first reliability of respective first parameters corresponding to a sensor 11 with regard to a selected pixel is determined for each sensor 11, on the basis of the first reliability information MT1 of parameters of a pixel position corresponding to the sensor 11. In the example shown in FIG. 10, first distance reliability TRa is determined from an object distance Ra. Further, first angle reliability Tθa is determined from an object angle θa. In connection with the second sensor 11B, first distance reliability TRb is determined from an object distance Rb. Further, first angle reliability Tθb is determined from an object angle θb, and first velocity reliability TVb is determined from the velocity of an object.

Processing pertaining to steps C3 through C15 is for integrating parameters of detection information pieces DS currently captured by all the sensors 11, to thereby produce a computation value for use in calculating a second parameter. Processing pertaining to steps C3 through C8 is for integrating parameters regarding an object distance included in the detection information pieces DS. In step C3, a determination is made as to whether or not a plurality of object distances are currently captured. In a case where an object distance is captured by either the first sensor 11A or the second sensor 11B, processing proceeds from step C3 to step C8. In this case, the object is employed as a distance for calculating a second parameter (hereinafter referred to as a "computation distance") Further, the first reliability of distance obtained from the thus-employed object distance in step C2 is employed as the reliability of the computation distance. In a case where an object distance is captured by the first sensor 11A and another object distance is captured by the second sensor 11B, processing proceeds from step C3 to C4.

In step C4, a determination is made as to whether or not an object position [Ra, θa] of detection information DSA captured by the first sensor 11A and an object position [Rb, θb] of detection information DSB captured by the second sensor 11B are located in a single pixel. If the pixel in which the object position [Ra, θa] of the detection information DSA is located differs from the pixel in which the object position [Rb, θb] of the detection information DSB is located, two currently available object distances Ra and Rb are individually employed as computation distances in step C5. The first distance reliability TRa determined in step C2 from the thus-adopted object distance Ra and the first distance reliability TRb determined in step C2 from the object distance Rb are adopted as computation distance reliability. In contrast, in a case where the objects detected by means of detection information pieces DS are located within a single pixel, processing proceeds from step C4 to step C6.

In step C6, the first distance reliability TRa determined from the object distance Ra captured by the first sensor 11A is compared with the first distance reliability TRb determined from the object distance Rb captured by the second sensor 11B. In a case where the first distance reliability TRa is greater than the first distance reliability TRb, in step C7 the first distance reliability TRa is adopted as the distance reliability TR of a parameter to be processed (hereinafter referred to as a "process parameter"). Further, the object distance Ra captured by the first sensor 11A is adopted as a distance R for use in calculating the process parameter. In a case where the first reliability TRa is less than the first reliability TRb, in step C8 the first reliability TRb is employed as distance computation reliability TR of the process parameter. Further, the object distance Rb captured by the second sensor 11B is employed as a distance R for use in calculating the process parameter (hereinafter referred to as a "computation distance R").

Processing pertaining to steps C9 through C14 is for integrating object angles of detection information pieces DS. Processing pertaining to steps C9 through C14 is equal to processing pertaining to steps C3 through C8, except that an object angle and first angle reliability are used in lieu of an object distance and first distance reliability and that an angle θ for computation (also called "computation angle θ") and angle reliability Tθ for computation (also called "angle computation reliability Tθ") are determined in lieu of the computation distance R and the distance computation reliability TR. Processing pertaining to steps C15 and C16 is for integrating information pieces pertaining to object velocity of detection information pieces DS. In step C15, a determination is made as to whether or not a plurality of information pieces pertaining to object velocity are currently available. In a case where only a single information piece pertaining to object velocity is available, the object velocity is adopted as velocity V for computation purpose (hereinafter referred to as "computation velocity V"). Further, first velocity reliability determined from the employed object velocity is employed as velocity reliability TV for computation purpose (hereinafter referred to as "velocity computation reliability TV"). In a case where a plurality of information pieces pertaining to object velocity are captured, in step C16 the information pieces are integrated for each pixel. Processing pertaining to step C16 is identical with processing pertaining to steps C4 through C8, except that object velocity and first velocity reliability are employed in lieu of an object distance and first distance reliability and that velocity for computation (hereinafter referred to as "computation velocity") and velocity reliability for computation (hereinafter referred to as "velocity computation reliability") are used in lieu of the computation distance and the computation distance reliability.

In step C17, the distance computation reliability TR assigned to a pixel is compared with a predetermined lower threshold distance TRx for each pixel assigned a computation value during processing pertaining to steps C3 through C16. With regard to only a pixel having distance computation reliability greater than the lower threshold distance TRx, in step C18 a second parameter of a pixel is set through use of the computation distance R and the distance computation reliability TRx assigned to the pixel. For example, the distance computation reliability TR of the pixel is substituted to the distance presence of the presence vectors of the second parameter of the pixel.

In step C19, the angle computation reliability Tθ assigned to a pixel is compared with a predetermined lower threshold angle Tθx for each pixel assigned a computation value during the processing pertaining to steps C3 through C16. With regard to only a pixel having the angle computation reliability Tθ greater than the lower threshold angle Tθx, in step C20 a second parameter of the pixel is set through use of the computation angle θ and the angle computation reliability Tθ assigned to the pixel. For example, the angle computation reliability Tθ assigned to the pixel is substituted to the angle presence of the presence vectors of the second parameter of the pixel. In step C21, the velocity computation reliability TV assigned to a pixel is compared with a predetermined lower threshold velocity TVx for each pixel assigned a computation value during the processing pertaining to steps C3 through C16. With regard to only a pixel having the velocity computation reliability TV greater than the lower threshold angle TVx, in step C22 a velocity value of a second parameter of the pixel is set through use of the computation velocity V and the velocity computation reliability TV assigned to the pixel. For example, the computation velocity assigned to the pixel is applied to the traveling state vector of the second parameter. Further, the velocity computation reliability TV assigned to the pixel is applied to the traveling-state reliability vector assigned to the pixel. After setting of the second parameter with regard to a velocity, processing is terminated in step C23.

In a case where the parameter integration section 15 performs the processing described in connection with FIG. 9, the parameter integration section 15 can integrate information pieces which are greater, by one, in the number of times the second parameter updating operation described in connection with steps B6 and B7 has been repeated. Further, in a case where the parameter integration section 15 performs the processing described in connection with FIG. 10, the parameter integration section 15 can integrate an arbitrary number of information pieces, so long as parameters of detection information DS having the greatest degree of reliability is selected from among a plurality of detection information pieces DS representing an object located in a single pixel. As mentioned above, the parameter integration section 15 can integrate an arbitrary number of information pieces without modification of a processing structure. Thus, the general versatility of the parameter integration section 15 is improved to a much greater extent. Further, in a case where one sensor 11 is disposed in the information processing apparatus and where the parameter integration section 15 integrates the first parameters weighted for first reliability and the resultant value is taken as a second parameter, the thus-produced integration information MD2 serves as an information map which is produced by means of weighting the conversion information MD1 on the basis of the first reliability information MT1 pertaining to the sensor 11. For this reason, the parameter integration section 15 acts as a section for weighting the conversion information MD1.

Processing performed by the reliability integration section 19 will now be described. The reliability integration section 19 integrates all the degrees of first reliability assigned to each pixel. The result of integration of degrees of reliability is imparted to the pixel as second reliability. In a case where the second reliability has been calculated, the information processing apparatus 1 can perform processing in consideration of the second reliability. In a case where the second reliability is taken into consideration during processing pertaining to the second parameter, the second reliability assigned to the pixel is used for the second parameter assigned to the pixel on a per-pixel basis. Preferably, the second reliability is produced each time first reliability is output.

A preferable configuration of the reliability integration section 19 will be described hereinbelow. Second reliability assigned to a single pixel corresponds to the sum total of degrees of first reliability imparted to all the sensors 11. As a result, the reliability integration section 19 can readily determine second reliability through simple processing. Processing for integrating the sum total of degrees of first reliability assigned to all sensors 11 located in the pixel into second reliability is suitable for use with the information processing apparatus 1 in which first reliability changes with the detection capability of the sensor 11.

The second reliability assigned to a single pixel may be the sum total of degrees of first reliability assigned to all the sensors covering the pixel, which first reliability has been weighted by a constant corresponding to the influence imposed on the sensors 11 by the environment. Since the reliability integration section 19 can determine second reliability according to the latest state of the environment of the sensors 11, the reliability integration section 19 can change the second reliability in accordance with a change in the detection capability of the sensors 11 caused by the environment. Processing for calculating second reliability in consideration of the environment is suitable for use with the information processing apparatus 1 in which fixed second reliability has already been stored in the first reliability storage section 17 beforehand. The environment of the sensors 11 is ascertained by the environment recognition section 21. The environment recognition section 21 includes, for example, a temperature sensor and measures the temperatures of the sensors 11 and the temperature of the surroundings of the sensors 11.

Figure 12A:
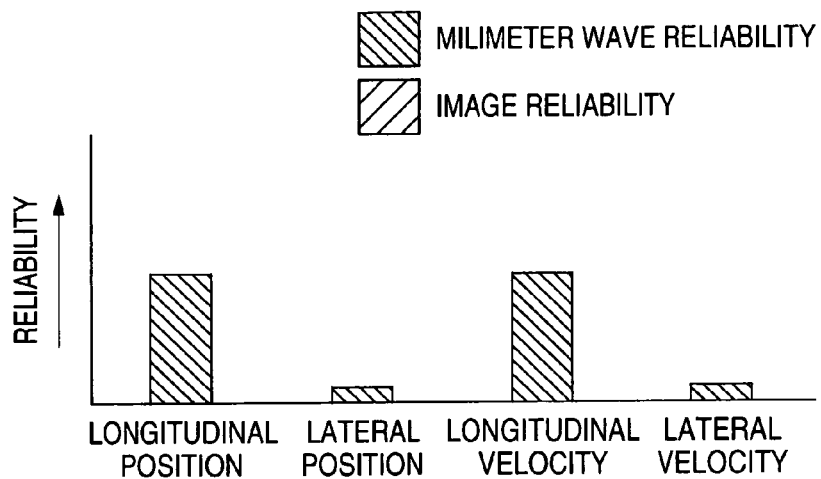
FIGS. 12A through 12D are charts for describing processing to be performed by the reliability integration section 19 provided in the information processing apparatus 1 shown in FIG. 1.

There will now be described a case where the information processing apparatus 1 is equipped, as a sensor 11, with a radar using a millimeter wave and an object sensor using a wide-angle image. The first reliability information $MT1_A$ pertaining to the radar shown in FIG. 11A is equal to that shown in FIG. 4. In many cases, a radar detects an object with sufficiently high precision with reference to the longitudinal direction of the object but with low precision with reference to the lateral direction of the object. For this reason, as can be seen from a bar graph shown in FIG. 12A, with regard to all pixels 61 overlapping a detectable area $AS_A$ of the radar over a predetermined area or more, the longitudinal position reliability of the first reliability information $MT1_A$ is greater than the lateral position reliability of the same. Further, with regard to all the pixels 61, the longitudinal velocity reliability of the first reliability information $MT1_A$ is greater than the lateral velocity reliability of the same.

In contrast with the radar, the object sensor using a wide-angle image detects an object with sufficiently high precision with reference to the lateral direction of the object but with lower accuracy with reference to the longitudinal direction of the same. For this reason, the first reliability of pixels overlapping the area of a detectable area $AS_B$ of the object sensor in the vicinity of the object sensor is greater than the first reliability of pixels overlapping the area of a detectable area $AS_B$ of the object sensor remote from the object sensor. A plurality of sensors 11 provided in the information processing apparatus 1 are preferably combined together so as to mutually compensate for disadvantages thereof.

Figure 12B:
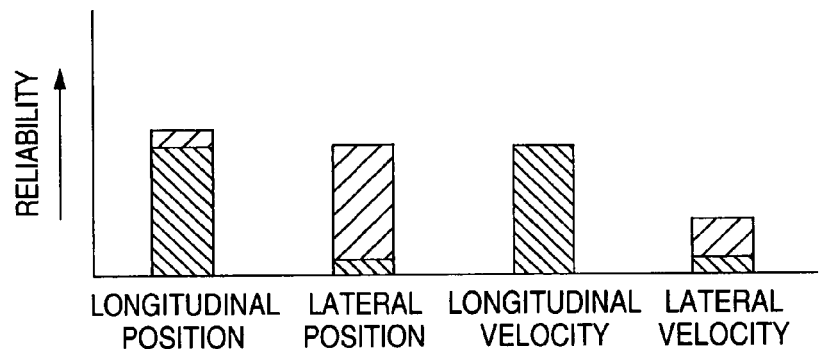
Figure 12C:
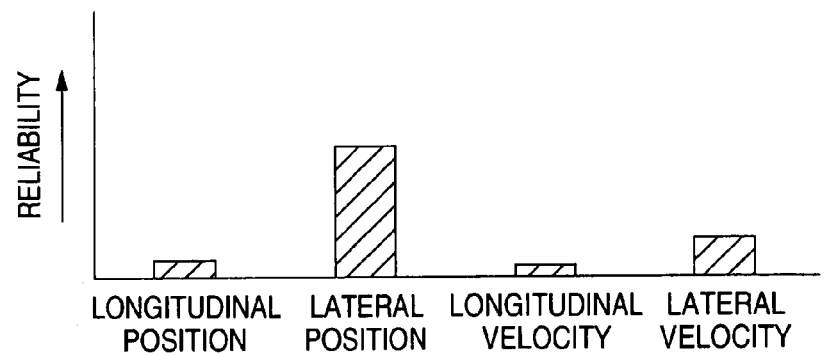
Figure 12D:
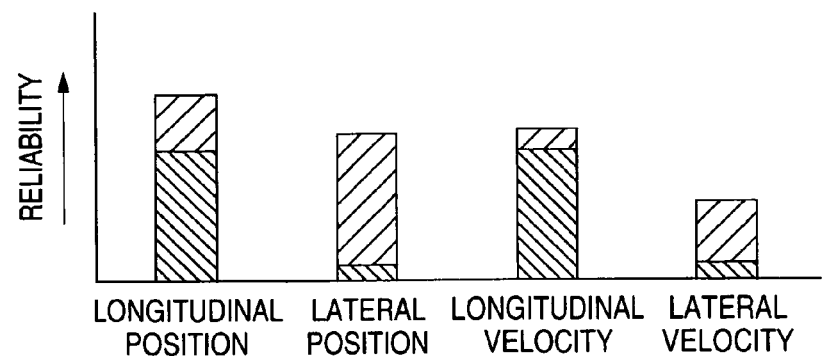

FIG. 11B shows second reliability information MT2 of the information processing apparatus 1 equipped with an object sensor, the sensor using a radar and a wide-angle image. The second reliability information MT2 shown in FIG. 11 is formed by means of superimposing the first reliability information $MT1_B$ of the radar shown in FIG. 1A onto the first reliability information $MT1_A$ of the object sensor using a wide-angle image. In the second reliability information MT2 of the information processing apparatus 1, the second reliability of pixels 62 and 63 located in an overlap between the detectable range $AS_A$ of the radar and the detectable range $AS_B$ of the object sensor is a sum of the first reliability of the radar and the second reliability of the object sensor for each type of reliability, as shown in FIGS. 12B and 12C. The second reliability shown in FIG. 12B is lower than the second reliability shown in FIG. 12C. The reason for this is that the pixels 62 assigned the second reliability shown in FIG. 12B overlap a portion of the detectable range AS close to the object sensor and that the pixels 63 assigned the second reliability shown in FIG. 12C overlap a portion of the detectable range $AS_B$ distant from the object sensor. In connection with the second reliability information MT2 pertaining to the information processing apparatus 1, the second reliability of the pixels 64 overlapping only the detectable range $AS_B$ of the object detector is equivalent to the second reliability assigned to the pixels 64 in the first reliability information $MT1_B$ of the object sensor.

In the present embodiment, the format of the first reliability information MT1 regarding the sensors 11 is interchangeable with the format of first reliability of individual pixels located in the detection space. As a result, the configuration of the reliability integration section 19 for integrating reliability can be shared, without regard to the combination of the sensors 11. For this reason, the versatility of the reliability integration section 19 is improved, and hence there can be diminished the manufacturing costs of the information processing apparatus 1 including the reliability integration section 19.

Processing of the processing selection section 22 will be described hereinbelow. On the basis of the latest second reliability of all pixels, the processing selection section 22 selects adaptive tasks allowed to be performed from among adaptive tasks which the processing execution section 25 can perform. The processing selection section 22 doubles as a determination section for determining whether or not adaptive tasks which are to be performed on the basis of detection information output from the sensor 11 can be performed. In order to determine whether or not an arbitrary adaptive task can be allowed, the latest second reliability assigned to each pixel is compared with the reference reliability of the adaptive task assigned to the pixel, on a per-pixel basis. In a case where the latest second reliability is greater than reference reliability, performing of the adaptive task is determined to be allowed. As mentioned above, in a case where there are selected only the adaptive tasks for which the second reliability assigned to pixels is greater than reference reliability, the adaptive tasks are performed only when the minimum degree of second reliability required for performing an adaptive task is obtained. Hence, the accuracy of an adaptive task to be actually performed is improved. In a case where the latest second reliability of a pixel becomes much lower than the reference, the processing selection section 22 may prohibit performance of all adaptive tasks. In this case, the processing execution section 25 stops performing all adaptive tasks.

Figure 13:
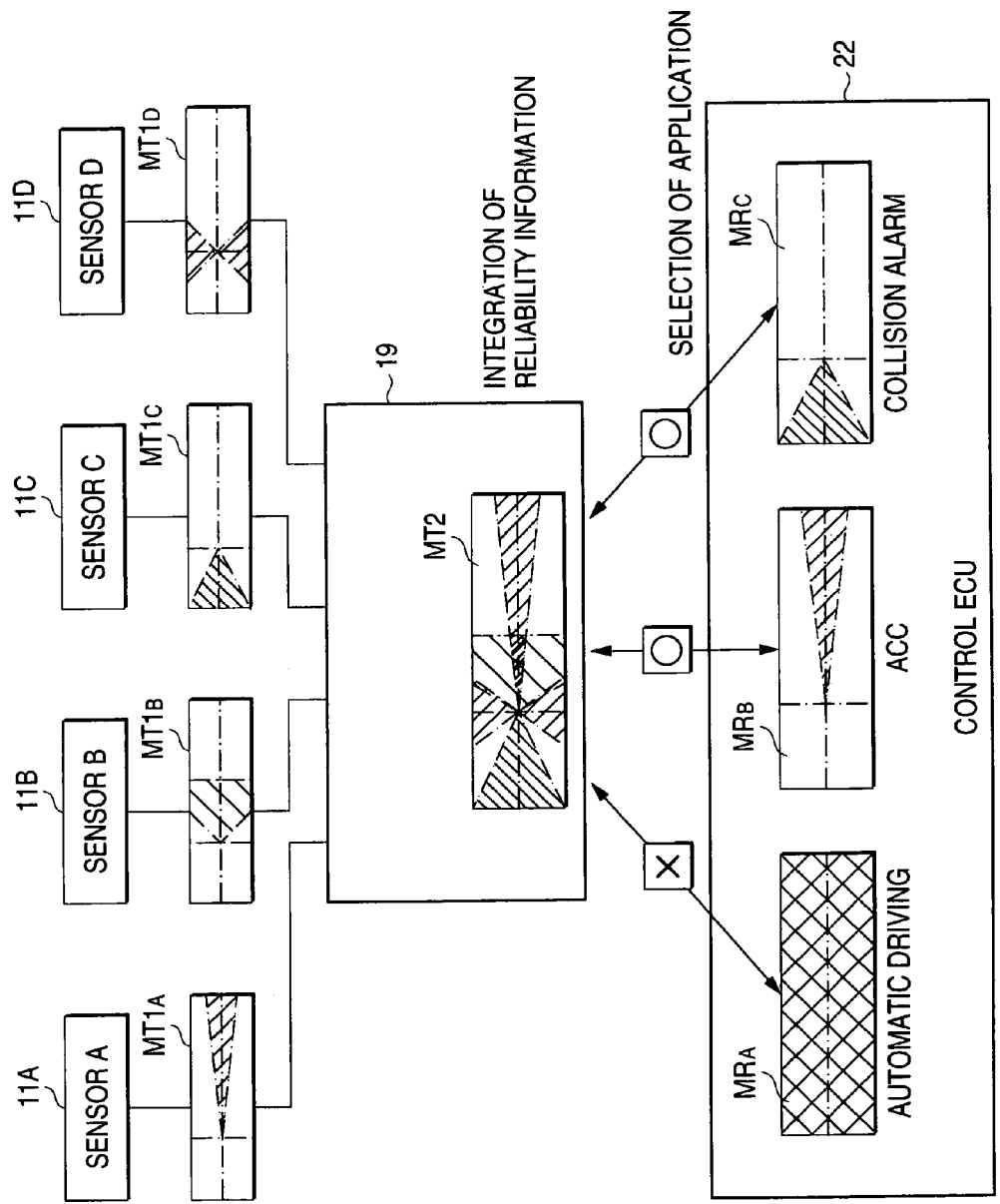
FIG. 13 is a chart for describing processing to be performed by a processing selection section 22 provided in the information processing apparatus 1 shown in FIG. 1.

FIG. 13 is a schematic diagram for describing selection of an adaptive task in a case where reference reliability is referred to. In the example shown in FIG. 13, there are prepared four sensors 11A, 11B, 11C, and 11D, and three types of reference reliability information pieces $MR_A$, $MR_B$, and $MR_C$ pertaining to adaptive tasks. Here, first reliability information $MT1_A$ pertains to the sensor $11_A$; first reliability information $MT1_B$ pertains to the sensor $11_B$; first reliability information $MT1_C$ pertains to the sensor 11C; and first reliability information $MT1_D$ pertains to the sensor $^{11}$D. The second reliability information MT2 is formed by means of superimposing the four first reliability information pieces $MT1_A$ to $MT1_D$ one over the other. The distribution of second reliability assigned to the pixels belonging to the second reliability information MD2 is compared with the distribution of reference reliability assigned to the pixels belonging to the reference reliability information pieces $MR_A$, $MR_B$, and $MR_C$ pertaining to respective adaptive tasks. When the reference reliability information $MR_A$ pertaining to the first adaptive task is compared with the second reliability information MT2, there may be pixels which are assigned second reliability lower than reference reliability. Performance of first adaptive tasks is prohibited. When the reference reliability information $MR_B$ and second reliability information MT2, both pertaining to the second adaptive tasks, are compared with each other, the second reliability of pixels is found to be greater than the reference reliability of pixels over the entire detection space. Performing of the second adaptive task is allowed. When the reference reliability information MRC and the second reliability information MT2 pertaining to the third adaptive task are compared with each other, the second reliability of pixels is found to be greater than the reference reliability of the pixels over the entire detection space. Hence, performance of the third adaptive task is allowed.

Figure 14:
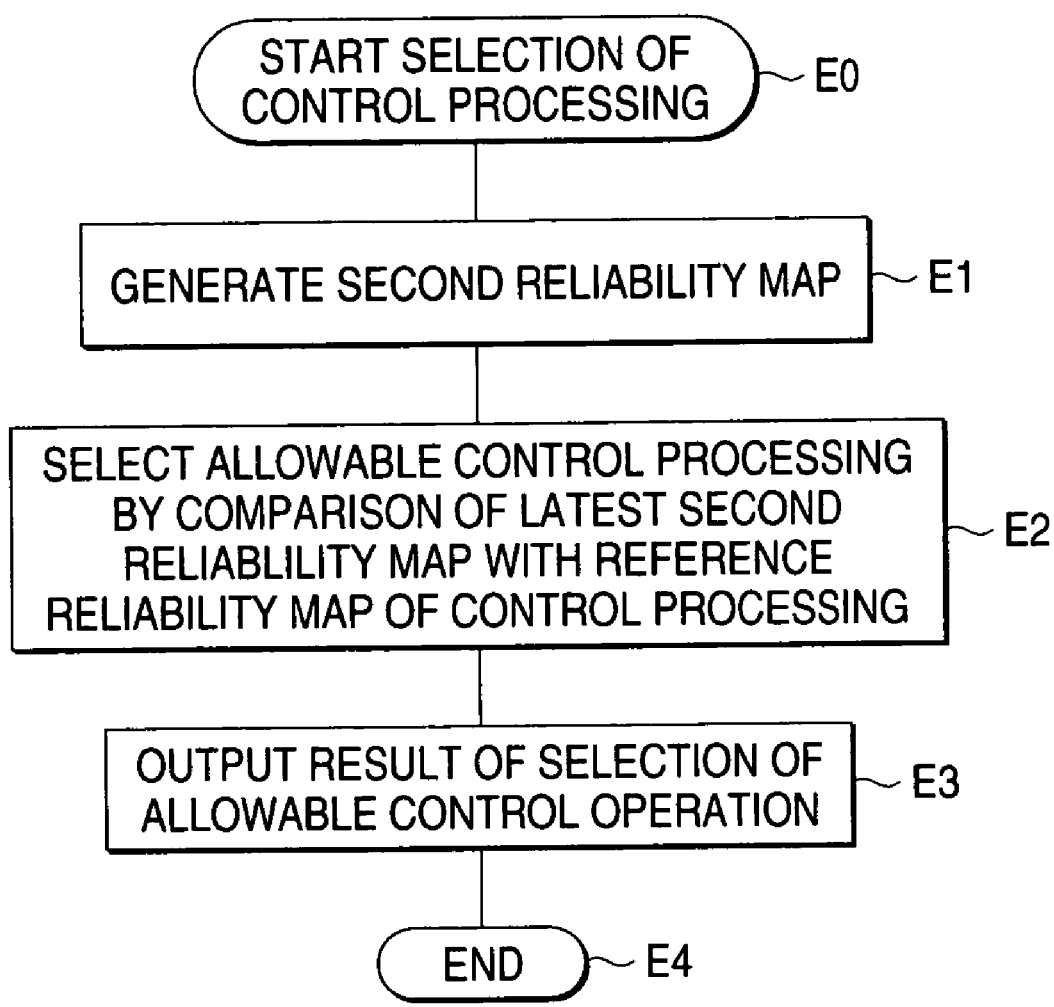
FIG. 14 is a flowchart for describing processing to be performed by the processing selection section 22 provided in the information processing apparatus 1 shown in FIG. 1.

FIG. 14 is a flowchart for describing processing of the processing selection section 22. At a point in time when an ignition switch 26 is brought into conduction or when a change in the detection capability of at least one sensor is detected, processing proceeds from step E0 to step E1. Even at a point in time when the report and diagnosis of failure is issued from at least one sensor 11, processing proceeds from step E0 to step E1. In step E1, the processing selection section 22 causes the reliability integration section 19 to commence integration of degrees of first reliability. As a result, the reliability integration section 19 integrates the latest first reliability information pieces MT1 pertaining to all sensors 11, thereby producing the latest second reliability information MT2.

In step E2, the processing selection section 22 compares the distribution of section reliability of the latest second reliability information MT2 produced in step E1 with the distribution of reference reliability of the reference reliability information MR pertaining to respective adaptive tasks stored in the reference reliability storage section 23. There are selected adaptive tasks belonging to the reference reliability information MR whose reference reliability is less than the latest second reliability. Reference reliability information MR selected as pertaining to practicable adaptive tasks is not limited to reference reliability information pertaining to all the selected pixels and having second reference reliability, and may be reference reliability information having second reference reliability and pertaining to pixels which are greater in number than the lower threshold, which is less than the total number of pixels. In step E3, the processing selection section 22 imparts, to the processing execution section 25, information indicating that only the adaptive tasks selected in step E2 are practicable. After output of information, processing is completed in step E4.

In a case where the information processing apparatus 1 is installed in the vehicle 32, the timing at which first reliability is derived from the previously-described first reliability derivation section 18 is preferably equal to the timing at which electrical connection is established with the ignition switch 26 of the vehicle 32. In this case, the first reliability information MT1 is stored in the first reliability storage section 17 immediately after electrical connection has been established with the ignition switch 26. Hence, processing pertaining to first parameters can be performed at any time after establishment of electrical connection with the ignition switch 26, in consideration of the first reliability. Therefore, accuracy of processing pertaining to first parameters, which processing is to be performed after electrical connection has been established with the ignition switch 26, can be improved. The information processing apparatus 1 having the configuration shown in FIG. 1 enables improvement in the accuracy of integration of first parameters using first reliability. Alternatively, the first reliability information MT1 pertaining to sensors 11 may be set separately from the first reliability derivation section 18 and stored in the first reliability storage section 17 beforehand. Further, the first reliability information MT1 which has been derived from the first derivation section 18 and stored in the first reliability storage section 17 may be retained in its present form without regard to the state of electrical connection with the ignition switch 26. In this way, the first reliability information MT1 may have been stored in the first reliability storage section 17 before electrical connection is established with the ignition switch 26.

Preferably, second reliability is also produced immediately after electrical connection has been established with the ignition switch 26 of the vehicle 32. In the information processing apparatus 1, processing can be enabled at any time after establishment of electrical connection with the ignition switch 26, in consideration of the second reliability. The information processing apparatus having the configuration shown in FIG. 1 enables selection of adaptive tasks allowed to be performed and generation of control information. Preferably, the processing selection section 22 selects adaptive tasks allowed to be performed when electrical connection is established with the ignition switch 26 of the vehicle 32. The processing execution section 25 can perform allowed adaptive tasks at any time after establishment of electrical connection with the ignition switch 26.

The timing at which first reliability is derived from the first reliability derivation section 18 is preferably equal to the timing at which the detection capability of the sensor 11 is changed. Each time the detection capability of the sensor 11 changes, the first reliability information MT1 to be stored in the first reliability storage section 17 is updated. Hence, processing pertaining to first parameters can be performed in consideration of the latest first reliability, thereby improving the accuracy of processing to a much greater extent. More preferably, in a case where first reliability is output at the time of changing of the detection capability of the sensor 11, first reliability is changed so as to follow the detection capability of the sensor 11. As a result, since first reliability corresponding to the latest detection capability of the sensor 11 is available, the accuracy of processing pertaining to first parameters is improved further. More preferably, in a case where first reliability is output when detection capability of the sensor 11 has changed, second reliability is also generated immediately after a change has arisen in detection capability. In such a case, it would be better if first reliability has changed in response to a change in detection capability. Since second reliability changes in response to a change in detection capability, processing can be performed on the basis of the second reliability, in consideration of a change in detection capability. As mentioned above, in a case where second reliability is produced each time the detection capability of the sensor 11 changes second reliability, the processing selection section 22 selects allowable adaptive tasks every time first reliability pertaining is output to at least one sensor 11. As a result, the processing execution section 25 can always perform only the adaptive tasks which are allowed in light of the latest detection capability of the sensor 11.

As has been described above, in a case where the combination of sensors 11 of the information processing apparatus 1 shown in FIG. 1 is changed, the distribution of second reliability pertaining to pixels, which pixels belong to the second reliability information MT2, is automatically changed in accordance with the combination of the sensors 11, so long as there is available the first reliability information MT1 corresponding to the latest combination of the sensors 11. For this reason, adaptive tasks which are actually performed by the processing execution section 25 are automatically limited by means of the latest combination of the sensors 11. As a result, the overall processing configuration of the information processing apparatus 1 can be changed in accordance with the changed combination of sensors 11, without involvement of a change in the configuration of constituent elements of the information processing apparatus 1 other than the sensors 11 and the first reliability information MT1. The versatility of the information processing apparatus 1 is improved.

In the event of a failure arising in at least one sensor 11, adaptive tasks to be performed by the processing execution section 25 are automatically limited to only the adaptive tasks which can be performed on the basis of only detection information DS output from the remaining sensors 11, so long as the first reliability changes in accordance with a change in the detection capability of the sensor 11 of the information processing apparatus 1. In the event of a failure arising in at least one sensor 11, the processing execution section 25 will not become fully inoperative, and a portion of the adaptive tasks are performed continuously, thus improving the usability of the information processing apparatus 1.

The detection capability of a sensor 11 becomes lower than a standard level in the following cases. For example, in a case where the sensor 11 is a radar using millimeter waves, the detection capability of the radar will become deteriorated if an abnormal rise arises in the surrounding temperature of radar equipment or if adherents attach to a radome covering the antenna of the radar. In a case where the sensor 11 uses the image processing technique, the detection capability of the sensor 11 will become deteriorated during time periods in which the afternoon sun enters a camera shooting an object within the field of view of the camera, when rain or snow falls within the field of view of the camera, or when adherents attach to a position on the camera at which light enters an optical system of the camera. In a case where the sensor 11 is a car navigation system, the detection capability of the sensor 11 will become deteriorated if a sufficiently long period of time has elapsed since preparation of map information stored in the sensor 11. In a case where the sensor 11 is a sonar using an ultrasonic wave sensor, the detection capability of the sensor 11 will become deteriorated if sufficiently high acoustic noise arises in an area around a vehicle. In a case where an information capturing apparatus 311 is an inter-vehicle communications device installed in a vehicle, the detection capability of the capturing apparatus 311 will become deteriorated if the vehicle is driving on a road while communication with a road-to-vehicle communications apparatus installed along the road is being interrupted. In a case where the sensor 11 is a car navigation system, the detection capability of the sensor 11 corresponds to the capability ascertaining the surroundings of the current position of the vehicle on the basis of map information. In a case where the information capturing apparatus 311 is an inter-vehicle communications device installed in a vehicle, the detection capability of the capturing apparatus 311 is sensitive to the capability of receiving communication from the inter-vehicle communications apparatus installed along a road and details of the information received by means of inter-vehicle communication.

In a case where the sensor 11 is formed from a sensing element 45 for acquiring information for detecting an object and an object sensing section 46 for sensing an object on the basis of an output from the sensing element 45, the detection capability of the sensor 11 changes in accordance with a change in the output from the sensing element 45. The object sensing section 46 doubles as a section for sensing a change in detection capability and determines a change in detection capability on the basis of a change in the output from the sensing element 45. In a case where the latest detection capability of the sensor 11 is deteriorated to a level lower than the standard detection capability, the object sensing section 46 issues a diagnosis reporting a failure of the sensor 11. In response to the diagnosis issued by the sensor 11, the processing section of the information processing apparatus 1 exclusive of the sensor 11 can recognize an anomalous decrease in the detection capability of the sensor 11. The sensing element 45 corresponds to a radar or an antenna. In a case where the sensor 11 employs the image processing technique, the sensing element 45 corresponds to a camera. In a case where the sensor 11 is a sonar, the sensing element 45 corresponds to an ultra sonic sensor. In a case where the image processing apparatus 1 is equipped with the environment recognition section 21, the processing section utilizing first reliability may estimate the detection capability of the sensor 11 on the basis of the environment recognized by the environment recognition section 21.

Processing performed by the control information generation section 24 will now be described. On the basis of the integration information MD2, the control information generation section 24 generates control information DC pertaining to an object located within the detection space. The control information DC has a format capable of being accepted by the processing execution section 25. The format of the control information DC may be set irrespective of a pixel. By way of example, control information DC is produced for each object, and parameters of control information DC pertaining to a single object are embodied by the position and velocity of the object. In a case where the control information generation section 24 is included in the information processing apparatus 1, the format of the integration information MD2 can be set without regard to the format capable of being accepted by the processing execution section 25. Even when the processing execution section 25 is changed, changing of processing of the parameter integration section 15 is not required. Accordingly, the parameter integration section 15 of single configuration can be used without regard to the configuration of the processing execution section 25, thereby curtailing costs for manufacturing the information processing apparatus 1.

If one of parameters of control information DC is found to be the position of an object, in a case where second parameters assigned to some pixels of all pixels located within the detection space—the pixels having second reliability greater than a predetermined lower threshold—indicate that an object is located in the pixels, the control information generation section 24 determines the position of the object belonging to the control information DC, on the basis of the position of the pixels. Of all the pixels located within the detection space, pixels having second reliability less than the lower threshold are not used for generating control information, without regard to whether or not second parameters assigned to the pixels indicate presence of an object. In such a case where the control information DC is generated from second parameters and second reliability, the accuracy of processing which is performed by the processing execution section 25 through use of the control information DC is improved. In a case where adaptive tasks to be performed through use of control information DC have already been specified, reference reliability assigned to the adaptive tasks is preferably used as the lower threshold of a second parameter. As a result, the accuracy of processing which is performed by the processing execution section 25 through use of the control information DC is improved further.

At the time of generation of control information DC, in a case where second parameters assigned to two or more continuous pixels indicate presence of an object and where second parameters assigned to the pixels are analogous to each other, the control information generation section 24 preferably recognizes that a single object is present within an area consisting of the continuous pixels. Further, the second parameters assigned to the continuous pixels are integrated, and control information DC pertaining to the single object is produced from the result of integration of the second parameters. Thus, the control information generation section 24 can integrate, into a single parameter, parameters of control information DC pertaining to an object straddling a plurality of pixels.

At the time of generation of control information from a group of pixels which have analogous second parameters and are arranged continuously, the position of a pixel located at the outermost position of the area consisting of continuous pixels is determined as the position of edge of the area. As a result, the position of an edge of the object straddling a plurality of pixels is easily determined. At the time of generation of control information DC from the group of pixels, a mean value of the traveling speed indicated by the second parameters assigned to the continuous pixels is determined as the traveling speed of the object located within the area consisting of continuous pixels. As a result, the traveling speed of the object straddling a plurality of pixels is easily determined. Of the traveling speed indicated by the second parameters assigned to the continuous pixels, the speed of the object which will arise when the vehicle approaches the object most closely is determined as the traveling speed of the object within the area consisting of continuous pixels, at the time of generation of control information from the group of pixels. In a case where the control information DC including such a traveling speed is used for predicting occurrence of a collision between the vehicle and the object, a more reliable prediction about collision becomes possible.

FIG. 15 is a flowchart for describing generation of control information DC performed by the control information generation section 24. In a case where the integration information MD2 is output from the parameter integration section 15 or where the processing execution section 25 requests control information DC, generation of control information DC is commenced. After commencement of generation of control information DC, processing proceeds from step D0 to step D1. In step D1, the control information generation section 24 selects reference reliability information MR pertaining to an adaptive task for which the control information DC which will now be generated is to be used. Reference reliability of a pixel belonging to the thus-selected reference reliability information MR is compared with the second reliability of a pixel belonging to the latest integration information MD2, for each pixel. The control information generation section 24 deletes, from the integration information MD2, only the second parameters assigned to pixels having second reliability less than the reference reliability.

In step D2, on the basis of the integration information MD2, the control information generation section 24 retrieves pixels assigned second parameters, which parameters include presence parameters indicating presence of an object. In step D3, the control information generation section 24 retrieves a group of pixels consisting of two or more continuous pixels located in the detection space, from the pixels retrieved in step D2. In a case where a group of pixels are found, in step D4 a determination is made, for each pixel group, as to whether or not a difference in longitudinal velocities indicated by the second parameters assigned to the pixels constituting the pixel group falls within a predetermined allowance.

In a case where the difference in longitudinal velocities falls within the allowance, the second parameters assigned to the pixels are analogous to each other, and hence a single object is deemed to be present in the group of pixels. In step D5, control information DC is produced from the result of integration of second parameters assigned to the pixels constituting the pixel group. In a case where the difference in longitudinal velocities exceeds the allowance, of all the pixels constituting the pixel group, pixels assigned second parameters, which parameters indicate a difference in longitudinal velocities falling within the allowance, are combined together in step D6. For each combination of pixels, control information DC is produced from the result of integration of second parameters assigned to the thus-combined pixels. In a case where a single pixel is located within the detection space, a single object is deemed to be present within the single pixel. In step D7, parameters of control information DC pertaining to a single object is produced, for each single pixel, from the second parameter assigned to a pixel. If the second parameters assigned to all the pixels retrieved in step D2 are used for producing control information DC in any of steps D3 through D7, processing is terminated in step D8.

In step D5, the following processing is performed. In a case where control information DC is used for controlling the distance between vehicles, of longitudinal positions represented by the second parameters assigned to the pixels constituting the pixel group, the longitudinal position at which the relative distance between the object located in the pixel group and the center of the vehicle is minimized is adopted as the longitudinal position of the object belonging to the control information DC. Of lateral positions represented by the second parameters assigned to the pixels constituting the pixel group, the lateral position at which the object located in the pixel group is closest to the longitudinal axis passing through the center of the vehicle is adopted as the lateral position of the object belonging to the control information DC. A mean value of the velocities represented by the second parameters assigned to the pixels constituting the pixel group is adopted as the velocity of an object. In a case where control information DC is used for controlling the distance between vehicles, in a case where in step D6 a difference in longitudinal velocities represented by the second parameters assigned to two or more pixels of all the pixels constituting the pixel group falls within the allowance, the pixels which are combined together are regarded as the group of pixels, and parameters of control information pertaining to the pixel group are determined.

Figure 16A:
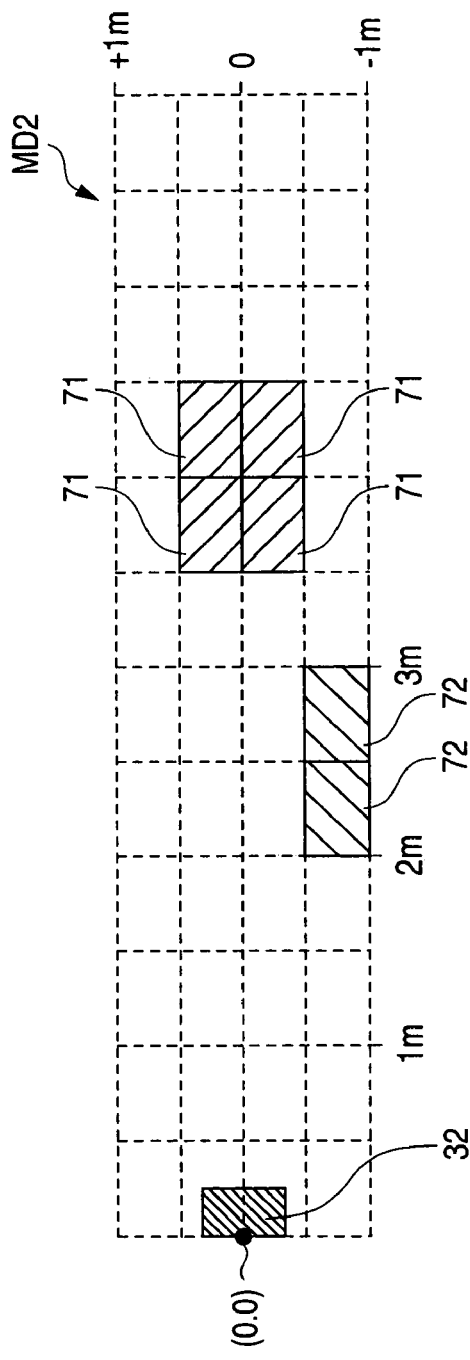
FIGS. 16A and 16B are flowcharts for describing processing to be performed by the control information generation section 24 provided in the information processing apparatus 1 shown in FIG. 1.

The integration information MD2 shown in FIG. 16A includes a pixel group consisting of pixels 71 assigned second parameters having second reliability higher than reference reliability of an automatic car-space control operation and a pixel group consisting of pixels 72 assigned second parameters having second reliability lower than the reference reliability of the automatic car-space control operation. In a case where the control information DC formed from integration information MD2 is used for an automatic car-space control operation, if processing shown in FIG. 15 is performed, second parameters are deleted from the pixels 72 having second reliability lower than the reference reliability of reference reliability information MRB pertaining to the automatic car-space control operation. As a result, the integration information MD2 used for controlling control information is configured as shown in FIG. 16B.

Figure 16B:
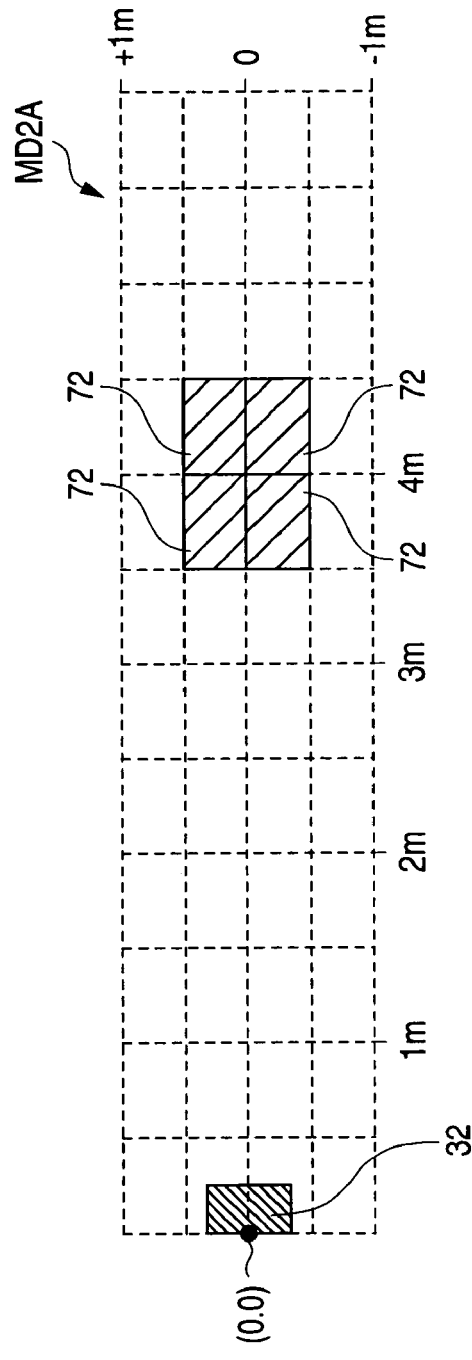

In connection with the integration information MD2A which has been limited and is shown in FIG. 16B, the second parameters assigned to the four hatched pixels 72 assume [a longitudinal position of 3.5 m, a lateral position of 0 m, a relative velocity of −0.5 km/h], [a longitudinal position of 4.0 m, a lateral position of 0 m, a relative velocity of −0.3 km/h], [a longitudinal position of 3.5 m, a lateral position of +0.5 m, a relative velocity of +0.5 km/h], and [a longitudinal position of 4.0 m, a lateral position of +0.5 m, a relative velocity of +5.0 km/h], respectively. A difference in relative velocities represented by the second parameters of the four pixels falls within an allowance. Hence, the second parameters of these four pixels are integrated, and the result of integration is output as control information DC pertaining to a single object. The control information DC, which is the result of integration of the second parameters of the four pixels, represents the longitudinal position RF, the lateral position RT, and the relative velocity V of the object; that is, a longitudinal position of 4.0 m, a lateral position of 0 m, and a relative velocity of +1.2 km/h. Eq. 13 is a velocity integration expression.

$$V=\{(-0.5\ \mathrm{km/h})+(-0.3\ \mathrm{km/h})+0.5\ \mathrm{km/h}+5.0\ \mathrm{km/h}\}/\\4=1.2\ \mathrm{km/h} \qquad (13)$$

Processing of the processing execution section 25 will now be described below. The processing execution section 25 can perform one or more adaptive tasks which use(s) the result of detection performed by the sensor 11. By way of example, the processing execution section 25 has a plurality of application programs for use with adaptive tasks. In a case where the processing section 25 is activated by means of any one of application programs, an adaptive task corresponding to the application program is performed. In a case where the information processing apparatus 1 is installed in a vehicle, the adaptive task is embodied as processing relating to vehicle control. For example, the adaptive task relating to vehicle control includes an automatic vehicle driving operation, an automatic car-space control (ACC) operation, and a collision alert operation.

The automatic car-space control operation is for controlling a vehicle so as to constantly maintain the distance to the car ahead at a predetermined reference distance. The collision alert operation is for issuing an alert to the driver when the probability of a vehicle colliding against an object located around the vehicle becomes high. The automatic driving operation to be performed by the processing execution section 25 is embodied by combination of a plurality of types of vehicle adaptive tasks including an automatic car-space control operation and a collision alert operation. Further, the automatic driving operation may include processing for automatically controlling the travel direction of a vehicle.

An example of automatic car-space control operation to be performed by the processing execution section 25 is as follows:

On the basis of the control information DC or the integration information MD2, there is determined a relative distance between the vehicle and the object ahead which is detected in the detection space by means of at least one sensor 11. The thus-determined relative distance is compared with a predetermined reference distance. If the relative distance is greater than the reference distance, an internal combustion engine 27 and a brake mechanism 28 are controlled so as to increase the velocity of the vehicle. In a case where the relative distance is less than the reference distance, the internal combustion engine 27 and the brake mechanism 28 are controlled so as to decrease the velocity of the vehicle. As a result, the vehicle is driven so as to follow the movement of the object ahead.

Figure 17:
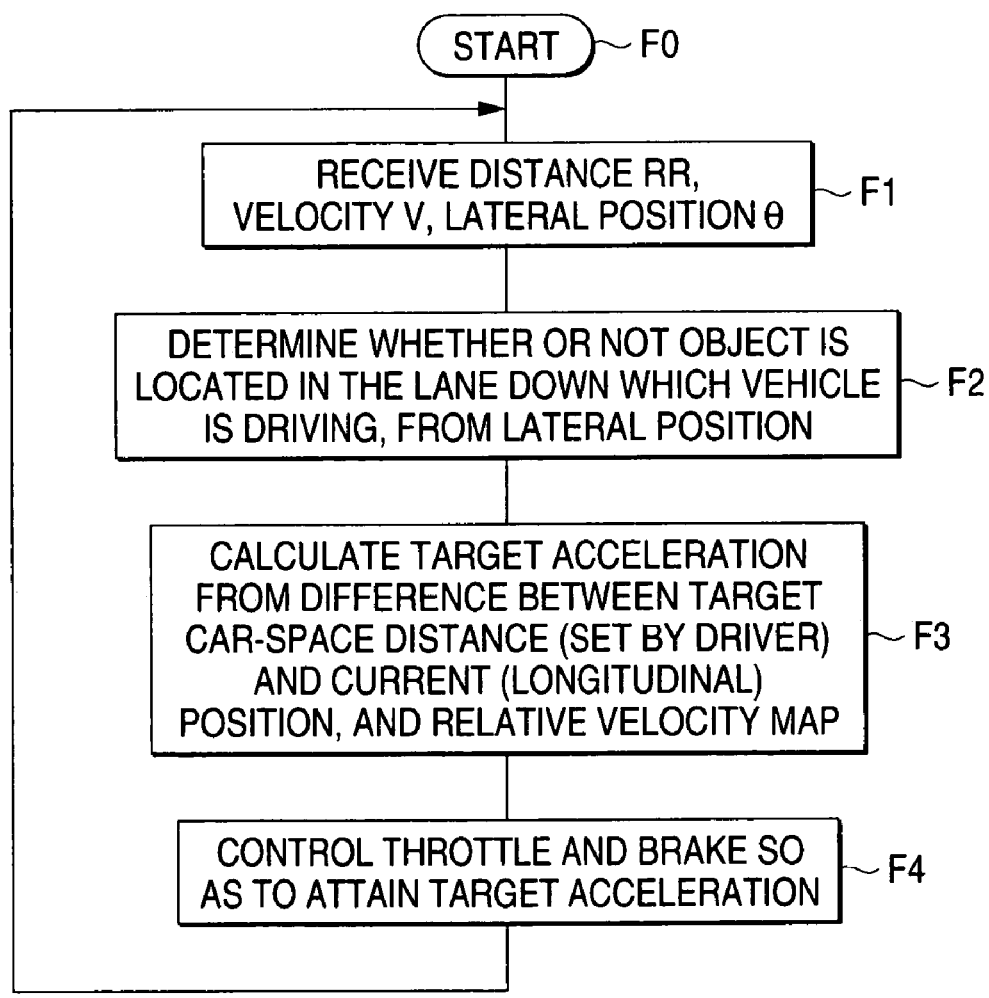
FIG. 17 is a flowchart for describing an automatic car-space control operation, which is one of adaptive tasks to be performed by a processing execution section 25 provided in the information processing apparatus 1 shown in FIG. 1.

FIG. 17 is a flowchart for describing the automatic car-space control operation to be performed by the processing execution section 25 through use of control information DC. The processing execution section 25 is preliminarily provided with a map representing the relationship among a difference between a target distance between vehicles and a longitudinal component of a relative distance between the object and the current position of the vehicle, a relative velocity between the object and the vehicle, a target acceleration, and a target distance between vehicles. The target distance between vehicles is set by the driver of the vehicle. The processing selection section 22 enables execution of an automatic car-space operation. In a case where the driver instructs execution of an automatic car-space control operation, processing proceeds from step F0 to F1. In step F1, the processing execution section 25 acquires, from the control information generation section 24, control information DC pertaining to each of the objects detected in the detection space. Control information DC pertaining to a single object includes a relative distance RR between the object and the vehicle; a lateral position Rθ indicating a direction in which the object is viewed from the vehicle; and a relative velocity between the object and the vehicle.

In step F2, the processing execution section 25 determines, for each detected object, whether or not an object is situated in a lane along which the vehicle is driving, on the basis of the lateral position included in the control information DC. In step F3, the processing execution section 25 determines a longitudinal component of the relative distance between the current position of the vehicle and any of objects determined to be located within the lane along which the vehicle is driving. There is determined a difference between the longitudinal component of relative distance and the target distance between vehicles. On the basis of a map which has been prepared beforehand, a target acceleration is calculated through use of the difference in distance, and the relative velocity and the target distance between vehicles included in the control information DC. In step F4, the processing execution section 25 controls the internal combustion engine 27, a throttle pedal, and the brake mechanism 28 such that the acceleration of the vehicle attains a target acceleration. Processing pertaining to steps F1 through F4 is cyclically iterated until performance of the automatic car-space operation is inhibited by the processing execution section 25 or until the driver instructs termination of the automatic car-space operation.

An example of processing performed in connection with collision alert to be issued by the processing section 25 is as follows. First, on the basis of the control information DC or the integration information MD2, there is determined a relative distance between the vehicle and the object detected in the detection space by means of at least one sensor 11. The thus-determined relative distance is compared with a predetermined reference distance. In a case where the relative distance is less than the reference distance, a report indicating that the object is approaching the vehicle is sent to the driver of the vehicle by means of an alarm 29. On the basis of the control information DC or the integration information MD2, there are determined the direction in which the object detected in the detection space by mean of at least one sensor 11 is moving relative to the vehicle, and a relative velocity between the object and the vehicle. In a case where the object is moving so as to approach the vehicle and where the relative velocity is less than a predetermined reference velocity, a report indicating that the object is approaching the vehicle is sent to the driver of the vehicle by means of the alarm 29. In association with issue of the report, the processing execution section 25 may control the internal combustion engine 27 and the brake mechanism 28 so as to avoid occurrence of a collision between the object and the vehicle.

In the first embodiment, the four sensors 11 are embodied as a radar, a compound-eye range finder using the image processing technique, a vehicle-mounted road-to-vehicle communications terminal for use with a road-to-vehicle information communications system, and a navigation system, respectively. The sensor 11 is not limited to these devices and may be embodied as another device; for example, a sonar using ultrasonic waves. Further, the sensor 11 may be embodied by a vehicle-mounted communications terminal for transmitting and receiving information to and from a communication system installed along a road; for example, a VICS (Vehicle Information Communications System). Further, the sensor 11 may be embodied as a communications terminal which can be connected to a communications network. The communications terminal may be configured so as to be able to arbitrarily acquire information from an external database provided outside the communications network. As mentioned above, the sensor 11 is not limited to a device for detecting an object within the detection space but may be embodied as any device which captures any information pertaining to the circumstances within the detection space.

The outline of structure of a radar embodying the sensor 11 is as follows:

An FM-CW radar using millimeter waves comprises the sensing element 45 including an antenna and the object sensing section 46. In the sensing element 45, beam-like electromagnetic waves are transmitted from an antenna while there is changed a transmission angle made between the reference direction and the direction of transmission of an electromagnetic wave. The intensity of transmitted electromagnetic waves is maintained constant, and the frequency of the transmitted electromagnetic waves changes with time in accordance with a predetermined pattern. In a case where an object is located in the direction in which electromagnetic waves are transmitted, the transmitted electromagnetic wave is reflected by the object and returns to the antenna. The reflected electromagnetic waves lag behind the transmitted electromagnetic waves in accordance with the relative distance R between the object and the radar. The frequency of the reflected electromagnetic waves shifts from that of the transmitted electromagnetic waves in accordance with the relative velocity "v" between the object and the radar. The electromagnetic waves are received by the antenna, and the resultant signal is mixed with a local oscillation signal imparted to the antenna for transmitting electromagnetic waves, thereby generating a beat signal.

The object sensing section 46 calculates a transmission angle at which electromagnetic waves are transmitted in a period during which the frequency of a local oscillation signal is increased and a transmission angle at which electromagnetic waves are transmitted in a period during which the frequency of the local oscillation signal is decreased. Further, the object sensing section 46 produces a graph showing the distribution of levels of a beat signal with respect to the frequency of a beat signal. In a case where an object is located, at a certain point in time, in the direction in which electromagnetic waves are transmitted, the level of the beat signal in the graph is maximized in the direction corresponding to the direction of transmission of electromagnetic waves. By means of Eqs. 14 through 16, there are calculated the relative position [R, θ] between the radar and the object, which is expressed in polar coordinates, and the relative velocity V between the radar and the object. Here, "$f_{up}$" designates the frequency corresponding to the maximum point in the increasing period of the graph, and "$f_{dn}$" designates the frequency corresponding to the maximum point in the decreasing period of the graph. δf designates a difference between the maximum frequency of the local oscillation signal and the minimum frequency of the same. Here, "c" designates the speed of light, and $f_{center}$ designates the center frequency of a local oscillation signal. Reference symbol "fm" designates a sweep frequency corresponding to a change in the frequency of a local oscillation signal.

$$\theta = \text{transmission angle corresponding to the maximum point on a graph} \quad (14)$$

$$R = \frac{C}{4 \times \delta f \times fm} \times \frac{f_{dn} + f_{up}}{2} \quad (15)$$

$$v = \frac{2 \times f_{center}}{c} \times \frac{f_{dn} - f_{up}}{2} \quad (16)$$

The outline of structure of a compound-eye range finder embodying the sensor 11 is as follows:

The compound-eye range finder comprises two cameras serving as the sensing elements 45 and the object sensing section 46. The two cameras are arranged so as to induce parallax and are spaced apart from each other by only a predetermined distance $W_{CAMERA}$. The fields of view of the cameras partially overlap. On the basis of an image captured by the two cameras, the object sensing section 46 calculates parallax Δxm relative to an object located within the fields of view of the cameras. Through use of Eq. 17, the relative distance R between the compound-eye range finder and the object is calculated. In Eq. 17, FL denotes the focal depth of each of the two cameras, and F denotes a resolution in an image with respect to the direction parallel to the axis along which the camera is mounted. Parallax is determined from two images, by means of extracting an edge corresponding to the edge of the object within an image from each of the two images, and determining a difference between the edge of the object of one image and the edge of the object of the other image. The thus-determined difference is taken as parallax. Alternatively, an edge corresponding to the edge of the object in one image is extracted, and a portion of the image including the thus-extracted edge is taken as a reference pattern. The reference pattern is matched with the other image. There is determined an offset between the thus-obtained reference pattern and the area which is most similar to the reference pattern in terms of the distribution of concentration. The offset is taken as parallax.

$$R = \frac{FL \times W_{CAMERA}}{F \times \Delta xm[k]} \quad (17)$$

The outline of configuration of a road-to-vehicle communications terminal embodying the sensor 11 is as follows:

A vehicle-mounted road-to-vehicle communications terminal transmits information pertaining to traffic information to a road-to-vehicle communications apparatus installed along a road. On the basis of the information transmitted from a vehicle driving down the road, the road-to-vehicle communications apparatus grasps the state of traffic on the road and transmits information pertaining to the thus-grasped state of traffic to the road-to-vehicle communications terminal installed in the vehicle which is driving down the road. For example, information pertaining to the state of traffic transmitted to the road-to-vehicle communications terminal provided in an arbitrary vehicle includes the position and velocity of vehicles driving ahead or behind the vehicle. As a result, the road-to-vehicle communications terminal installed in the vehicle can grasp objects around the vehicle.

The outline of configuration of a car navigation system embodying the sensor 11 is as follows:

The car navigation system includes a vehicle position detection section 45' consisting of a sensing element; the object sensing section 46; and a map storage section 47. The vehicle position detection section 45' detects the position of a vehicle having the navigation system mounted thereon, by means of either a global positioning system (GPS) or a self-contained navigation method. The object sensing section 46 grasps the position of a vehicle on the map, on the basis of the position of the detected vehicle and the map stored in the map storage section 47. On the basis of the information pertaining to the surroundings of the position grasped on the map, the object sensing section 46 estimates the surroundings of the vehicle. In a case where the geometry of a road and buildings located around the road are printed on the map, if the geometry of the road down which the vehicle is currently driving is ascertained on the basis of the map or the position of the vehicle, guard rails installed along either side of the road or buildings located around the road can be estimated.

The outline of configuration of a sonar system embodying the sensor 11 is as follows:

The sonar system comprises an ultrasonic sensor 45" consisting of a sensing element and the object sensing section 46. The ultrasonic sensor 45" emits sound waves into the air only for a predetermined period of time. In a case where an object is located in the direction in which the emitted ultrasonic waves propagate, the ultrasonic waves are reflected from the object and return to the vehicle. The ultra sonic waves that have returned to the vehicle actuate a piezoelectric material provided in the ultrasonic sensor 45", whereby the piezoelectric material produces an a.c. voltage of frequency corresponding to the number of vibrations of ultrasonic waves. After emission of ultrasonic waves, the object sensing section 46 determines whether or not the ultrasonic sensor 45" is normal, on the basis of the reverberation of the ultrasonic sensor 45". In a case where the ultrasonic sensor 45" is determined to be normal, a determination is made as to whether or not an a.c. voltage has arisen in the piezoelectric material for a predetermined period of time after emission of ultrasonic waves. In a case where an a.c. voltage has arisen, there is calculated, as a relative distance R between the back sonar system and the object, the product of the speed of sound Vs and a time "ts" from the time ultrasonic waves are emitted to the time an a.c. voltage is produced; that is, a time from the time ultrasonic waves are emitted to the time reflected ultrasonic waves arrive at the vehicle.

In a case where the processing execution section 25 of the information processing apparatus 1 is constructed so as to be able to perform only adaptive tasks of single type, the processing selection section 22 may be omitted from the information processing apparatus 1. The processing execution section 25 may be constructed so as to unconditionally perform adaptive tasks. As a result, the configuration of the information processing apparatus 1 is simplified. More preferably, even in the foregoing case, the information processing apparatus 1 may be provided with the processing selection section 22, and the processing selection section 22 may make a determination as to whether or not the processing execution section 25 can perform adaptive tasks of single type. Only when the processing execution section 25 is determined to be able to perform adaptive tasks by the processing selection section 22, the processing execution section 25 performs the adaptive tasks. As a result, in a case where the processing execution section 25 can perform only adaptive tasks of one type, the processing execution section 25 performs adaptive tasks, by means of use of the sensors 11 in combination and the latest detection capability of the sensors 11, only during a period of time in which information with accuracy required for or higher than performing adaptive tasks can be acquired. Consequently, there can be prevented deterioration of accuracy with which adaptive tasks are performed, which would otherwise be caused by a change in the combination of the sensors 1.1 or a change in the detection capability of the sensors 11.

In a case where all information capturing apparatus 3 included in the information processing apparatus 1 include the parameter conversion section 12 as well as the sensors 11, the information capturing apparatus 3 outputs conversion information MD1 regardless of the structure of the detection information DS being output by the sensors 11. In a case where the format of parameters of information are standardized to a single type of format, the format of detection information DS delivered to the information integration apparatus 4 is standardized. As a result, the only requirement is that the information integration apparatus 4 be constructed so as to be able to process information of single format without regard to the formats of the sensors 11 used in combination. Hence, the information integration apparatus 4 can be shared among various combinations of sensors 11. Since the versatility of the information integration apparatus 4 is improved, the development of the information integration system 4 is facilitated, thereby curtailing costs for manufacturing the information integration system 4.

The controller 5 included in the information processing apparatus 1 includes the control information generation section 24 as well as the processing execution section 25. The control information generation section 24 changes the format of information consisting of parameters assigned to pixels to a format unique to the processing of the processing execution section 25. In a case where the controller 5 includes the control information generation section 24, the processing execution section 24 can accept information consisting of parameters assigned to pixels located within a detection space, without regard to the format of control information DC available to the processing execution section 25. There can be obviated a necessity of changing processing of the processing execution section 25 so as to comply with the format of the controller 5. Therefore, there can be shared the processing configuration of adaptive task processing execution means of the controller 5, which controller is to be imparted with information of various formats. As a result, development of the controller 5 is facilitated, and costs for manufacturing the controller 5 can be curtailed. In a case where the controller 5 includes the control information generation section 24 as well as the processing execution section 25, the conversion information MD1 output from the information capturing apparatus 3 may be delivered directly to the controller 5 if integration of the conversion information MD1 output from the information capturing apparatus 3 is not required.

FIG. 18 is a block diagram showing the configuration of an information processing apparatus according to a second embodiment of the present invention (hereinafter called a "second information processing apparatus") 101. The second information processing apparatus 101 differs from the information processing apparatus according to the first embodiment (hereinafter called a "first information processing apparatus") in only the divided state of constituent elements. In other words, the second information processing apparatus is identical with the first information processing apparatus except for the divided state of constituent elements. In the description of the second embodiment, those constituent elements which are identical in function with those included in the first information processing apparatus are assigned the same reference numerals as those used in the first embodiment. Hence, repetition of their explanations is omitted.

The second information processing apparatus 101 is divided into at least one information capturing apparatus 103, an information integration apparatus 104, and a vehicle control 105. The information capturing apparatus 103 includes at least the sensor 11. Preferably, the information capturing apparatus 103 further includes the first reliability derivation section 18. The information integration apparatus 104 includes the parameter conversion section 12 and the parameter integration section 15. Preferably, the information integration apparatus 104 further includes the conversion information memory 13, the integration information memory 16, the first reliability storage section 17, the reliability integration section 19, the second reliability memory 20, the environment recognition section 21, the processing selection section 22, the reference reliability storage section 23, and the control information generation section 24. The vehicle control 105 includes the processing execution section 25. If the first reliability information MT1 concerning all the sensors 11 is stored in the first reliability storage section 17, the first reliability derivation section 18 may be omitted.

In the second information processing apparatus 101, the vehicle control 105 is identical in structure with a vehicle controller of the conventional art. The information capturing apparatus 103 is constructed by means of adding the first reliability derivation section 18 to the information capturing apparatus 3 of the conventional art. In a case where the first reliability derivation section 18 is omitted, the information capturing apparatus 103 becomes identical in structure with an information capturing apparatus of the conventional art. Therefore, the second information processing apparatus 101 differs from a vehicle-mounted information processing apparatus of the conventional art in only the information integration apparatus 104. In other respects, the second information processing apparatus 101 is identical in structure with a vehicle-mounted information processing apparatus of the conventional art. As mentioned above, the second information processing apparatus 101 can be readily embodied without involvement of improvements to a commercially-available information capturing apparatus and a commercially-available information controller. The information integration apparatus 104 having the foregoing construction can constitute the information processing apparatus 101 by use of the information capturing apparatus 103 and the controller 105 in various combinations. Thus, the information processing apparatus 101 has a considerably high degree of versatility.

The information processing apparatus 1 according to the first embodiment and the information processing apparatus 101 according to the second embodiment are illustrative of the information processing apparatus according to the present invention. The present invention can be embodied in various forms, so long as a uniform principal structure is employed. Particularly, so long as the same advantages are yielded, respective constituent components of the information processing apparatus 1 may be embodied in another construction as well as in the previously-described construction.

The configuration of the information processing apparatus 1 shown in FIG. 1 and the configuration of the information processing apparatus 101 shown in FIG. 18 are optimum examples. The only requirement is that the information processing apparatus 1 include at least the sensors 11, the parameter conversion section 12, the parameter integration section 15, and the processing execution section 25. Processing sections other than the four processing sections 11, 15, 18, and 28 may be omitted, as necessary. So long as the information processing apparatus 1 includes the four processing sections 11, 15, 18, and 28, the information processing apparatus 1 is not limited to assuming a separated construction consisting of three devices; that is, the information capturing apparatus 3, the information integration apparatus 4, and the controller 5, but may assume a single construction or a separated construction consisting of two or more devices.

The information processing apparatus 1 which is shown in FIG. 1 and is constituted of separated constituent elements is one of optimum states, and the information processing apparatus 101 which is shown in FIG. 18 and is constituted of separated constituent elements is one of optimum states. The divided state of constituent elements is not limited to those shown in FIGS. 1 and 18. In the information processing apparatus according to the present invention, the only requirement is that the information capturing apparatus 3 includes at least the sensors 11; the controller 5 include at least the processing execution section 25; and the parameter conversion section 12 be included in either the information capturing apparatus 3 or the information integration apparatus 4. In the information processing apparatus 1, the first reliability derivation section 18 and the first reliability storage section 17 may be included in either the information integration apparatus 4 or the controller 5. The control information generation section 24 may be included in either the controller 5 or the information integration apparatus 4.

In the information processing apparatus according to the present invention, in a case where the information capturing apparatus 3 includes only the sensors 11, where the controller 5 includes the processing execution section 25 and the control information generation section 24, and where the information integration apparatus 4 includes the parameter conversion section 12 and the parameter integration section 15, the format of the information imparted to the controller 5 can be made common without regard to the format of the detection information DS output from the sensors 11. In this case, if the information processing apparatus includes a single sensor 11, contents of the integration information MD2 are identical with those of the detection information DS output from the sensor 11. The integration information MD2 differs from the detection information DS only in format. As a result, the information integration apparatus operates so as to convert the format of the detection information DS output from the sensor 11 to a predetermined common format. In this case, even when the information processing apparatus includes only a single sensor 11, the format of information imparted to the controller can be made common without regard to the format of the detection information DS output from the sensor 11, so long as the information processing apparatus is equipped with an information integration apparatus.

In the present invention, the object sensor is constituted of sensors 11 and the first reliability derivation section 18, which doubles as the reliability setting section for the sensors 11. The reliability setting section may set the first reliability of the sensors 11 for each pixel. In this case, the format of reliability information pertaining to the result of detection of an object in a detection space performed by the sensor 11 is standardized to a format consisting of reliability of each pixel. Accordingly, reliability information pieces pertaining to a plurality of sensors 11 are readily standardized. Further, in the present invention, the processing selection section 22 doubling as a determination section may constitute an independent processing apparatus. In a case where the determination section determines whether or not an adaptive task can be performed, on the basis of the reliability of the sensor 11 in each sub-division of a detection space, the switching between adaptive tasks can be effected in accordance with the current detection capability of the sensor 11 which sends detection information to the processing execution section 25. Further, the determination section determines whether or not an adaptive task can be performed, on the basis of the result of integration of degrees of reliability of sensor means provided in respective pixels within the detection space, and the switching between adaptive tasks can be effected in accordance with the combination of current detection capability of the sensor means which send detection information to the processing execution section 25.

The information capturing apparatus 3, the information integration apparatus 4, and vehicle control 105 provided in the information processing apparatus according to the present invention are not limited to the example in which these three devices are used in combination; each of the devices may be used either in combination with another device or alone. Further, the information processing apparatus according to the present invention is not limited to a vehicle-mounted apparatus. If the information processing apparatus 1 is not installed in a vehicle, adaptive tasks for vehicle control may correspond to other processing operations without regard to whether the processing operations are for vehicle control, so long as the processing operations use information captured by the sensors 11. In this case, the detection space is not limited to a space around the vehicle.

The detailed configuration of the information processing apparatus 1 shown in FIG. 1 and the detailed configuration of the information processing apparatus 101 correspond to functional configurations. The information processing apparatus 1 and the information processing apparatus 101 according to the present invention may assume any physical configuration, so long as the physical configuration enables implementation of the functional configuration. By way of example, each of the information integration apparatus 4 and the controller 5 is embodied by an electronic control unit (ECU) The ECU includes a computation circuit section and a storage circuit section. A computation circuit section of the ECU embodying the information integration apparatus 4 shown in FIG. 1 corresponds to the parameter integration section 15. A storage circuit section of the ECU serves as the conversion information memory 13 and the integration information memory 16. The computation circuit section of the ECU embodying the controller 5 shown in FIG. 1 serves as the reliability integration section 19, the processing selection section 22, the control information generation section 24, and the processing execution section 25. The storage circuit section of the ECU serves as the first reliability storage section 17, the second reliability memory 20, and the reference reliability storage section 23. In the information capturing apparatus 3, a single central processing circuit provided in the information capturing apparatus 3 may serve as the object sensing section 46 provided in the sensor 11 and the reliability derivation section 12.

In the information processing apparatus 1, control of the information integration apparatus 4 and control of the vehicle can be implemented by use of, in combination, a computer and software including a program for performing various processing operations pertaining to integration of the detection information DS and various data sets pertaining to the same. To this end, software is installed in a computer, and the central processing circuit of the computer is activated by software. Software is stored beforehand in a storage medium which can be read by a computer, and the storage medium is loaded into a storage medium reading device of the computer, thereby loading software from the storage medium. The storage medium is, for example, an optical storage medium typified by CD-ROM, a magnetic storage medium typified by a floppy disk, or a photomagnetic storage medium typified by MO.

As mentioned above, in an information processing apparatus according the present invention, parameter integration means produces first parameters pertaining to objects located within a plurality of pixels, which pixels correspond to sub-divisions formed by dividing a detection space, on the basis of the detection information output from one or more sensor means. The first parameters are assigned to the pixels. Parameter integration means integrates the first parameters on a per-pixel basis, and a second parameter which is the result of integration of first parameters is assigned to a pixel. Contents of integration information consisting of the second parameter assigned to each of the pixels represent the result of integration of detection information pieces output from all sensor means. As mentioned above, in the information processing apparatus, the formats of information pieces imparted to the parameter integration-means are made common, without regard to the formats of information pieces output from the sensor means. Therefore, the versatility of the parameter integration means is improved, thereby curtailing costs for manufacturing the information processing apparatus.

In the present invention, first parameters are assigned to only pixels including an object position, which position is one of parameters of detection information. As a result, detection information can be readily converted into conversion information consisting of first parameters assigned to all pixels. Further, according to the present invention, first parameters are assigned to pixels, in accordance with accuracy of detection information and the result of comparison between the positions of pixels and the object position serving as one of the parameters of the detection information. Thus, the accuracy of conversion of detection information is improved. Further, according to the present invention, first parameters representing the presence or absence of an object are assigned to respective pixels. On the basis of the integration information, there can be obtained information including the position of an object as a parameter. Further, in the present invention, first parameters representing the moving state of an object are assigned to first pixels. As a result, there can be obtained information including a parameter indicating the moving state of an object, on the basis of integration information.

According to the present invention, predetermined first reliability which is the reliability of a first parameter is assigned to each of pixels. As a result, the information processing apparatus can perform processing in consideration of first reliability. In the present invention, first degree which changes in accordance with the detection capability of sensor means is assigned to each of pixels. The information processing apparatus enables performance of processing pertaining to first parameters in consideration of first detection capability and first reliability of sensor means. Further, first reliability is derived at a point in time when an ignition switch of a vehicle is brought into conduction. Processing can be performed in consideration of first reliability immediately after the ignition switch has been brought into conduction. Further, first reliability is derived at a point in time when the detection capability of at least one sensor means has changed. As a result, the information processing apparatus enables performance of processing in consideration of the latest detection capability of sensor means and first reliability.

According to the present invention, in a case where vectors representing the moving state of an object are taken as first parameters, the first reliability collectively indicates the reliability of the vector. Thus, processing can be performed in consideration of the reliability of a vector. In a case where a vector indicating the moving state of an object is assigned to a pixel as a first parameter, the first reliability indicates the reliability of component of the vector. In the present invention, first reliability is taken into consideration at the time of calculation of second parameter assigned to each of pixels. As a result, the accuracy of a second parameter assigned to each of pixels is improved.

In the present invention, the information processing apparatus calculates the second reliability of each pixel. Processing pertaining to a second parameter can be performed in consideration of second reliability. Second reliability is calculated from only first reliability. Thus, second reliability can be easily obtained by means of simple processing. In the present invention, second reliability is calculated on the basis of first reliability and the environment of sensor means. As a result, second reliability can be calculated in consideration of the influence to the environment of sensor means.

Further, the information processing apparatus further has processing execution means capable of performing one or more types of adaptive tasks through use of integration information. The processing execution means performs only adaptive tasks selected on the basis of second reliability. As a result, the processing execution means can make the switching between adaptive tasks in accordance with the combination of current detection capability of all sensor means. In the present invention, a selected adaptive task is performed, on the basis of the result of comparison between predetermined reference reliability and the latest second reliability. As a result, the accuracy of processing of adaptive tasks which have been actually performed is improved. In the present invention, at a point in time when the ignition switch of a vehicle is brought into conduction, an adaptive task is selected. An adaptive task can be performed at any time after the ignition switch has been brought into conduction. Further, an adaptive task is selected at a point in time when the detection capability of at least one sensor means is changed. As a result, there can be performed an adaptive task in accordance with the detection capability of the latest sensor means.

In the present invention, the information processing apparatus further comprises control information generation means for producing control information on the basis of integration information. By means of such a configuration, the versatility of parameter integration means is improved further. In the present invention, control information is generated from a second parameter and second reliability. As a result, the accuracy of processing of processing execution means is improved. According to the present invention, a single object is recognized as being present within an area formed from a plurality of pixels—which are assigned mutually-similar second parameters and are positioned continuously—of all pixels recognized as indicating presence of objects. As a result, control information generation means can integrate, into a single information piece, control information pieces pertaining to an object straddling a plurality pixels. The end of the area is regard to be as the edge of an object within the area. Thus, the end of an object straddling a plurality of pixels can be readily determined. In the present invention, a means value of traveling velocities based on the second parameters assigned to the pixels located within the area corresponds to the traveling velocity of an object within the area. Therefore, the moving velocity of an object straddling a plurality of pixels is readily determined. Further, of traveling velocities based on the second parameters assigned to the pixels continuously located within the area, the velocity at which the sensor means and the object move so as to approach each other most closely is deemed to be the moving velocity of the object within the area. Use of such control information enables more reliable detection of a collision.

According to the present invention, a vehicle is situated at the rear of the center of a detection space divided into pixels, with reference to the travel direction of the vehicle. In a case where a vehicle is controlled on the basis of the integration information MD2, a vehicle is controlled more safely.

Further, according to the present invention, information captured by sensor means is converted into information represented by first parameters assigned to respective pixels. As a result, information pieces output from a plurality of information capturing apparatus are integrated easily. As mentioned above, in the information integration apparatus having first parameter integration means or means of weighting first parameters, the format of information delivered to the information integration apparatus is made common to the foregoing format. As a result, the versatility of the information integration apparatus is improved, and hence costs for manufacturing the information integration apparatus can be curtailed. In the present invention, the format of information delivered to the controller is made interchangeable, and there is provided control information generation means for converting information of interchangeable format into information of format unique to processing execution means. As a result, the costs for manufacturing a controller can be reduced.

As mentioned above, in the present invention, the object sensor including sensor means and reliability setting means sets the reliability of sensor means in respective sub-divisions of detection space, as well as detects an object within at least one of the detection space. Reliability information pieces pertaining to sensor means of object sensors of such a configuration are readily integrated. In the present invention, the format of reliability information pertaining to sensor means assigned to an information integration apparatus, which apparatus includes means for integrating the degrees of reliability of sensor means, is interchangeable with a format consisting of degrees of reliability of a plurality of sub-divisions. The versatility of the information integration apparatus including reliability integration means is improved. According to the present invention, the information processing apparatus determines whether or not an adaptive task can be performed, on the basis of reliability of sensor means provided in respective sub-divisions of the detection space. Switching can be made between adaptive tasks in accordance with the current detection capability of sensor means. In the present invention, the information processing apparatus determines whether or not an adaptive task can be performed, on the basis of the result of integration of degrees of reliability of sensor means provided in respective sub-divisions in the detection space. The switching between adaptive tasks can be made in accordance with the combination of current detection capabilities of respective sensor means.

As has been described above, under the information processing method according to the present invention, after the format of respective detection information piece has been made interchangeable with a format using a pixel, parameters are integrated on a per-pixel basis. As a result, integration of detection information using a parameter integration operation of single configuration is enabled, without regard to the combination of formats of detection information pieces.

What is claimed is:

1. An information processing apparatus comprising:
   at least one sensor section for detecting circumstances inside of a predetermined detection space and for capturing detection information pertaining to the circumstances detected;
   a parameter conversion section for determining, on the basis of the detection information output from the sensor section, a first parameter pertaining to an object located in a plurality of pixels for each of the at least one sensor section, the pixels corresponding to sub-divisions formed by dividing the detection space, and for assigning the first parameter to respective pixels; and
   a parameter integration section for integrating the first parameter assigned to the pixels on a per-pixel basis, and for assigning a second parameter to the pixels, the second parameter being a result of integration of the first parameter.

2. The information processing apparatus according to claim 1, wherein, in a case where the detection information includes a parameter representing a position of the object, the parameter conversion section performs the following operations for the sensor section,
   (1) selection of a pixel including the position of the object indicated by the detection information output from the sensor section, and
   (2) assignment of first parameter produced from the detection information to only the selected pixel.

3. The information processing apparatus according to claim 1, wherein, in a case where the detection information includes a parameter representing a position of the object, there is included an information accuracy storage section for storing, for each of the at least one sensor section, the accuracy of detection information pertaining to the object located in respective pixel within the detection space, and
   the parameter conversion section performs the following operations for each sensor section,
   (1) selection of a pixel including the position of the object indicated by the detection information output from the sensor section, and
   (2) assignment of first parameter produced from the detection information to pixels located in an area, which area is set in the detection space on the basis of the accuracy of detection information pertaining to the sensor section provided in the selected pixel and on the basis of the position of the selected pixel.

4. The information processing apparatus according to claim 1, wherein one of the at least one first parameter assigned to the single pixel indicates presence of the object located in the pixel.

5. The information processing apparatus according to claim 1, wherein one of the at least one first parameter assigned to the single pixel indicates the moving state of an object located in the pixel.

6. The information processing apparatus according to claim 1, further comprising a reliability storage section for storing, for each sensor section, predetermined first reliability which is the reliability of the first parameter assigned to respective pixel on the basis of the detection information.

7. The information processing apparatus according to claim 1, further comprising a first reliability derivation section for deriving, for each sensor section, first reliability which is the reliability of the first parameter assigned to respective pixel on the basis of the detection information, wherein the first degree based on the sensor section increases with an increase in the capability of the sensor section for detecting the circumstances inside of the detection space.

8. The information processing apparatus according to claim 7, wherein, in a case where the sensor section is installed in a vehicle, a timing at which the first reliability is derived is equal to a timing at which an ignition switch of the vehicle is brought into conduction.

9. The information processing apparatus according to claim 7, wherein a timing at which the first reliability is derived is equal to a timing at which the detection capability of the at least one sensor section is changed.

10. The information processing apparatus according to claim 6, wherein one of the at least one first parameter assigned to the single pixel is a vector indicating the moving state of the object situated in the pixel, and the first reliability includes the reliability of the vector indicating the moving state of the object.

11. The information processing apparatus according to claim 6, wherein one of the at least first parameter assigned to the single pixel is a vector indicating the moving state of the object situated in the pixel, and the first reliability includes the reliability of a plurality of components of the vector indicating the moving state of the object.

12. The information processing apparatus according to claim 6, wherein the parameter integration section assigns, on a per-pixel basis, a weight to the first parameter assigned to the pixel, in accordance with the first reliability of the pixel, thereby integrating the first parameter.

13. The information processing apparatus according to claim 6, further comprising a reliability integration section for integrating, on a per-pixel basis, the degrees of first reliability of the pixel and assigning the result of integration of the first reliability to the pixel as a second reliability indicating the reliability of the second parameter.

14. The information processing apparatus according to claim 13, wherein the second reliability of the single pixel represents a sum total of degrees of first reliabilities of all of the at least one sensor section provided in the pixel.

15. The information processing apparatus according to claim 13, further comprising an environment recognition section for recognizing the environment of the sensor section, wherein the second reliability of the single pixel represents the sum total of degrees of the first reliability which are assigned to all sensors provided in the pixel and are weighted by a constant corresponding to the influence of the environment recognized by the sensor section.

16. The information processing apparatus according to claim 13, further comprising:
a processing execution section capable of performing any of possible adaptive tasks through use of integration information formed from the second parameters assigned to all pixels provided in the detection space; and
a processing selection section for selecting an adaptive task allowed to be performed, from among all adaptive tasks using integration information, on the basis of the latest second reliability of all pixels, wherein the processing execution section performs the selected adaptive task.

17. The information processing apparatus according to claim 16, further comprising:
a reference reliability storage section for storing, for each adaptive task, reference reliability which is a lower threshold of second reliability assigned to all pixels in a case where performance of an adaptive task is allowed to be performed, wherein
the processing selection section compares, on a per-pixel basis, the latest second reliability of a pixel with reference reliability corresponding to the adaptive task assigned to the pixel, for each adaptive task, and in a case where the latest second reliability is greater than the reference reliability, it is determined that performance of the adaptive task is allowed.

18. The information processing apparatus according to claim 16, wherein, in a case where the sensor section is installed in a vehicle, the processing selection section performs selection of the adaptive task at a point in time when the ignition switch of the vehicle is brought into conduction.

19. The information processing apparatus according to claim 16, further comprising
a first reliability derivation section for deriving the latest first reliability corresponding to the sensor section for each of the at least one sensor section each time the detection capability of the sensor section changes, wherein
the reliability integration section integrates the decrees of first reliability each time the first reliability corresponding to the at least one sensor section is given; and
the processing selection section selects the adaptive task each time the first reliability corresponding to the at least one sensor section is output.

20. The information processing apparatus according to claim 1, further comprising:
a control information generation section for generating, from the integration information, control information pertaining to the object located within the detection space; and
a processing execution section for executing an adaptive task using control information, wherein the control information is formed from parameters acceptable to the processing execution section.

21. The information processing apparatus according to claim 20, wherein, in a case where the second reliability which is the reliability of a second parameter is set on a per-pixel basis, where the control information includes a parameter indicating the position of an object, and where a second parameter assigned to the pixel having second reliability greater than a predetermined threshold value indicates the presence of an object in the pixel, the control information generation section determines the position of the object in the detection space on the basis of the position of the pixel.

22. The information processing apparatus according to claim 20, wherein, in a case where the second reliability is greater than a threshold value, where two or more pixels whose second parameters indicating presence of the object are continuously provided, and where second parameters assigned to the continuously-provided pixels are analogous to each other, the control information generation section integrates the second parameters assigned to the continuously-provided pixels and produces, from the result of integration of the second parameters, control information pertaining to a single object located within an area formed of the continuously-provided pixels.

23. The information processing apparatus according to claim 20, wherein, in a case where the control information includes a parameter indicating the position of the edge of the object, the control information generation section determines the position of a pixel located at an outermost position in the area formed from the continuously-provided pixels, as the position of the edge of the object located in the area.

24. The information processing apparatus according to claim 20, wherein, in a case where the control information includes a parameter indicating the moving velocity of the object, the control information generation section calculates, as the moving velocity of the object within the area, a mean value of the moving velocities indicated by the second parameters assigned to the pixels located in the area formed from the continuously-provided pixels.

25. The information processing apparatus according to claim 20, wherein, in a case where the control information includes a parameter indicating the moving velocity of the object, the control information generation section calculates, as a parameter indicating the moving velocity of the object in the area, a velocity at which the vehicle and the object approach each other most closely, from among the moving velocities indicated by the second parameters assigned to all the continuously-provided pixels in the area.

26. The information processing apparatus according to claim 1, wherein, in a case where the sensor section is installed in a vehicle, the area of the detection space ahead of the vehicle is wider than the area of the detection space behind the vehicle, with reference to the travel direction thereof.

27. An information capturing apparatus comprising:
a sensor section for capturing detection information pertaining to circumstances of a predetermined detection space; and
a parameter conversion section for producing a first parameter pertaining to an object situated in respective pixels, the pixels corresponding to sub-divisions formed by dividing the predetermined detection space, on the basis of detection information output from the sensor section, and for assigning the thus-produced first parameters to the pixels;
wherein, in a case where the detection information includes a parameter representing a position of the object, there is included an information accuracy storage section for storing, for each of at least one sensor section, the accuracy of detection information pertaining to the object located in respective pixel within the detection space, and
the parameter conversion section performs the following operations for each sensor section,
(1) selection of a pixel including the position of the object indicated by the detection information output from the sensor section, and
(2) assignment of first parameter produced from the detection information to pixels located in an area, which area is set in the detection space on the basis of the accuracy of detection information pertaining to the sensor section provided in the selected pixel and on the basis of the position of the selected pixel.

28. An information processing apparatus which is given at least conversion information formed from a first parameter pertaining to an object situated in respective pixels, the pixels corresponding to sub-divisions formed by dividing a detection space, comprising:
an information storage section, for each given information piece, the first parameter by assigning the first parameter to each of pixels located in the detection space; and
a parameter integration section that integrates, on a per-pixel basis, the first parameter assigned to each pixel and assigns a second parameter to the pixel, the second parameter being the result of integration of the first parameter.

29. An information integration apparatus which is given information formed from a first parameter pertaining to an object situated in respective pixels, the pixels corresponding to sub-divisions formed by dividing the detection space, comprising:
a first reliability storage section that stores predetermined first reliability of the first parameter assigned to each of the pixels; and
a weighting section that assigns a weight to the first parameter assigned to each pixel in accordance with the first reliability and that assigns the weighted first parameter to the pixel.

30. A controller which is given information formed from a parameter pertaining to an object situated in respective pixels, the pixels corresponding to sub-divisions formed by dividing the detection space, comprising:
a control information generation section that generates control information pertaining to the object situated in the detection space, from the given information; and
a processing execution section that performs processing using the control information, wherein the control information is formed from a parameter acceptable to the processing execution section.

31. An object detection apparatus comprising:
a sensor section that detects the presence of an object in at least a portion of a predetermined detection space; and
a reliability setting section that sets the reliability of the sensor section provided in one of a plurality of sub-divisions formed by dividing the detection space.

32. An object detection apparatus comprising:
a sensor section that detects presence of an object in at least a portion of a predetermined detection space; and
a reliability integration section for integrating degrees of reliability of respective sub-divisions formed by dividing the detection space,
wherein the reliability integration section integrates the degrees of reliability of the sensors in each of the sub-divisions.

33. An information processing apparatus comprising:
a sensor section capable of detecting presence of an object in at least a portion of a predetermined detection space; and
a determination section for determining whether or not there is performed an adaptive task, the adaptive task being performed on the basis of detection information output from the sensor section, wherein the determination section determines whether or not the adaptive task is performed, on the basis of the reliability of the sensor section provided in sub-divisions formed by dividing the detection space.

34. An information processing apparatus comprising:

at least one sensor section that detects presence of an object in at least a portion of a predetermined detection space; and a determination section for determining whether or not there is performed an adaptive task, the adaptive task being performed on the basis of detection information output from the sensor section, wherein the determination section determines whether or not the adaptive task is performed, on the basis of the result of integration of the degrees of reliability of the sensor section performed in each of the sub-divisions.

35. An information processing method for processing at least one detection information piece pertaining to the circumstances of inside of a predetermined detection space, the method comprising:

determining, on the basis of the detection information, a first parameter pertaining to an object located in a plurality of pixels, the pixels corresponding to sub-divisions formed by dividing the detection space;

assigning the first parameter to respective pixels; and integrating the first parameter assigned to the pixels, on a per-pixel basis; and assigning a second parameter to the pixels, the second parameter being result of integration of the first parameter.

* * * * *